(12) United States Patent
Whear et al.

(10) Patent No.: US 7,904,319 B1
(45) Date of Patent: Mar. 8, 2011

(54) COMPUTER-IMPLEMENTED SYSTEMS AND METHODS FOR WARRANTY ANALYSIS

(75) Inventors: Michael L. Whear, Howell, MI (US); David A. Froning, Apex, NC (US); Danny C. Noal, Woodhaven, MI (US); Robert Martin Henry, Jr., Warren, MI (US); Robert Leroy Collum, Jr., Coppell, TX (US); Ahmed A. Al-Attar, Annandale, VA (US); Max J. McLeod, Oak Ridge, NC (US)

(73) Assignee: SAS Institute Inc., Cary, NC (US)

( * ) Notice: Subject to any disclaimer, the term of this patent is extended or adjusted under 35 U.S.C. 154(b) by 1196 days.

(21) Appl. No.: 11/493,388

(22) Filed: Jul. 26, 2006

Related U.S. Application Data

(60) Provisional application No. 60/702,688, filed on Jul. 26, 2005.

(51) Int. Cl.
*G06Q 19/00* (2006.01)
(52) U.S. Cl. .................................. 705/4; 705/10; 705/14
(58) Field of Classification Search ..................... 705/10, 705/26
See application file for complete search history.

(56) References Cited

U.S. PATENT DOCUMENTS

| | | | | |
|---|---|---|---|---|
| 6,366,199 B1* | 4/2002 | Osborn et al. | | 340/438 |
| 6,643,608 B1* | 11/2003 | Hershey et al. | | 702/181 |
| 2003/0028403 A1* | 2/2003 | Olson | | 705/4 |
| 2003/0033170 A1* | 2/2003 | Bhatt et al. | | 705/4 |
| 2003/0046250 A1* | 3/2003 | Kuettner et al. | | 705/400 |
| 2003/0061104 A1* | 3/2003 | Thomson et al. | | 705/26 |
| 2003/0105646 A1* | 6/2003 | Siepser | | 705/1 |
| 2004/0122689 A1* | 6/2004 | Dailey et al. | | 705/1 |
| 2004/0138908 A1 | 7/2004 | Lowe, Jr. et al. | | |
| 2005/0015273 A1* | 1/2005 | Iyer | | 705/1 |
| 2006/0184377 A1* | 8/2006 | Tan et al. | | 705/1 |
| 2006/0184379 A1* | 8/2006 | Tan et al. | | 705/1 |

OTHER PUBLICATIONS

"Spotfire Launches Spotfire.net, the First Web Portal for Technical Decision-Making Communities." Business Wire, Tuesday, Mar. 21, 2000.*
Kalbfleisch, J.D. et al., "Methods for the Analysis and Prediction of Warranty Claims", Technometrics, vol. 33, No. 3, 25 pp. [Aug. 1991].
Lawless, J.F. et al., "Some Simple Robust Methods for the Analysis of Recurrent Events", IIQP Research Report RR-93-02, 25 pp. [Feb. 1993].
Thode, Henry C., "Testing for Normality", Chapter 12: Robust Estimation of Location and Scale, 29 pp. [2002].
Wu, Huaiqing et al., "Early Detection of Reliability Problems Using Information From Warranty Databases", Technometrics, vol. 44, No. 2, pp. 1-28 [May 2002].

* cited by examiner

*Primary Examiner* — James A Kramer
*Assistant Examiner* — Martin A Gottschalk
(74) *Attorney, Agent, or Firm* — Jones Day

(57) ABSTRACT

Computer-implemented systems and methods for providing warranty analysis. A system and method can be configured to receive claims data and products data and to perform statistical analysis of the received claims data and products data. The statistical analysis includes performing a statistical comparison of current claims activity levels in the received claims data with expected claims activity levels. One or more claim issues are detected based upon the statistical analysis. The detected one or more claim issues are provided to a user.

22 Claims, 37 Drawing Sheets

Fig. 5

Claim Selection Setup

File Edit View Favorites Tools Help

Claim Selection Setup: Add New Claim Selection Elements

○ Claim ID List  ● Claim Attributes

Claim Type: [B Desc / C Desc / D Desc]

Repair Order Open Date: [From] — [To]

Total Claim Cost: [  ] — [  ]

Mileage/Hours: [  ] — [  ]

Select by Service Dealer Hierarchy

● Service Dealer State: [AK / CA / CO / FL]

○ Service Dealer: [            ]

Select by Customer Complaint Hierarchy

● Customer Complaint Code Family: [            ]

○ Customer Complaint Code: [            ]

Trouble Repair Code: [            ]

Failed Part Number: [            ]

[Cancel]   [< Back] Step 2 of 2 [Finish]

250

400

User Filters and Components

Category Subset:
Component Category: [ ▼ ] [Search]

Word Search:
[Should Include ▼] the word(s) [_____] in [Name ▼] [Search]

| | Name | Description | Data Source | Component Category | Author | Modification Date |
|---|---|---|---|---|---|---|
| X | Simple Filter | | Group 1 | Simple Filter | user1 | 17SEP03:15:17:24.2 |
| X | Copy Of Simple Filter | | Group 1 | Simple Filter | user1 | 06NOV03:10:37:40.1 |
| X | Simple Filter 2 | | Group 2 | Simple Filter | user1 | 19NOV03:10:40:05.7 |
| X | PSC2 | | Group 1 | Product Selection | user1 | 17SEP03:15:15:49.0 |
| X | PSC | | Group 2 | Product Selection | user1 | 28OCT03:15:05:14.4 |
| X | PSC3 | | Group 2 | Product Selection | user1 | 19NOV03:10:39:54.3 |
| X | CSC2 | | Group 1 | Claim Selection | user1 | 17SEP03:15:16:47.3 |
| X | CSC | | Group 2 | Claim Selection | user1 | 19NOV03:10:40:00.2 |

| Analysis Setup: Pareto Options |
| --- |
| File  Edit  View  Favorites  Tools  Help |

Analysis Setup: Pareto Options

Choose the variables for analysis, then select any Pareto options as needed.

Data Filter: Simple Filter

Analysis Variable: [IPTV ▽]
Reporting Variable: [Claim Type ▽]
By Variable: [ ▽]

Calculation Method: [Adjusted ▽]
Apply Usage Profiles: ○ Yes  ● No
Warranty Program Mileage Limitation: [36,000 Miles ▽]
Claims Per Unit to Include: [All ▽]
Maximum Exposure Value: [None ▽]
Maturity Value: [None ▽]
Include pre-delivery claims: ● Yes  ○ No
Minimum Sample Size Type: [None ▽]
Minimum Sample Size: [0 ▽] (Type Percent: 0-100, Type Count: Integer > 0)

Number of Bars: [10 ▽] (1-25)

Title: [                    ]
SubTitle: [                    ]
Footnote: [                    ]

[< Back]  [Save As]  [Submit]

Report Details for Pareto Analysis

| OPTION | VALUE |
|---|---|
| Filter Name: | SF A/C Compressor |
| Analysis Type: | Pareto Analysis |
| Analysis Variable: | Total Claim Cost |
| Reporting Variable: | Labor Code |
| By Variable: | |
| Calculation Method: | Adjusted |
| Apply Usage Profiles: | No |
| Warranty Program Mileage Limitation: | |
| Claims Per Unit to Include: | All |
| Maximum Exposure Value: | |
| Maturity Value: | none |
| Include pre-delivery claims: | Yes |
| Minimum Sample Size Type: | None |
| Minimum Sample Size: | |
| Number of Bars: | 10 |
| Title: | |
| SubTitle: | |
| Footnote: | |

Fig. 15

UNADJUSTED CALCULATION METHOD EXAMPLE
CALCULATE CLAIM COUNT AND CLAIM RATE AT 120 DAYS IN SERVICE

| 30-DAY | 60-DAY | 90-DAY | 120-DAY | |
|---|---|---|---|---|
| 35 | 25 | 15 | 5 | TOTAL CLAIM COUNT NUMBER OF CLAIMS THAT OCCURRED WITHIN EACH TIME IN SERVICE BIN |
| 1000 | 1000 | 1000 | 1000 | TOTAL PRODUCT COUNT NUMBER OF PRODUCTS CURRENTLY IN EACH TIME IN SERVICE BIN |

TIME IN SERVICE BINS

80 CLAIMS OCCURRED ACROSS ALL TIME IN SERVICE BINS
4000 UNITS CURRENTLY IN SERVICE ACROSS ALL TIME IN SERVICE BINS

TOTAL CLAIM COUNT AT 120 DAYS IN SERVICE IS 80
CUMULATIVE TOTAL CLAIM RATE AT 120 DAYS IN SERVICE IS 80/4000 = 0.02

THE UNADJUSTED CALCULATION METHOD TOTALS CLAIM COUNTS AND PRODUCT COUNTS ACROSS TIME IN SERVICE BINS, TREATING UNITS OF DIFFERENT AGE THE SAME

*Fig. 17*

SPECIFYING A MATURITY LEVEL OF X WOULD PREVENT UNITS WITH PRODUCT TIS BIN LESS THAN OR EQUAL TO X FROM BEING IN THE SUMMARIZED PRODUCTS DATA SET (E.G. IF THE MATURITY LEVEL SPECIFIED WAS 30, THEN THESE RECORDS WOULD NOT BE IN THE SUMMARIZED PRODUCT SUBSET)

| BY VARIABLE | REPORTING VARIABLE | PRODUCT TIS BIN | CLAIM TIS BIN | PRODUCT COUNT |
|---|---|---|---|---|
| VALUE 1 | RPT VAL 1 | 30 | 0 | Y1 |
| VALUE 1 | RPT VAL 1 | 30 | 30 | Y2 |
| VALUE 1 | RPT VAL 1 | ... | ... | |
| VALUE 1 | RPT VAL 1 | 60 | | Y4 |
| VALUE 1 | RPT VAL 1 | ... | ... | |
| VALUE 1 | RPT VAL 1 | 90 | 0 | Y5 |
| VALUE 1 | RPT VAL 1 | 90 | 30 | Y6 |
| VALUE 1 | RPT VAL 1 | 90 | 60 | Y7 |
| VALUE 1 | RPT VAL 1 | 90 | 90 | Y8 |
| VALUE 1 | RPT VAL 1 | ... | ... | ... |
| VALUE 1 | RPT VAL 2 | ... | ... | ... |
| VALUE 1 | ... | ... | ... | ... |
| VALUE 2 | ... | ... | ... | ... |
| ... | ... | ... | ... | ... |

DETAIL CLAIMS DATA SET

SPECIFYING A MAXIMUM EXPOSURE VALUE LEVEL OF Y WOULD PREVENT CLAIMS WITH CLAIM TIS BIN GREATER THAN Y FROM BEING IN THE SUMMARIZED CLAIMS DATA SET (E.G. IF THE MAXIMUM EXPOSURE VALUE SPECIFIED WAS 60, THEN THIS RECORD WOULD NOT BE IN THE SUMMARIZED CLAIM SUBSET)

BY VARIABLE

| | REPLACED PART (RP) | *REPLACED PART SUPPLIER (RP) | FAILURE CODE (FC) | SERIES (CH) | MANUFACTURING LOCATION(CH) |
|---|---|---|---|---|---|
| REPLACED PART (RP) | N/A | YES | NO | YES | YES |
| *REPLACED PART SUPPLIER (RP) | YES | N/A | NO | YES | YES |
| FAILURE CODE (FC) | NO | NO | N/A | YES | YES |
| SERIES (CH) | YES | YES | YES | N/A | YES |
| MANUFACTURING LOCATION (CH) | YES | YES | YES | YES | N/A |

REPORTING VARIABLE

CH=CLAIM HEADER  RP=REPLACED PARTS  FC=FAILURE CODES
* SHOWN FOR EXAMPLE ONLY (SUB-ZERO DOES NOT HAVE THIS VARIABLE)

Fig. 39

| REPORTING VARIABLE (TABLE) | BY VARIABLE (TABLE) | ANALYSIS VARIABLE (TABLES) |
|---|---|---|
| | | |
| REPLACED PARTS | REPLACED PARTS | REPLACED PARTS ONLY |
| REPLACED PARTS | CLAIM HEADER | REPLACED PARTS ONLY |
| FAILURE CODES | FAILURE CODES | FAILURE CODES ONLY |
| FAILURE CODES | CLAIM HEADER | FAILURE CODES ONLY |
| CLAIM HEADER | CLAIM HEADER | CLAIM HEADER ONLY |

Fig. 40

COMPUTER-IMPLEMENTED SYSTEMS AND METHODS FOR WARRANTY ANALYSIS

CROSS-REFERENCE TO RELATED APPLICATION

This application claims priority to and the benefit of U.S. Provisional Application Ser. No. 60/702,688, (entitled "Warranty Analysis Systems And Methods" and filed on filed on Jul. 26, 2005), of which the entire disclosure (including any and all figures) is incorporated herein by reference.

TECHNICAL FIELD

This document relates generally to computer-implemented analysis systems and more particularly to computer-implemented warranty analysis systems and methods.

BACKGROUND

In today's challenging marketplace where quality and reliability are at the forefront, warranty and other types of field failure data are becoming increasingly important to analyze and understand. In most practical situations, warranty information provides the closest representation of how a product operates in the customer's hands. However, simply reporting on warranty data is not sufficient because it is reactive, time-consuming, and often times misleading.

SUMMARY

In accordance with the teachings provided herein, a system and method can be configured to receive claims data and products data and to perform statistical analysis of the received claims data and products data. The statistical analysis includes performing a statistical comparison of current claims activity levels in the received claims data with expected claims activity levels. One or more claim issues are detected based upon the statistical analysis. The detected one or more claim issues are provided to a user.

BRIEF DESCRIPTION OF THE DRAWINGS

FIG. 5 illustrates a claim selection component example.

FIG. 8 illustrates a filter management console.

FIG. 11 illustrates a Pareto analysis example when creating a report definition.

FIG. 15 illustrates a report details example.

FIG. 17 illustrates an unadjusted calculation method example.

FIG. 27 illustrates step 2 of analysis processing for summarizing the detail claim records.

FIG. 39 is a table that shows which variable types may be chosen when used together in a single analysis.

FIG. 40 is a table that shows which analysis variables apply based on the source of the reporting/by variable.

DETAILED DESCRIPTION

Figure 1A:
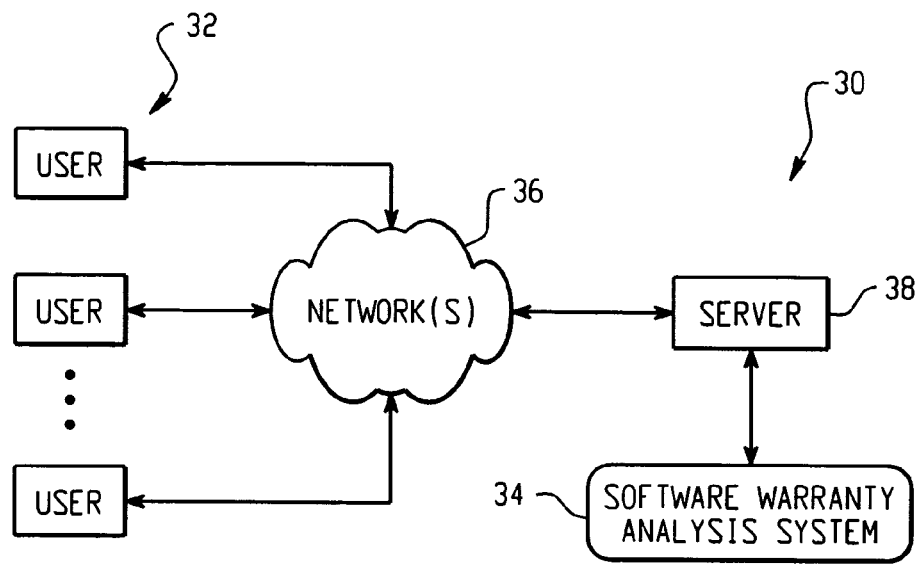
FIGS. 1A-1C are block diagrams depicting software and computer components for performing warranty analysis.

FIG. 1A depicts at 30 an environment wherein users 32 can interact with a software warranty analysis system 34 to analyze claims and/or other aspects associated with a warranty program. The warranty program may assume many forms but typically is a set of contractual rules between an organization and a customer detailing how, and for how long, the organization will cover repairs on a product.

The users 32 can interact with the software warranty analysis system 34 through a number of ways, such over one or more networks 36. A server 38 accessible through the network(s) 36 can host the software warranty analysis system 34. It should be understood that the software warranty analysis system 34 could also be provided on a stand-alone computer for access by a user.

The software warranty analysis system 34 can be an integrated web-based reporting and analysis tool that provides users flexibility and functionality for performing warranty related problem identification, prioritization, and definition for root cause analysis. Multiple data sources (e.g., call center, customer survey, end-of-line audit) could be incorporated to obtain a complete picture of products' field performance.

Figure 1B:
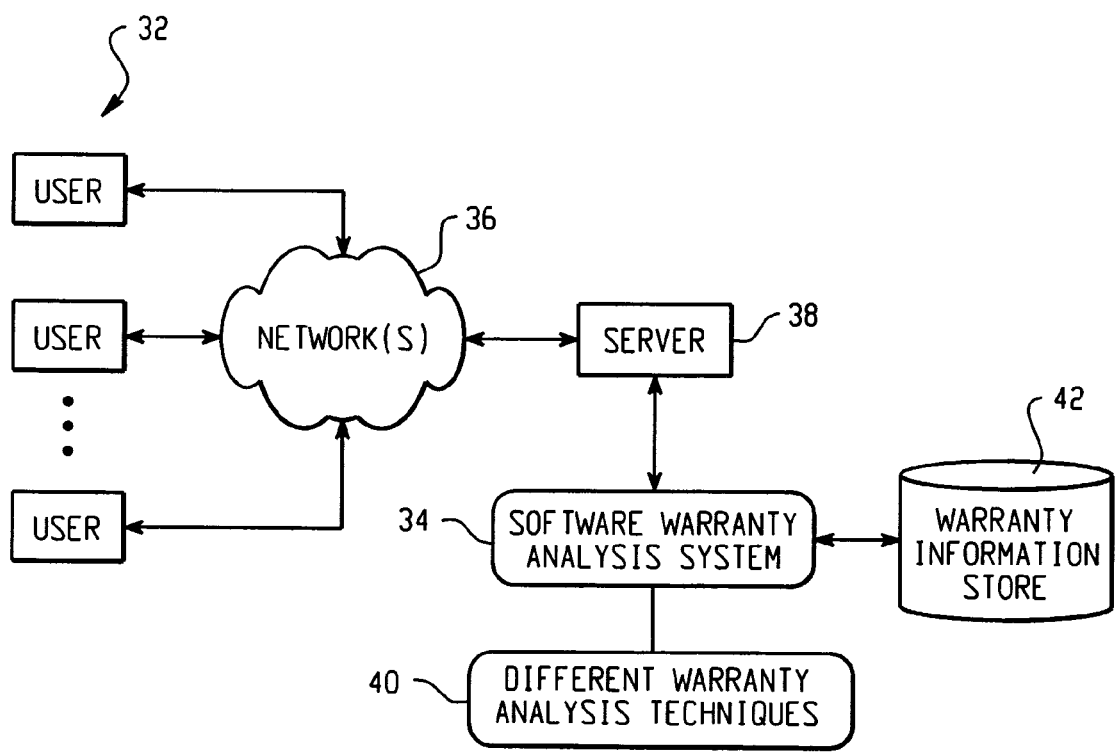

FIG. 1B illustrates that the software warranty analysis system 34 can perform different types of warranty analysis techniques 40 upon the warranty data. By providing a rich assortment of warranty analysis techniques, users can be proactive with the warranty data by using the analytics to surface emerging issues and accelerate the process of identifying problems and analyzing their root causes. Such warranty analysis techniques can include:

Pareto Analysis
Trend/Control Chart Analysis
Exposure Analysis
Trend by Exposure Analysis
Statistical Drivers Analysis
Reliability Analysis
Forecasting
Time of Claim Analysis
Geographical Analysis
Detail Report Analysis
Emerging Issues Analysis
Etc.

Users can create and save to a warranty information store 42 specific filtering criteria to apply to the one or more warranty analyses. These filter definitions can include both product attributes (e.g., production, repair, and sales dates) and claim/event attributes (e.g., claim dates, etc.). Reports can be generated based upon the warranty analysis and the filter definitions.

Figure 1C:
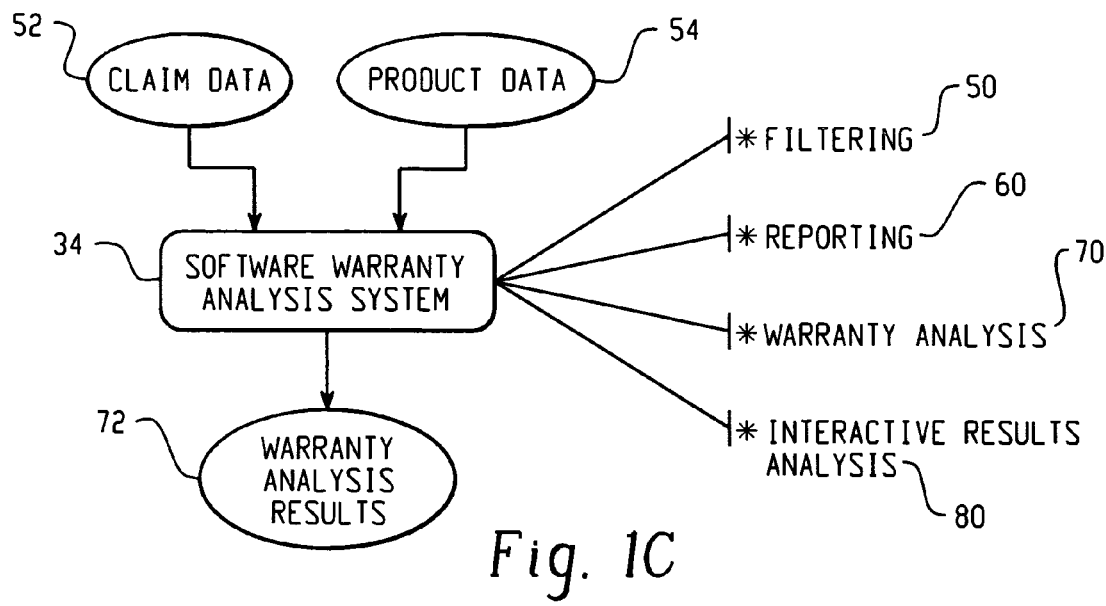

In addition to allowing filtering 50 of the product attributes 52 and claim/event attributes 54 as well as reporting 60 to occur, FIG. 1C illustrates that the software warranty analysis system 34 may also allow users to interact with the results 72 from the warranty analysis 70. As an example of user interaction analysis 80, a user could drill into the subset of information for an individual bar on a Pareto chart to see a trend chart; they could then obtain a list of customer comments related to a spike on the trend chart. The feature-rich set of analytics provides a clear view of not only what happened but also why it may have happened.

The software warranty analysis system 34 may be divided into logical parts to provide ease of use, yet allow for sophisticated analytical investigation. For example, defining which data to analyze can be decoupled from how to analyze it. This means that the same subset of data can be used repeatedly in any number of analyses to reduce the time and space required to perform each pass. It allows flexibility in allowing users to run additional analyses using a specific data point on a chart (e.g., drill-to analysis). This technique provides flexibility in choosing next steps and lends itself well to the natural progression of root cause analysis required by most users.

Figure 2:
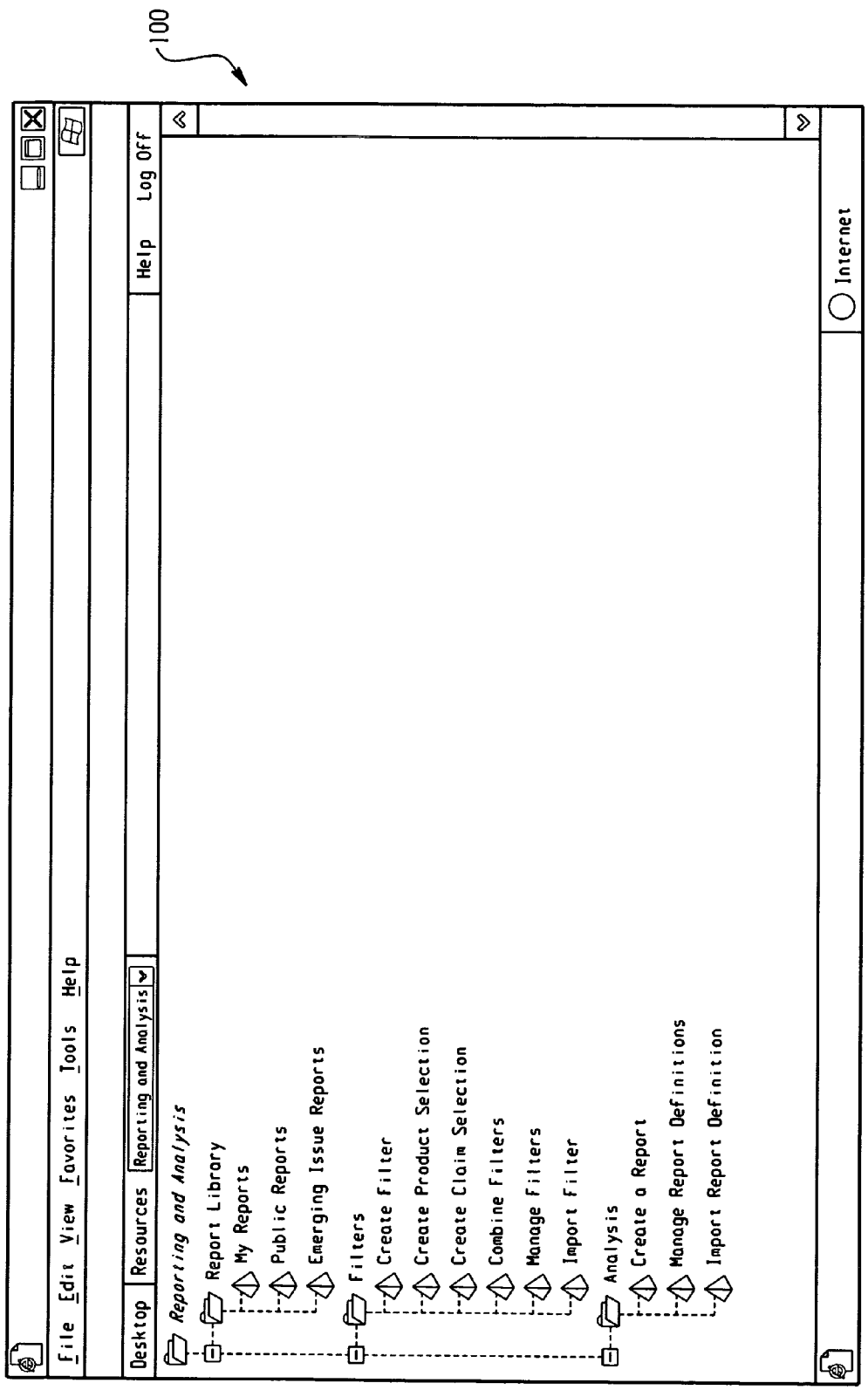
FIG. 2 illustrates a reporting and analysis resource group.

FIG. 2 shows at 100 that resource groups can be used to organize a logical grouping of links to functionality in the application (e.g., create a filter definition, create a report, manage filter definitions, etc.). These links appear in a navigation window on the left-hand side of the Warranty Portal. Administrators grant user access to required resource groups per user. If there is a need to restrict certain users from a section of the application, a resource group can be created to contain only the links applicable to those users. An example might be to create a group for users who can only view report output (because of system interactivity they can interact with the report output to create a child report). They would not be able to create filter definitions or report definitions.

Filtering

Filter definitions are saved information about criteria a user wishes to apply when creating a subset of data for analysis. The following describes a distinction between a filter definition and a filter subset.

A Filter Definition:
Defines what to include in a product or claim subset (in other words, what does the user want to analyze?)
Is not the physical subset of data
Can be used with any analysis
Can be reapplied
Can be copied from other users.

A Filter Subset:
Is only created when running a report
Is reused unless the warehouse is refreshed or the filter definition (or one of its components) is changed
Is the result set of applying a filter definition (physical data sets for products and claims).

Data source type is another term that requires an understanding before proceeding to the filter definition discussion. Data source type is used to distinguish data of different types within the application (if necessary). This separation is either due to the fact that the warranty programs are administered differently or the data itself is generally unrelated (e.g., claim data vs. call center data). Data source type will affect what reporting options are available as well as what values are available within each option. It also affects what elements are available when building filtering criteria.

Figure 3:
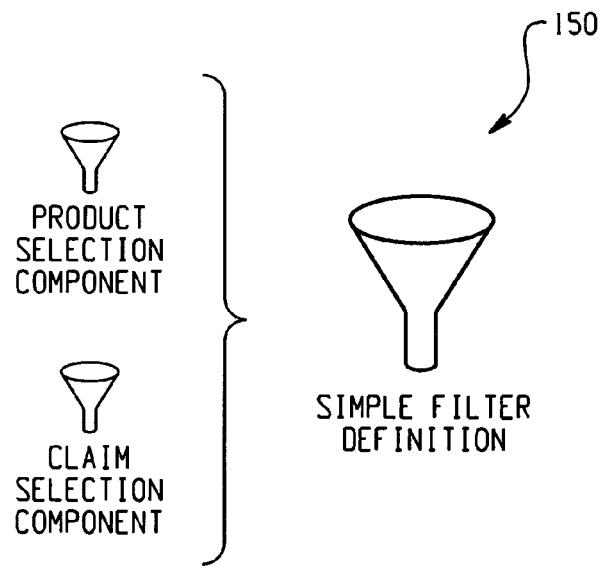
FIG. 3 illustrates a filter definition.

With respect to a filter definition and as shown at 150 in FIG. 3, a simple filter definition is made up of two components of the same data source type. In terms of warranty data, this would include a product selection component and a claim selection component. If other types of data are included, the claim selection may be thought of as an event or issue selection. Either way, there is a component that will define the products at risk and another that will define an issue to analyze for the products at risk. If there are multiple data sources, there will be a product and claim selection component for each.

Figure 4:
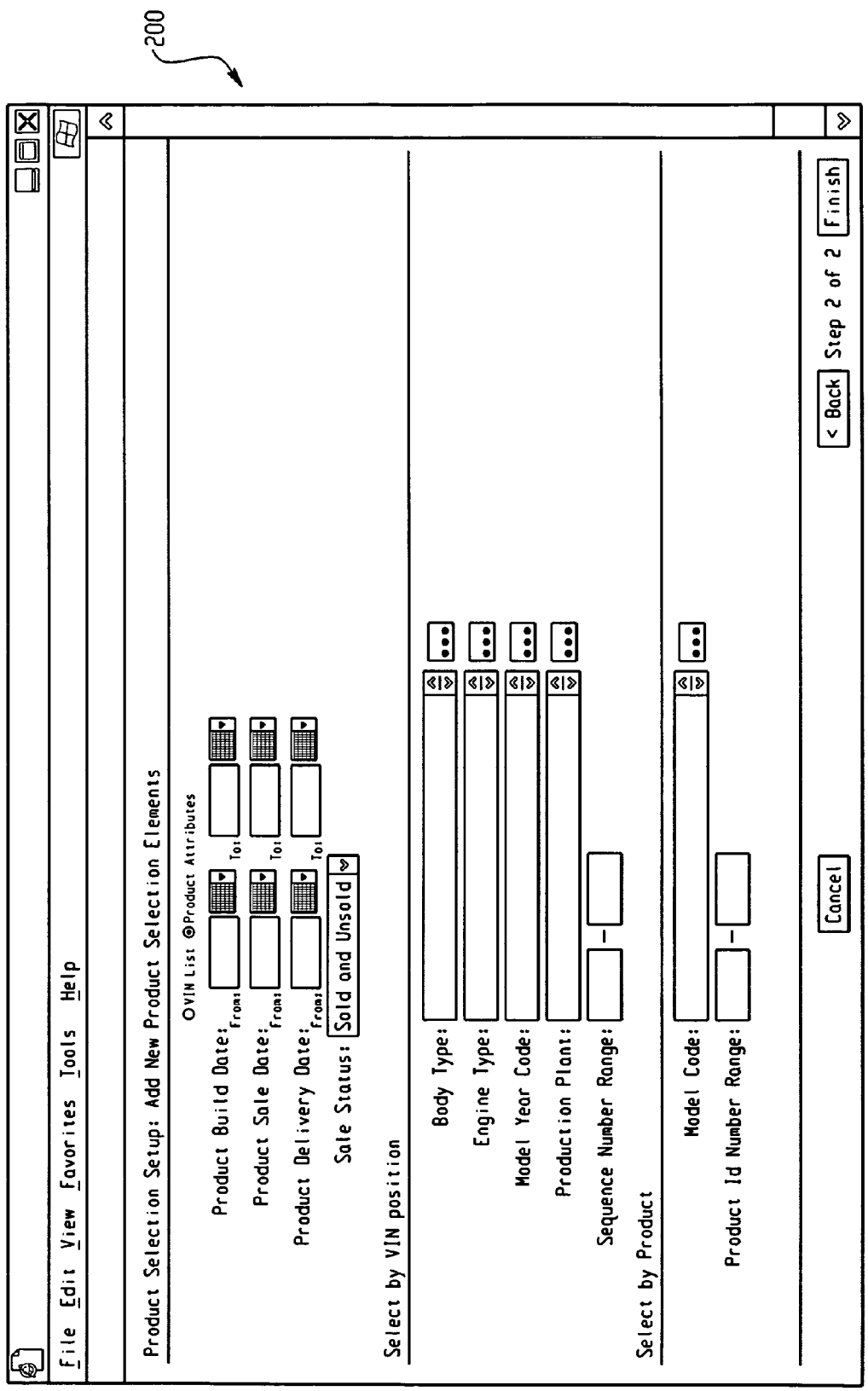
FIG. 4 illustrates a product selection component example.

As shown at 200 in FIG. 4, a product selection component defines the population of products to include (e.g., what products should be considered at risk). Generally speaking, this component will include several aspects that define a product or group of products to include in a product subset. This may include build and sale dates. It may include selection of specific models or production plants. Regardless of the specific elements, it will define what products to include in the analysis.

As shown at 250 in FIG. 5, the claim (or event) selection component defines the specific issue(s) to analyze. Generally speaking, this component will include several aspects that define claims to include in the claims subset. This may include claim dates and claim types. It may include minimum and maximum dollar amounts. It may even include selection of particular labor codes or complaint codes. Regardless of the specific elements, it will define what claims to include in the analysis.

Both product and claim components are configured for each application environment because they are based on customer specific data elements. Each element corresponds to a field in a data store. Behind the scenes, a query will be created that is applied at the time of creating report output. Because the selection elements are configured for each implementation, there is flexibility available in terms of how a selection is made.

Figure 6:
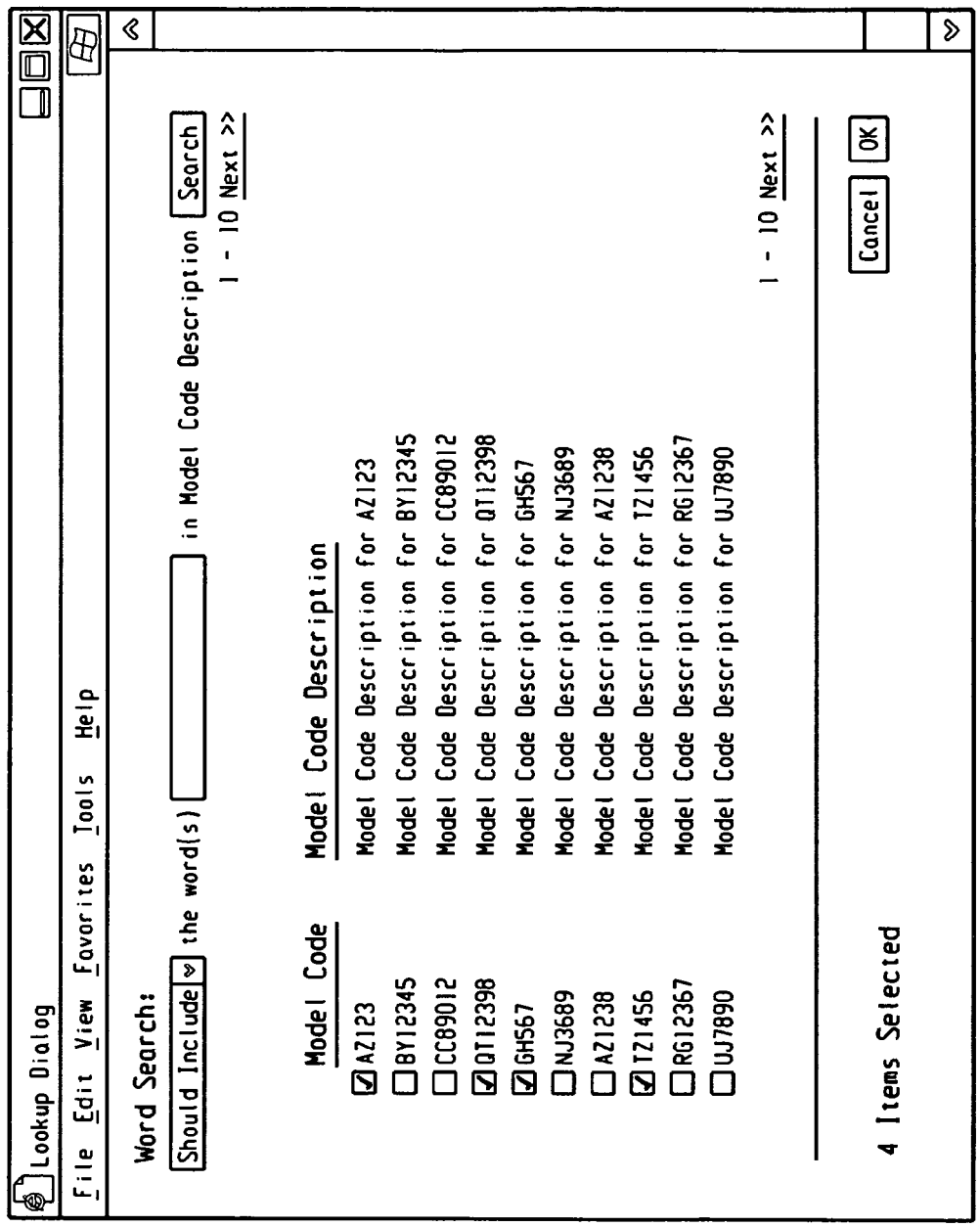
FIG. 6 illustrates a model code lookup dialog example.

For example, selection of model code on a product component may be a drop-down list if there are not too many distinct values. If there are a significant number of values (e.g., more than 100), then a lookup dialog may be used. A lookup dialog is a generic application component that can display codes and descriptions in a tabular, searchable table, which may also be sorted by either the code or the description. The selection is tied to a lookup table (i.e., dimension table), which facilitates maintenance and user interaction. Instead of being faced with a daunting selection of hundreds or thousands of codes, users can search for specific codes or descriptions that meet their own criteria. As shown at 300 in FIG. 6, only a preset number of rows are viewable at one time. Users can page forward and backward through the information to select the values that are pertinent to their analysis.

Elements that are mutually exclusive may be grouped together in a hierarchical (either/or) fashion to prevent users from making contradicting choices. Elements that involve continuous ranges will generally have a field for the minimum value and a field for the maximum value in the range. Again, the specific implementation dictates the elements to include and how to select them. The order and organization of elements are also considered in order to provide an efficient process for the end user.

Now that the product and claim selection components are defined, the simple filter definition can be created. Users type a name and description for the filter definition, and then select the data source type. The data source type determines which product and claim selection components may be selected or built for the simple filter definition. The filter definition setup allows users to either select existing components or create new ones. Either way, once all required selections are made, the user finishes the process, and the information is stored with all other filter definitions and component definitions in the filter management console.

While simple filter definitions provide a great deal of flexibility in defining what data to analyze, users may need to create more complex queries or combine data from different data sources into the same analysis. Creating combined filter definitions provides this capability. Whereas a simple filter definition is limited to a product selection component and claim selection component of the same data source, a combined filter definition allows for grouping based on a data source group. During implementation, rules may be applied to control which data sources may be combined (if any). Generally speaking, if the data elements are completely different, the data sources cannot be combined. Even if data sources cannot be combined, simple filters of the same data source can be combined. This is useful when a user wants to include one product from one specific build year with a different product from another build year, for example. This would not be possible with a simple filter definition alone. The definition would include both products for both years.

Although combined filter definitions may create complex queries, creating them is quite simple via the system. Users type a name and description, and then select the data source group. The final step is to select any of the previously created simple and/or combined filter definitions that are required.

Figure 7:
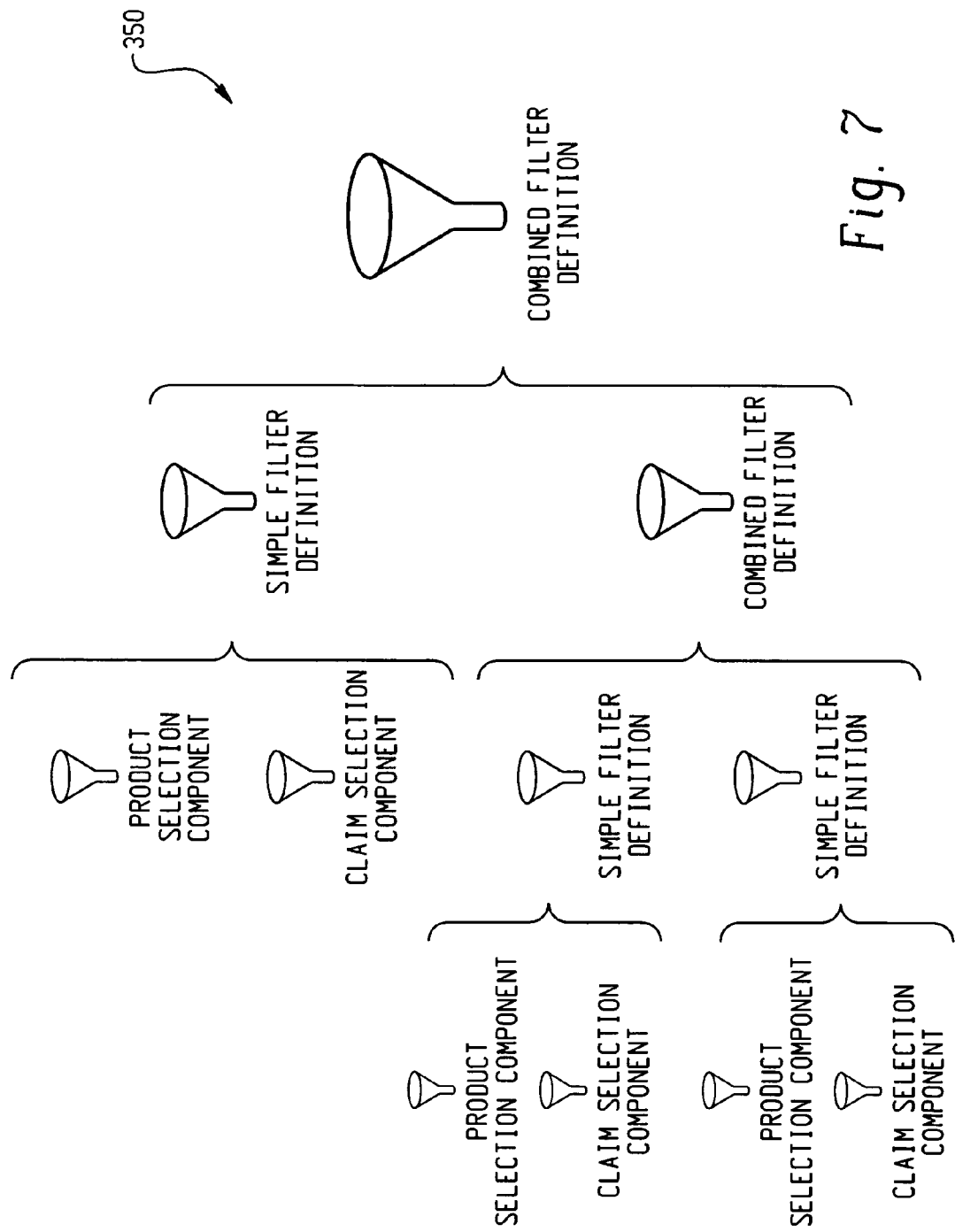
FIG. 7 illustrates a combined filter definition example.

As shown at 350 in FIG. 7, combined filter definitions can be part of another combined filter definition. Once all required selections are made, the user finishes the process, and the information is stored with all other filter definitions and component definitions in the filter management console. A combined filter definition places a logical or condition between each of the selected filter definitions selected.

As shown at 400 in FIG. 8, a filter management console is a user-specific area for interacting with saved filter definitions and components. This means that users manage simple filter definitions, combined filter definitions, and product and claim selection components from the same utility. Both filter definitions and selection components can be duplicated. This is helpful if a user wishes to create a new definition or component that is similar to an existing one.

A system can be configured for managing filter definitions or selection components by providing the ability to edit them. When editing a selection component, users can change all of the selection criteria as well as the basic information about the definition such as name and description; however, the data source cannot be changed. Changing this would render all selection criteria invalid anyway. Editing filter definitions works similarly to creating them. In this case the previously selected values are populated. The user can then make the desired changes (name, description, selected values, etc.). As with selection components, the data source (simple filter definition) or data source group (combined filter) cannot be changed. This would result in the filter definition being invalid.

The console provides an easy way to see basic information about the filter definition without having to go into edit mode. This includes the filter name, description, component type, data source, and the date the filter definition was last updated. It also provides a link that will bring up the specific criteria that make up the filter definition. Finally, it provides a way to clean up any unneeded filter definitions through deletion. As with other Management Consoles, it provides sorting and searching capabilities.

Although filter definitions are generally easy to create, users may want to save time and effort by using another user's filter definition. This can improve consistency throughout an organization. The import process makes a full copy of the filter definition and its respective components. This is used to alleviate issues where one user deletes a filter definition that is being used by another. The import process does not have any linkage to the original user's filter definition. If the original filter definition is changed, the imported definition does not change.

The import process recognizes duplication of a filter definition or one of the sub-components. For example, let's say that a user has a combined filter made of two simple filter definitions. Simple filter 1 might be made of Product selection 1 and Claim selection 1. Simple filter 2 might be made of Product selection 2 and Claim selection 1. The import logic will not create the claim selection twice. It will create it once and use pointers to the single component. The process prevents duplication of components to keep the management of definitions and components to a minimum. This is intended to simplify the user's interaction with the application.

For the import process, the first step is to select a user from whom to copy a filter definition. The second step is to select one of the filter definitions from that user and then edit the name and description if desired. The user performing the import submits the request, and the information is saved with all other filter definitions and component definitions in the filter management console.

Figure 9:
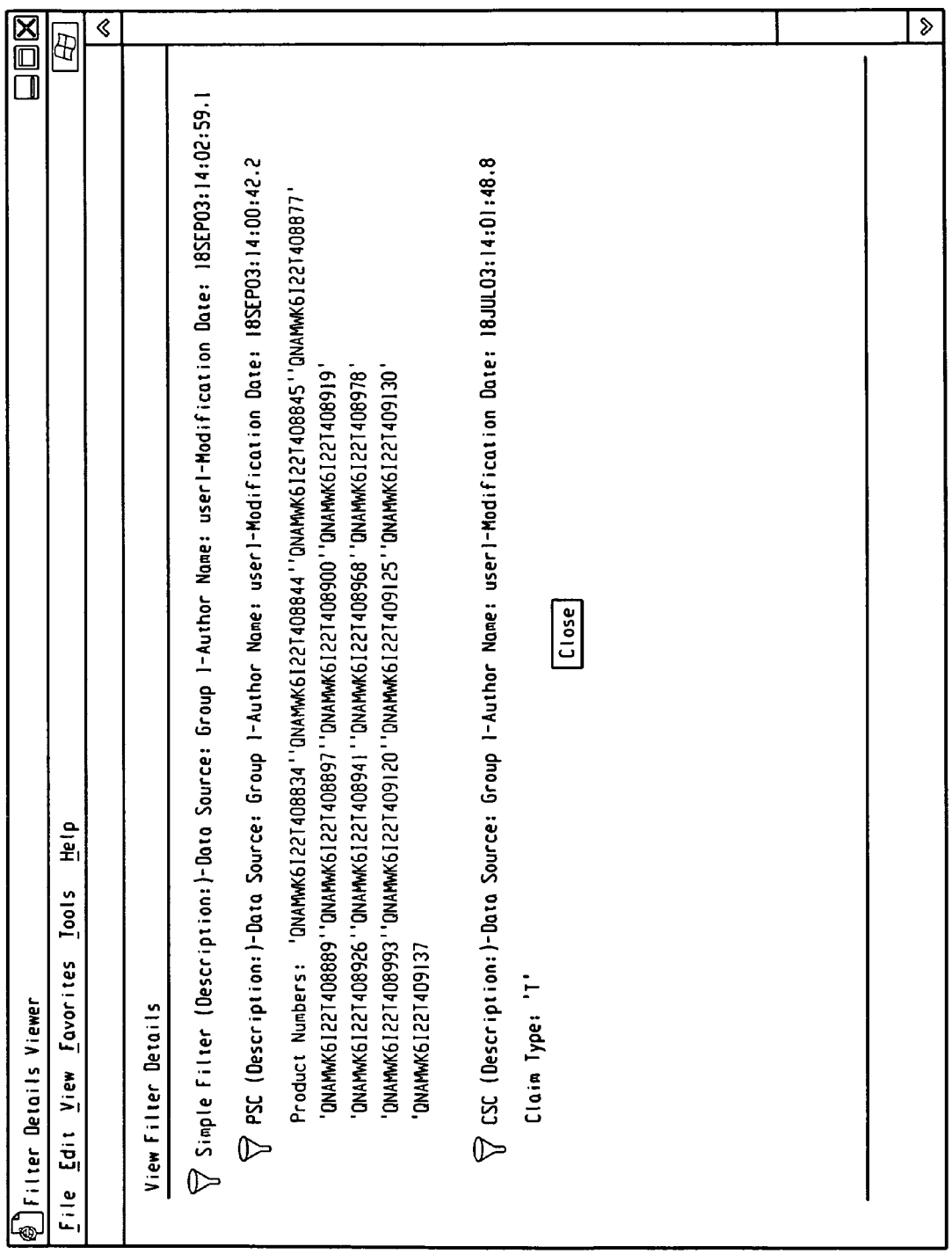
FIG. 9 illustrates filter definition details.

When viewing report output or when managing filter definitions, users need to know what components were used when the filter definition was created. As shown at 450 in FIG. 9, the view filter details option provides this information in an easy to read format. Combined filters can get quite complex. Additionally, this information is automatically included when exporting the report output to either PDF or RTF formats.

Report Definitions

Report definitions link a filter definition to user-selected analysis options. When creating a report definition, a user has a choice about whether to run it immediately (without saving) or to save all the options selected in order to run it at any point in the future without having to repeat the selection of options. This increases efficiency and productivity for individual users; however, because other users may import these definitions, it ultimately benefits the entire user community. From the report definitions management console, users can delete, duplicate, edit, or run their own report definitions. They can also view information about how that report is defined. For users with administrative privileges, report definitions also can be assigned to be run during a scheduled batch process and be assigned a specific report category for automatic submittal to the public reports area. Ultimately, report definitions reduce user effort in performing analysis.

The process for defining a report is basically the same regardless of whether or not the definition is saved. Users select a filter definition and analysis type, and then proceed to make selections that pertain to that particular analysis. The final step is to actually save the report definition. Users should provide a name for the definition. Optionally, they may provide a longer description. Giving the report definition a proper name is useful because this will help in organizing the report definition management console. Users with administrative privileges can also flag the definition to be run when the next scheduled batch process runs and assign it to a report category. When the batch process runs, the report output created is assigned to this category in the public reports area. Editing the report definition may change any of this information.

Figure 10:
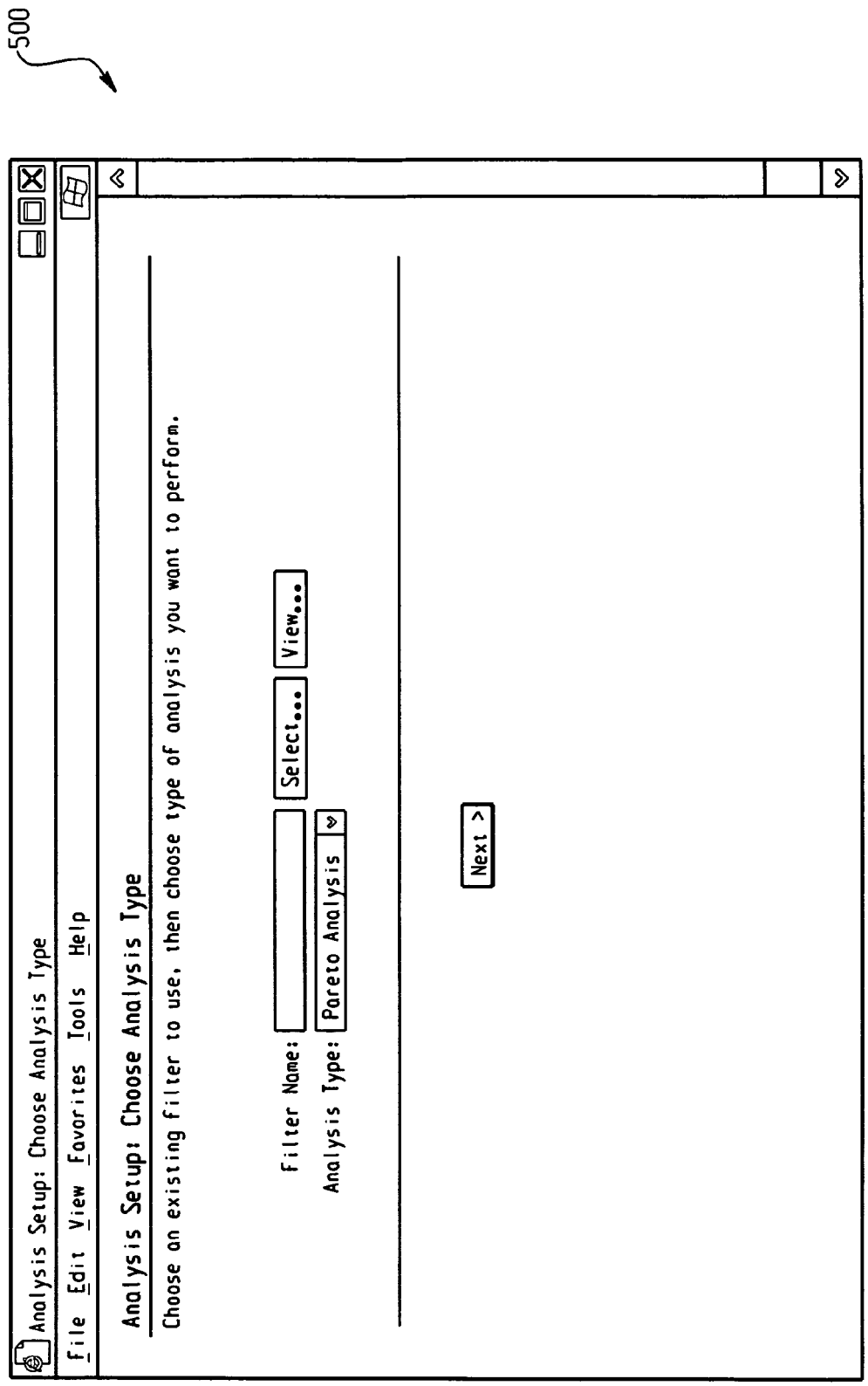
FIG. 10 illustrates creation of a report definition.

As shown 500 in FIG. 10, creating a report begins by identifying what filter definition to use and what analysis to perform (this process is also known as "Analysis Setup"). A system can contain one or more analyses. Different analysis types are described herein.

Once the filter definition and analysis type are chosen, the user is presented as shown at 550 in FIG. 11 with a list of applicable options. The analysis options are specific to the analysis chosen and to the warranty program type for the filter definition chosen. Generally speaking these options will include selection of variables used in the summarization and display of the analysis, options for controlling calculations, options for formatting output specific to the analysis, and user titles and footnote. Once the selections are made, the user can choose to save the report definition or submit it.

Figure 12:
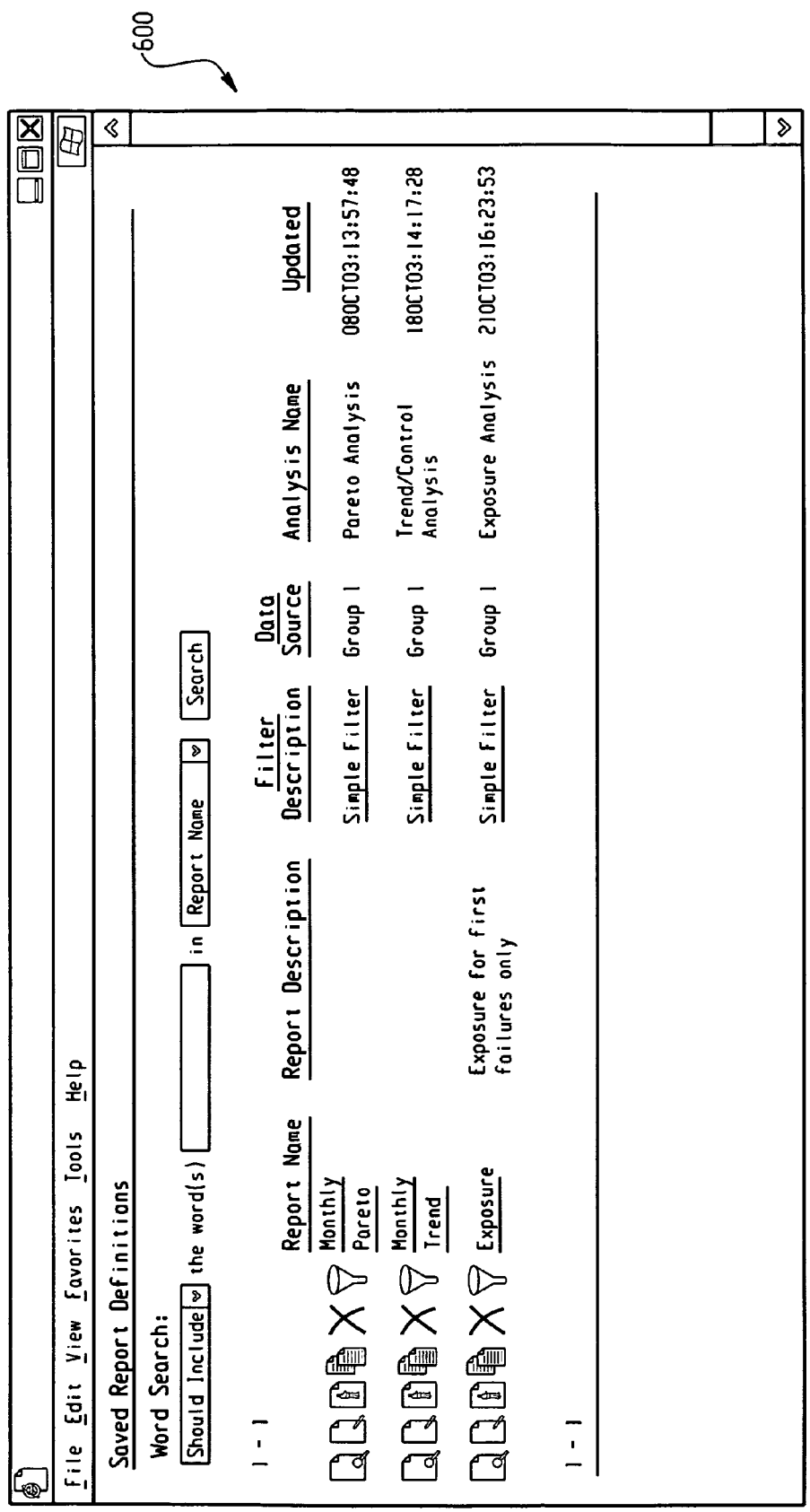
FIG. 12 illustrates a report definition management console.

As shown at 600 in FIG. 12, a report definition management console is a user-specific area for interacting with saved report definitions. Once saved, the report definition can be duplicated. This is helpful if a user wishes to create a new definition that is similar to an existing one. A system can be configured for managing report definitions by providing the ability to edit them. When editing, users can change all of the analysis specific options as well as the basic information about the definition such as name and description (also batch active status and report category for administrators). The filter definition may change, but it should be of the same data source group originally assigned to the report definition. The analysis specific options are dependent on this selection. Finally, the analysis type cannot be changed because most of the options would be different.

Users can save a great deal of time by creating report definitions they will use frequently, then using the "run report now" button on the management console. This will run the request as if the user went through all the steps of creating a report and pressed "submit" instead of "save." The user can see the confirmation screen describing what was submitted. This allows users to run important reports easily after the warranty information store is refreshed.

The report definition management console provides an easy way to see basic information about the report definition without having to go into edit mode. This includes the filter name, analysis type, data source, and the date the report definition was last updated. It also provides links that will bring up even more details about either the options selected or the filter used. Finally, it provides a way to clean up any unneeded report definitions through deletion. As with all other application management consoles, it provides sorting and searching capabilities.

One way to share information with other users is to publish a report to the public reports area; however, users can also import other users' report definitions if they need a starting point for their own analytical investigations or reporting. The import process makes a full copy of the report definition and respective filter definition if required. This is used to alleviate issues where one user deletes a report definition that is being used by another. The import process does not have any linkage to the original user's report definition. If the original report definition is changed, the imported definition does not change.

For the import process, the first step is to select a user from whom to copy a report definition. The second step is to select one of the report definitions from that user and then edit the name and description if desired. Administrative users can change the batch active flag and report category by subsequently editing the newly imported report definition.

Figures 13, 16:
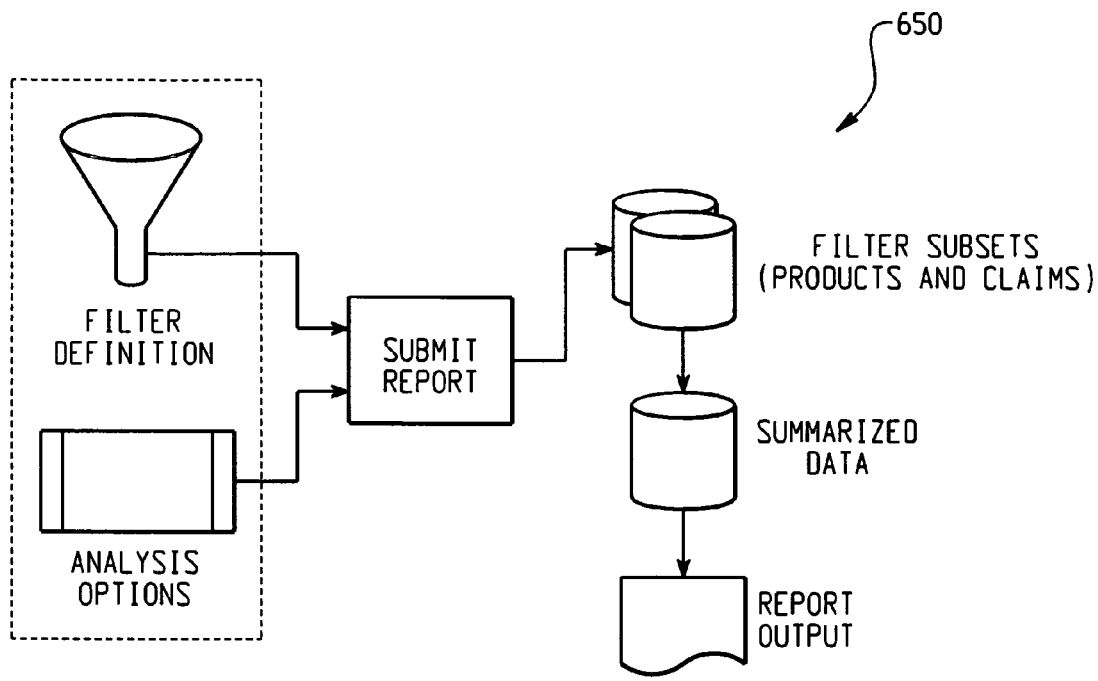
FIG. 13 illustrates overview of submitting a report.
FIG. 16 illustrates different warranty program scenarios.

As shown at 650 in FIG. 13, when a user submits a report definition, a defined process will execute a number of steps, including:
  Create product and claim subsets
  Summarize and perform analysis on the data
  Create report output.

The first major step is to apply the filter definition to create the necessary product and claim subsets used in performing an analysis. These subsets are defined to include all variables necessary for any of the Base Analyses. This allows interactivity with report output. Filter subsets may be reused in subsequent parent reports provided the warranty information store and the filter definition itself have not changed since the previous use. This reduces the amount of time to perform the analysis and the space required to store filter subsets. If a user is creating a child report, the filter subsets are based on the filter subsets of the previous report (whether parent or another child). In any case, child reports do not go directly against the warranty information store.

Once the filter subsets are created, the next step is to apply analytical and summarization rules to the subsets. Although there are some common components, the process differs based on the analysis type and the specific analysis options selected by the user. The result of this step is a summarized data set, which is used in creating the required output. This is the data set users may download to a spreadsheet format for use outside of the system.

The final step is to create the report output specific to the analysis selected by the user. Again, analysis options are applied to format the results. When the user submits a parent report, they are notified by e-mail to look for the output in the My Reports library. When the user submits a child report, the results are displayed upon completion of the process.

When submitting a report definition, the output is classified as being one of two types:
  Parent Report
  Initial output created when running a report definition
  Executes in the background
  User is notified via e-mail when the report completes
  Report output is viewed in My Reports library
  Can be published.
    Child Report
  Created when a user interacts with report output (either a parent or another child)
  Runs interactively
  Cannot be published.

Parent reports run in the background to allow ample time to perform the initial query to create the product and claim subsets. Depending on the criteria specified in the filter definition, this step may take the longest to complete. Once a parent report is created, the user is notified by e-mail. Users view the report output in the Report Library under "My Reports."

Child reports are run immediately when a user submits them. The output is streamed back to the user's Web browser once it completes. No e-mail notification is necessary, and there is no record of the report in any part of the report library. Other than the fact that the report output cannot be published; the format will be the same as a parent report.

Report output is created when data are subset using filter criteria, subsequently summarized through an analytical data preparation process, then formatted and stored for presentation back to the user. In simpler terms, it is the result of applying filter and report definitions (i.e., submitting from Analysis Setup or Run Now from the Report Definitions management console).

The Report Library is a collection of three targeted report output management consoles. My Reports contains user specific report output (e.g., parent report type). Public Reports contain categorized links to reports that users "publish" from their own list of parent reports. Emerging Issues Reports contains a very specific set of analyses run in a scheduled batch process.

When a report definition (saved or not) is submitted, users view the output under "My Reports." This is where users can view information for all of their own previously run reports. Besides displaying such information as report description, filter description, data source, creation date, and indication of whether the report is published, users can view the details of the filter and delete any reports that are no longer needed. Deleting unused reports is performed because report output may take up significant space on the application server. This is the entry point to viewing the actual report output.

My Reports Management Console—features at a glance:
  Entry point to view reports submitted from "create a report" (specific to each user)
  View report output
  View report details (options selected)
  View filter details
  Delete report
  Word search (select report analysis type, filter description, or data source)
  Sort by any column.

The system in this example provides the ability to share results of analysis with other users. When viewing a parent report, a user may choose to publish the report to the public reports area with a specific report category. The Public Reports management console is similar to My Reports in how it presents the list of report output. In this case, it presents a list of all published report output for all users. It displays the same sort of information, such as report description, filter description, data source, and creation date, but it additionally displays the report category and author. Users can also easily view filter details and remove any of their own reports from the public area.

Public Reports Management Console—features at a glance:
  Reports published by individual users or by a batch process (admin)
  View report output
  View report details
  View filter details
  Remove from public area (owner only)
  Subset by report category
  Word search (select analysis type, filter description, data source, or report owner)
  Sort by any column.

Emerging Issues reports that are run via a specific batch process will be automatically published to this area. They are kept separate from other public reports because the report output for emerging issues is somewhat different by design. This also provides an easy way to make this functionality only available to users with access.

Emerging Issues Reports Management Console—features at a glance.
  Emerging Issues reports created via batch process
  View report output
  View report details
  View filter details
  Subset by report category
  Word search (select category, run date, or issues flagged indicator)
  Sort by any column.

Figure 14:
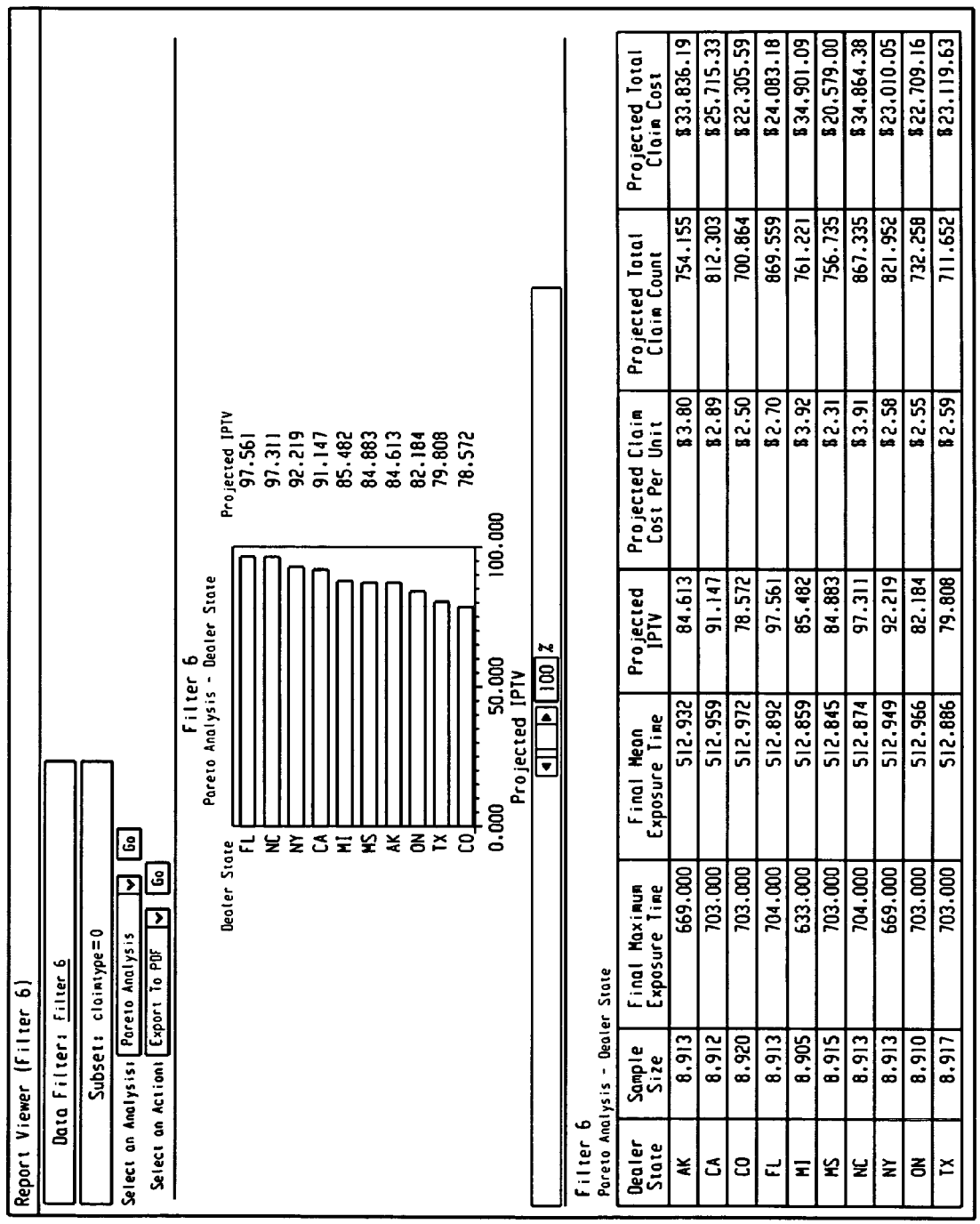
FIG. 14 illustrates a report output example.

As illustrated at 700 in FIG. 14, the system can provide extensive capability to users for improving their root cause analysis process. When viewing output from each base analysis, users are provided tools for easily going beyond the information contained in the output itself. With the exception of detail reports, users are presented one or more graphical representations of the analytical output. Hovering the cursor over an individual point or bar will display detailed information about that specific data point, including the specific values of key variables in the analysis (e.g., analysis variable, sample size, etc.). To make the presentation of information even clearer, all the information presented in the graph is repeated in a summary table. It also includes other calculated variables that are not part of the graph but may be useful for further analysis. The output also displays the filter definition applied and provides a link to view the filter criteria and analysis options chosen.

The system provides the ability to drill on a specific point on the graphical output to further subset the data of the current analysis and perform another one of the base analyses. This is used for improving the problem solving process. Let's say a user sees that a particular plant has the highest rate of issues for a particular component (using Pareto Analysis). Without returning to the warranty information store with a new query, the user subsets the data created in the first analysis using the value of the plant in question just by clicking on the point and selecting an analysis to run. Perhaps the user wants to see a trend by production period to see if the root of the problem is related to a particular production period (e.g., using Trend/Control Analysis). The user may want to view how claims for that production plant are distributed across calendar months (using Time of Claim Analysis). Using the drill-to feature provides nearly limitless paths of investigation by the user; they are not restricted to a single path.

Sometimes users want to use the same subset of information from an analysis to run another analysis. Maybe they wish to simply run the same analysis with a different option such as including a by variable for stratification purposes. Again, without returning to the warranty information store, a user can select any of the base analyses to run with the same exact data used for the prior analysis. Looking at the same data in different ways is another facet that assists in the problem solving process.

While the report output is interactive and valuable for the user, it also needs to be made available to others, regardless of whether or not they also use the application. This functionality is provided through export and publish capabilities. Users can export the report output to either PDF or RTF formats. PDF (Portable Document Format) is the best format for printing because it handles page breaks, unlike the HTML format. Using Adobe Acrobat® Reader software version 5® or greater, users can easily copy both graphic and tabular output and paste it into other documents, such as Microsoft® PowerPoint®. RTF (Rich Text Format) is useful for quickly creating a document that can be opened in Microsoft® Word. Both of these formats are useful when a user wants to share information with others. In addition to the report output, these formats will include the filter criteria applied and the analysis options selected. This is used for communicating exactly how the analysis was defined.

Another output format is CSV (Comma Separated Values), which will output the summarized information from most analyses or the record-level information from the detail report. This format can be opened with Microsoft® Excel and is useful if a user wishes to create a different type of chart. It can also be extremely useful to power users who use a tool like SAS Enterprise Guide® as provided by SAS Institute Inc. By exporting the results of a detail report to the CSV format, a user essentially has all the detail records that made up a particular filter subset. Where this is most helpful is after a user has gone through a series of investigations using drill-to and click-to techniques. The user may wish to see what detail claims (or products) made up a particular summarized point of data.

When viewing a parent report, a user may decide that the information is useful to other users of the application. By publishing the report output, a user can categorize the report and allow others to view the results. An administrator defines the list of available report categories initially during implementation, and then updates it as necessary. The categories should be organized to facilitate finding specific report output. Some examples of report categories might be product teams, engineering responsibilities, or service regions. A link to the report output is placed in the Public Reports management console. Other users may view the output and interact with it as if they had created it themselves. The only restriction is that only the owner of the report can publish it and remove it from the public area.

When viewing report output, users need to know what analysis options were used when the report was created. As illustrated 750 in FIG. 15, the view report details option provides this information in an easy to read format. This is available for all base analyses regardless of the user viewing the output. This information is automatically included when exporting the report output to either PDF or RTF formats.

Batch Reporting

In order to simplify the repetitive requests often required, the system provides capability for running any of the base analyses in a scheduled process. To avoid duplication of effort and to keep control over this process, this functionality is limited to administrators only. Using the report definition import functionality, an administrator can set up any user's request.

To select a report definition for batch execution, an administrator simply flags the report definition as active for batch. The batch process will be scheduled to run after the warranty information store has been refreshed, and it will execute any report definition flagged as active by any administrator. The report will run as if it was submitted as a parent report. The administrator who set up the report is notified by e-mail when the report completes, and the output is viewable in the administrator's My Reports section of the Report Library. If the administrator assigned a report category when saving the report definition, the report will be published to the Public Reports section of the Report Library and assigned to the selected report category.

Using batch reports can be a valuable starting point for general users of the application. This is because the users do not have to create their own filter and report definitions. They can use published batch reports as a starting point to running any other analysis using the same subset of information. Implemented as a best practice, this can reduce the root cause analysis processes across the entire organization.

Management Consoles

Application Management Consoles provide users with simple interfaces for interacting with application metadata (e.g., saved filter definitions or personal report output). The intent is to make basic tasks as simple as possible, so that users can spend the majority of their effort doing analysis rather than administration.

Here is a list of the current Management Consoles:
Manage Filters
Manage Report Definitions
My Reports
Public Reports
Emerging Issues Reports Each of these will provide some basic information presented in a tabular format, displaying only a limited number of rows on a page. This prevents returning an inordinate amount of data to the user's browser at one time, and it keeps the appearance from becoming unwieldy. Usually each column in the console can be sorted, ascending or descending, to make it easier to find a specific row. To simplify that search process even more, most consoles provide at least one type of search technique. The search feature allows the user to look for a word or words in one of the columns in the console. The result of the search is only those rows that have a match based on the criteria specified. Sorting of columns is also allowed on this subset. Some consoles have an additional type of search that is simply based on a category of information. For example, the Filter Management Console allows users to choose a single component type to view. Only one type of search may be applied at one time, and applying a search clears any previous search.

The information presented is dependent upon the specific purpose of the Management Console, but generally it will provide enough detail to describe a unique entry (e.g., descriptions, dates, user names, categories, etc.). Users can perform actions by clicking on icons or descriptions provided on each line of detail. The actions may include editing or deleting a record, for example. It may also allow the user to view additional information such as filtering or reporting details. Again, it all depends on the specific Management Console.

Warranty Data Analysis

The following describes functionality of an example of a warranty analysis system or application. The following illustrates that warranty data analysis is a broad term that should mean many different things. At any given point in time, the application can enable the user to access the type of analysis needed, based on the business question being asked.

A warranty program is a set of contractual rules between an organization and a customer detailing how, and for how long, the organization will cover repairs on a product. The type of warranty program offered on a unit and how it is administered will determine the amount of information available for any type of report or analysis. Two factors that can affect the type of warranty program offered and, in turn, the amount of information collected and warranty data analysis, are: (1) the warranty program dimension, and (2) whether or not sales data is available for all units in the population that are at risk of having a claim (i.e., those units which have had a claim and those that have not). A third factor that may also have an effect on warranty data analysis is the type of repair/replacement program offered. The assumption within the application is that the warranty program offers free repair/replacement of units. Other business rules may need to be implemented if this is not the case in your organization.

All warranty programs have some measure of usage associated with them that will indicate how products are covered under warranty (e.g., time, mileage, hours, etc.). The dimension of a warranty program identifies the number of measures of usage incorporated into the warranty coverage rules. Most warranties fall under two categories, one-dimensional or two-dimensional. One-dimensional warranty programs are usually bounded solely by time (e.g., 1 year warranty on an appliance or consumer electronic). Two-dimensional warranties are bounded by time and some type of usage, such as mileage or hours (e.g., 3 year/36000 mile warranty on a car sold in North America).

The second factor that affects methods for analysis is whether or not sales data is available for all units that are at risk. A unit at risk is defined as a unit that is in service (i.e., in the customer's hands) and has a warranty obligation attached to it. Typically, production data is always available for all units that are at risk (independent of whether or not sales information is known). However, sales data may not be known until the customer sends in a registration, a claim is submitted on the unit, or the manufacturer or its dealer sells an extended warranty for that particular unit. If sales data is not known on all units that are put into service, other adjustments should be made in the analyses to better estimate what is happening in the field. Therefore, whether or not sales data is available on all units will dictate how some analyses will be processed and what analysis options are available to the user.

Combining these two factors that affect warranty data analysis, there are four possible situations. These are shown at 800 in FIG. 16.

These four different scenarios are referred to as warranty program types:

Type 1—One-dimensional warranty program and sales data

Type 2—Two-dimensional warranty program and sales data

Type 3—Two-dimensional warranty program and no sales data

Type 4—One-dimensional warranty program and no sales data

The different warranty program types will result in different calculation and data summarization processes being applied in the analysis process. They will also result in different analysis options being presented to the user. In most circumstances, one warranty program type would be configured within a single implementation of the application; however, it is possible to implement more than one warranty program type within the same instance of the application if the situation dictates the need. The application addresses warranty program types 1, 2, and 4. As shown below, warranty program type 3 can be handled with customization.

Performing analysis with warranty data presents a number of challenges. For one thing, claims data originates from a claims payment system. It is opportunistic data collected to reimburse dealers. The advantage of this is that data is regularly collected for claims administration purposes, and therefore there are no additional costs of collection when compared to field reliability test data. The disadvantage is that the data may be incomplete or have idiosyncrasies that should be managed before analysis is possible.

Another challenge is that warranty analysis is limited by what data is collected based on the type of warranty program offered. One example is when warranty coverage runs for a fixed period of time after the sale of the product but at any given time the manufacturer does not know the exact number of units sold or dates of sales on sold units (i.e., Warranty Program Type 4). In this situation, retailers and purchasers do not usually submit this information until a claim is made, if at all. Therefore, the number of units in service, and the distribution of their age, will have to be determined by other analytical methods, dependent on the data available. Another example is when warranty coverage has dual time and usage limitations (i.e., Warranty Program Types 2 or 3). In this situation, the manufacturer knows the dates at which all items were put into service and the days and usage (e.g., mileage) on those units when warranty claims were made. However, the manufacturer does not know exactly how many units are in service and still under warranty at any given point in time because items that still fall under the warranty time restriction may be past the usage allotment. In addition, the manufacturer does not know the usage (e.g., mileage) of the products still in service and in the exposure group (population at risk). This poses an analytical challenge that should be dealt with to prevent results from being misrepresented. The relationship between the usage of a product and its time in service needs to be determined and applied to the analyses.

Furthermore, the age base of the population should play a role in the analyses. Because units enter service (are sold) over time (staggered entry into the population), the amount of time an individual unit was at risk of having a claim varies across the units in your population. The age base of the population refers to the collective age distribution for all units that could have a claim, relative to a given date. Depending on the business question that needs to be answered, results may be misleading if the age base of population is not considered (i.e., results from analyses may be misleading if a unit that is 12 months old is treated the same way as one that is 3 months old).

The terms reporting and analysis are often used synonymously when talking about warranty data. However, the application can be built to treat these terms as two distinct concepts. These two concepts are differentiated by the analysis type and analysis options applied.

Reporting is defined as simply quantifying what has occurred without making any assumptions or adjustments to the calculations or for unknowns. For example, with respect to Warranty program types 3 and 4, the sales date for all units that are in service would be an unknown. This provides a reactive, historical viewpoint of warranty data. Analysis, on the other hand, is interpreted as presenting results that better depict/model what's happening. In other words, adjustments and assumptions are applied to the calculations in order to more realistically quantify the claims activity that is occurring.

Distinguishing between these two concepts will assist users in understanding the analyses and the analysis options made available within the application and how they should be used. For example, one of the challenges of warranty data analysis is staggered entry of units into the population at risk which means, at any point of time, units in the population at risk have varying amounts of time in service (age). When quantifying claims activity on this group of units, you may or may not account for the age differences among the units at risk. Not accounting for the age base of the population results in the generation of a report. What claims activity has occurred is quantified, however it does not provide a true picture of reality since the calculations treat younger and older units as being at risk for the same amount of time. Accounting for the age base of the population results in a more analytical based quantity calculated to represent the claims activity. Whereas the latter value may not exactly quantify what the organization has experienced or paid out (if the quantity is related to dollars), it identifies what the organization may be liable for as the units age and provides a more complete picture of the claims situation.

Both reporting and analysis are components to understanding warranty problems, and both have a place in warranty data analysis. Which approach to use, and when, is dependent on the business question or problem the user is trying to solve. The application provides users the tools to address tasks that fall under both concepts.

With respect to analysis-related terminology used herein, the reporting variable is the variable whose values are used in summarizing the analysis variable. For example, if an analysis summarizes the total cost of claims by part number, then part number is the reporting variable; total claim cost is the analysis variable. The list of available reporting variables is dependent on the analysis type, although there will be some commonality. In many cases, the user when creating a report definition selects the reporting variable; however, for some analyses the selection is implicit. Reporting variables should be categorical (i.e., discrete statistical variable), and they should be directly or indirectly part of the claims data (i.e., part of the warranty claim or linked to the claim through a unique product number).

The by variable identifies criteria by which to stratify an analysis. Adding to the example for reporting variable, if an analysis summarizes the total cost of claims by part number by plant code, then plant code is the by variable. The by variable is not available for all analyses, but when it is, it is an optional selection. The list of available by variables is dependent on the analysis type, although there will be some commonality. The by variable should be categorical, and it should be directly or indirectly part of the claims data (i.e., part of the warranty claim or linked to the claim through a unique product number). In report output, the by variable will either produce separate overlaid lines or separate complete charts for each distinct value of the variable. This also depends on the analysis type.

To minimize processing time and to prevent unreadable or out of control output, each analysis has a default maximum number of allowable distinct values for the by variable. If the by variable threshold is exceeded, then the analysis will execute as if no by variable was specified and provide the user with a message in the report output to indicate that this happened. To accommodate user needs, all by variables should be part of the filtering criteria. This will allow them to circumvent this restriction and to look at only the values that truly matter in their analysis.

The analysis variable identifies the quantitative variable that is summarized when creating an analysis. As with reporting and by variables, the list of available analysis variables is dependent on the analysis type, although there will be some commonality. In many cases, the user when creating a report definition selects the analysis variable; however, for some analyses the selection is implicit.

The system includes four analysis variables by default—total claim count, total claim cost, claim count per 1000 units (or some other number of units), and claim cost per unit. Other analysis variables may be added as long as they can be mapped to a quantitative variable on the claims data. For example, a total labor cost or a labor cost per unit analysis variable could be added provided that a labor cost quantitative variable resides on the claims data.

Although the analysis variable is a focal point in a user's analysis, other calculated variables are included in the summarization. This can reduce user effort by providing more information at one time. The analysis variable type (count or rate) will determine which additional calculated variables are included:

Count type—calculates Total Claim Count, and Total Claim Cost

Rate type—calculates Total Claim Count, Total Claim Cost, Claim Count per 1000 Units, and Claim Cost per Unit.

Any additional analysis variables will also include the variables calculated based on the analysis variable type. For example, if total labor cost (a count type variable) is added, Total Claim Count and Total Claim Cost will also be calculated for the analysis.

To process, analyze, and report on warranty claims data within the application, there should be a business rule in place that will bucket claims and product data in a logical fashion. The bucketed data would then be used in the reporting and analysis processes going forward. This will provide processing efficiencies and simplify the calculations that should take place.

By default, the application will bin claims and product data into 30-day buckets, referred to as time in service bins. Claims data will be bucketed into claim time in service bins while product data is bucketed into product time in service bins. The 30-day quantity, referred to as the usage bin length, was chosen because it is most prevalent in industry. It may be set to a different numeric value as desired by the customer, however only one value can be used per implementation. Product Time in Service and Claim Time in Service terms are defined further below.

Product time in service identifies the amount of time that a product has been in the customer's hands. For each unit, it is defined as the date when the warehouse was last refreshed minus the date that unit went into service. The definition of the in service date is dependent on the warranty program type.

For warranty program types 1 or 2, the in service date of a unit would be its sales date. When the in service date of a unit is missing (i.e., representing an unsold unit), the Product Time in Service for that unit would be 0.

For warranty program types 3 or 4, the in service date of a unit may be either the date the unit was sold or the date the unit was built. This results in two product time in service values being calculated: (1) Product Time in Service from build, where the in service date used would be a unit's build date, and (2) Product Time in Service from sale, where the in service date of a unit would be its sales date. If the sale date of a unit is missing, then Product Time in Service from sale would be missing. Product Time in Service from build should not be missing for any units.

Claim Time in Service identifies the amount of time that a product has been in the customer's hands at the time of a claim. For each claim, it is defined as the date of the claim minus the in service date of the unit. Similar to product time in service, the in service date used is dependent on the warranty program type.

For warranty program types 1 or 2, the in service date used would be the sales date of the unit. If the calculated value for claim time in service is negative (i.e., the sales date is greater than the date of the claim) or if the in service date of the unit is missing (i.e., the claim occurred while the unit was unsold), then the Claim Time in Service for that unit would be 0.

For warranty program types 3 or 4, the in service date of a unit may be either the date the unit was sold or the date the unit was built. This results in two claim time in service values being calculated: (1) Claim Time in Service from build, where the in service date used would be a unit's build date, and (2) Claim Time in Service from sale, where the in service date of a unit would be its sales date. If the calculated value for Claim Time in Service from sale is negative or if the sale date of a unit is missing, then Claim Time in Service from sale would be 0. Claim Time in Service from build should never be negative because a claim cannot occur on a unit before it is built.

All claim and product time in service values, whichever may be applicable given the warranty program type, will need to be bucketed into claim and product time in service bins, respectively. All units should be placed in a product time in service bin and a single unit cannot fall into more than one bin. All claims should be placed in a claim time in service bin and a single claim cannot fall into more than one bin.

By default, a business rule creating x-day bins can be applied, where x represents the Usage Bin Length. Using the default value of 30 (specified above) for the Usage Bin Length, the business rule that would be applied to bin any time in service value would be as follows:

(1) Time in service values between $30(x-1)+1$ and $30(x)$, inclusive, are assigned to the $30(x)$-day time in service bin (x=1, 2, 3, etc.).

(2) All time in service values of 0 would be assigned to the 0-day time in service bin.

For example, Product Time in Service from sale values between 1 and 30 would be bucketed into the 30-day product time in service from sale bin. Similarly, values between 31 and 60 days would go into the 60-day bin, values between 61 and 90 days into the 90-day bin, and values between 91 and 120 days into the 120-day bin, etc. Units having a Product Time in Service from sale value of 0 would be put into the 0-day bucket.

The maximum exposure value identifies a claim time in service threshold value allowed when calculating the analysis variable. It identifies the maximum claim time in service value that a claim can have for that claim to be counted in the analysis. For example, if a user specifies a maximum exposure of 90 days, then only those claims having a claim time in service bin of 90 days or less will be included in the analysis. Essentially this is another type of claim filtering criteria. It is provided as an analysis option (instead of as a filter definition element) to keep the application more flexible.

The list of maximum exposure values is the same as the claim time in service bins (e.g., 30 days, 60 days, 90 days, etc.).

The maturity level specifies the minimum product time in service value allowed when calculating the analysis variable. It identifies the product time in service value that a unit should have accumulated for that unit and any claims activity on that unit to be counted in the analysis. For example, if a user specifies a maturity level of 90 days, then only those units and claims that have greater than 90 days in service will be included in the analysis. Essentially this is another type of product and claim filtering criteria. It is provided as an analysis option (instead of as a filter definition element) to keep the application more flexible. The list of maturity level values is the same as the product time in service bins (e.g., 30 days, 60 days, 90 days, etc.).

A pre-delivery claim is a claim that occurs on a unit prior to that unit being put into service (i.e., claim time in service of zero). The option of including or excluding pre-delivery claims is not available for all analyses. Note that this option really has no effect for warranty program types 3 or 4 when the Time in Service Point of View is from build. In this situation, claim time in service would be zero if a claim were made the day the unit was built. While this is possible, it would typically be unlikely.

Calculation Methods

The warranty solution provides two distinctly different analytical options (or methods) for calculating an analysis variable such as a warranty claim rate. The two methods made available are:

(1) Unadjusted calculation method
(2) Adjusted calculation method.

Which method to select depends on how the user wishes to handle information regarding the age base of the population that can accrue claims (i.e., the population at risk). Recall that units enter the at risk population over time (i.e., staggered entry into the population). As a result, at any given point in time, units in the population at risk will fall into a number of product time in service bins (i.e., the age base of the population spans a number of age values). Some units will be older than others. The selection of the calculation method would identify whether or not units of varying age should be treated differently or the same.

The unadjusted calculation method (also referred to as the as is method) essentially makes no adjustments to the calculation of the analysis variable to account for the varying ages of units in the at risk population. The claims and units in operation are treated "as is". Total claim count and cost would simply be the total number of claims and total costs of those claims, respectively, across all applicable time in service values. Furthermore, the warranty claim rate would be the total number of claims across all applicable time in service values divided by the total number of units in operation and claim cost per unit would be the total cost for all those claims divided by the total number of units in operation. FIG. 17 illustrates at 850 an example of an unadjusted calculation method.

The adjusted method (or the projected method) takes the calculation one step further by accounting for the fact that the units in operation do not all have the same age or time in service.

Figure 18:
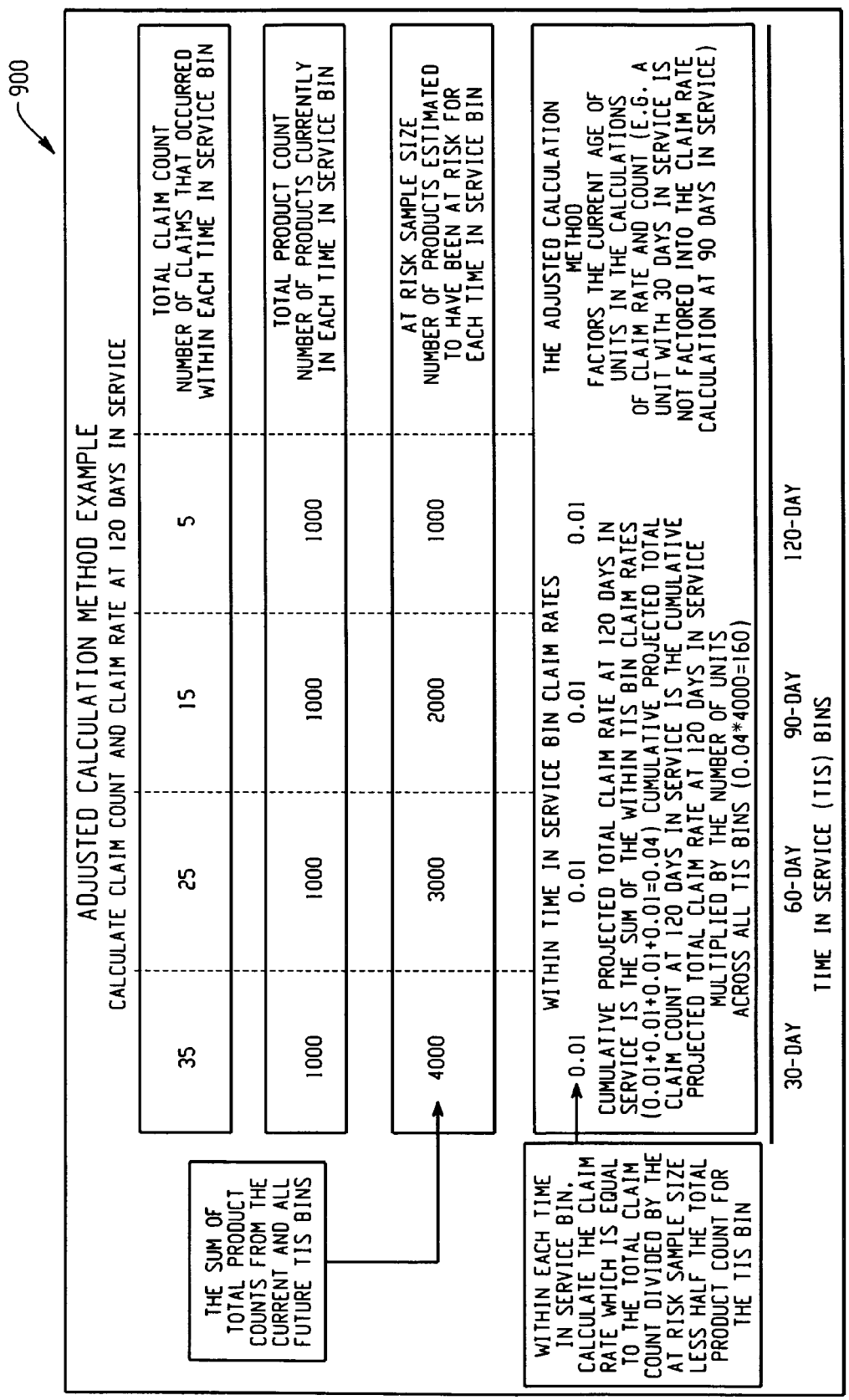
FIG. 18 illustrates an adjusted calculation method example.

The adjusted method accelerates the life of all units in operation to the maximum claim time in service value in the data or the maximum exposure value specified. The claims are grouped by time in service bins. Units in operation are also grouped by time in service bins with respect to the total number of units that are in or have passed through the given bin (interval). These are referred to as the total number of units at risk. This organization of data allows for the system to calculate claim rates and cost per unit rates for each given time in service bin (interval.) These rates, once calculated, are summed up across all intervals to determine the overall warranty claim rate and cost per unit, respectively. Once the claim rate is calculated, then the projected number of claims and projected costs can be calculated by multiplying the total population of units against the calculated cumulative claim rate and cumulative cost per unit rates, respectively. FIG. 18 illustrates at 900 an example of an adjusted calculation method.

Figure 19:
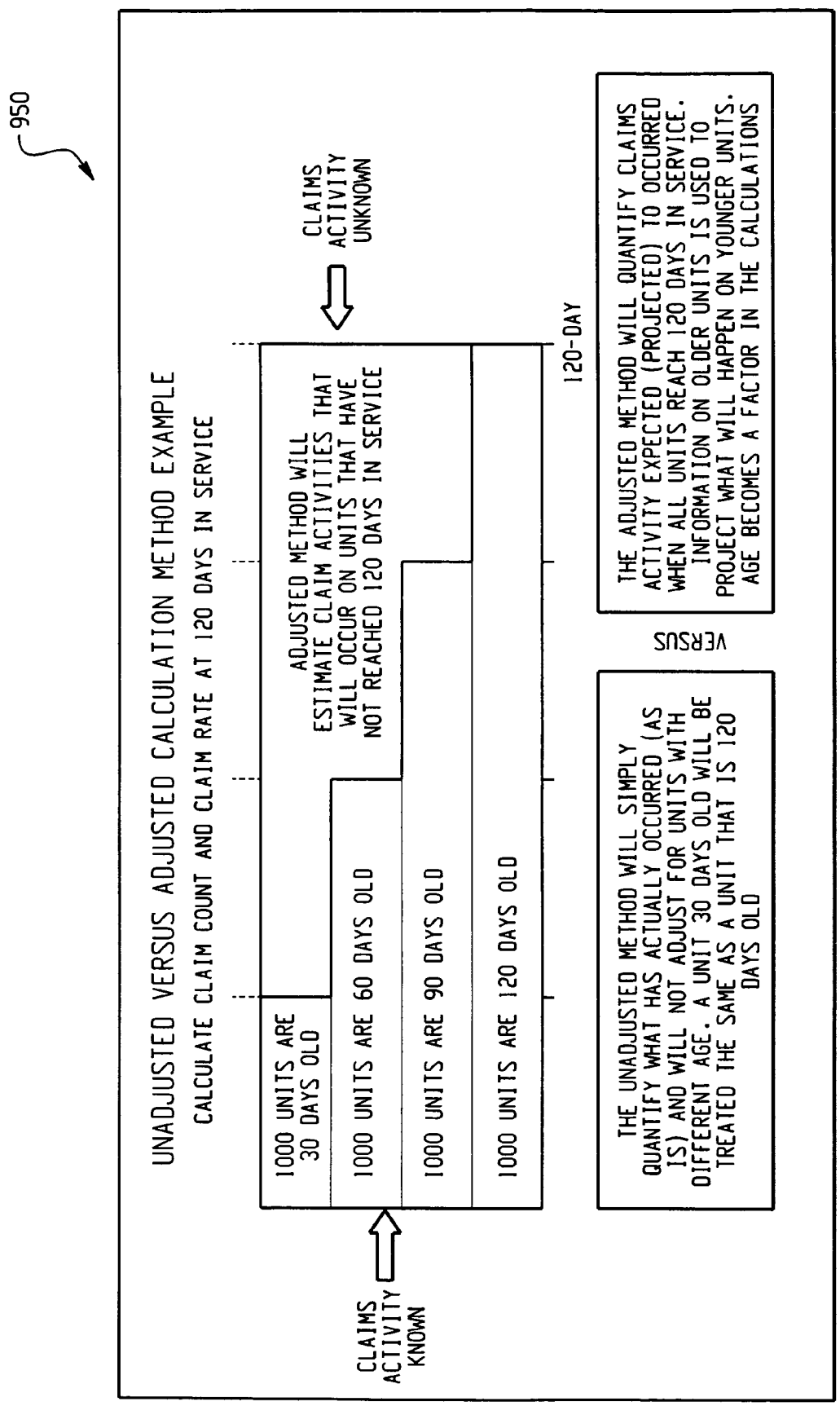
FIG. 19 illustrates an unadjusted calculation method versus an adjusted calculation method.

Which method to choose depends on what question the user is trying to answer. If you want to know what your total warranty cost is as of today, choose unadjusted because that is going to be your actual liability. The unadjusted method is often used to simply quantify the claims activity that has occurred. If you want to know what your warranty claim rate would be had your entire population of products been sold on the same day and aged to say time in service period, then use the adjusted method to ascertain a projected rate. The adjusted method would provide a more fair and balanced estimate to quantify claims activity (e.g., claims cost, claims count) whether it is for comparison purposes across different groups of units, or to simply provide projected values of certain quantities expected when all units achieve a certain age. The comparison between the two methods is further illustrated at 950 in FIG. 19.

The selection of the calculation method is independent of the selection of the analysis variable, and the two selections together, possibly along with other analysis options, will define what processing is to take place.

Usage Profiles (Warranty Program Types 2 or 3)

Some of the challenges encountered in the reporting and analysis of two-dimensional warranty programs are: (1) the program's dual timeline (time in service, often reported in days or months, and some sort of usage accumulation, such as mileage), and (2) the fact that a unit will fall out of warranty coverage when it exceeds a certain time in service value or a certain usage amount, whichever comes first (e.g., 24 months in service or 24,000 miles). To more accurately analyze what the warranty data is indicating, one should consider both perspectives in the calculations (apply usage profiles) as their relationships are not independent. Users will be given the option to apply usage profiles to their analysis where appropriate.

Figure 20:
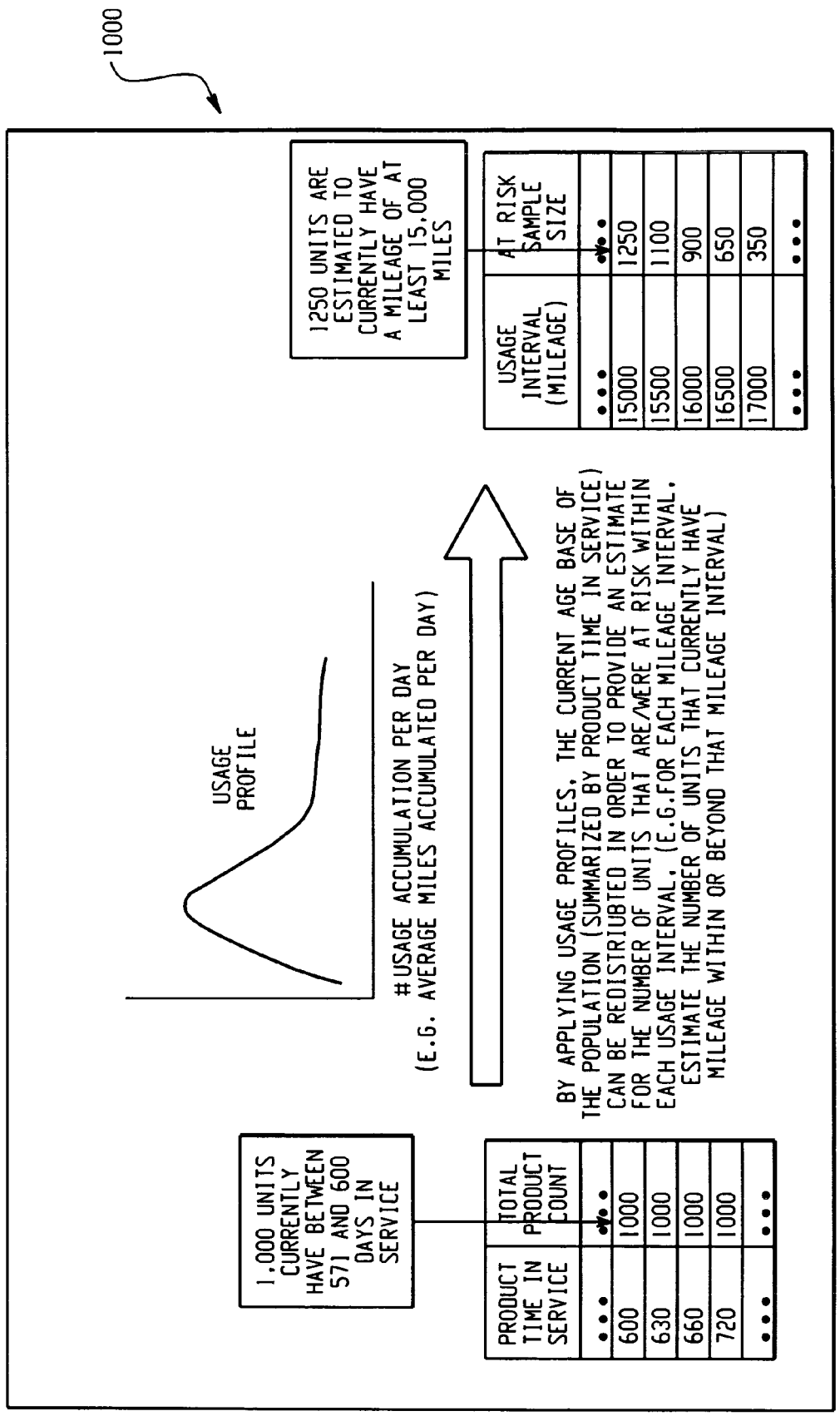
FIG. 20 illustrates applying usage profiles to redistribute data from a 2-dimensional warranty program.

Usage profiles may be applied in two different situations:
(1) If a report is generated in terms of the usage dimension, then the usage profiles can be applied to depict the population at risk by the usage dimension. If applied, the usage profile redistributes the population at risk from a time in service perspective to a usage (e.g., mileage) perspective (see FIG. 20 at 1000). This is applicable for the reliability analysis.
(2) In various analyses, it can account for units estimated to have dropped out of warranty coverage by exceeding the usage dimension prior to the time dimension, preventing warranty activity from being understated.

Figure 21:
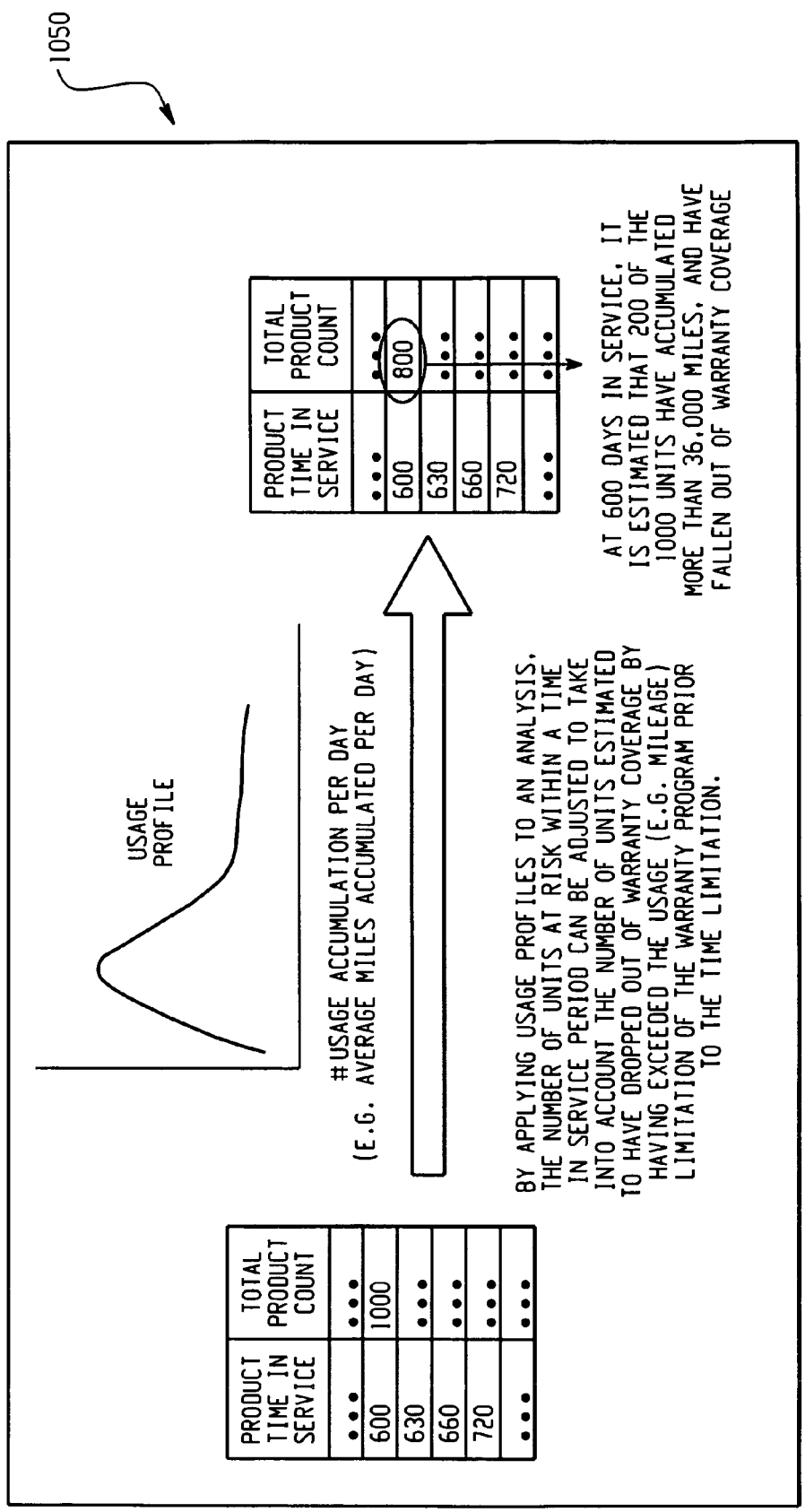
FIG. 21 illustrates applying usage profiles to account for units that will mileage out.

For example, for a 3 year/36,000 mile warranty in the automotive industry, one can apply usage profiles to determine the probability that a particular vehicle at 1 year in service would have accumulated more than 36,000 miles and is no longer covered under warranty. Once a unit is estimated to fall out of warranty, it would be excluded from the at risk population and provide a better estimate of the rate at which claims truly occurred (see FIG. 21 at 1050).

Users will be given the option to apply usage profiles to his/her analysis where appropriate.

A usage profile for a particular product is a distribution that depicts how units of that type would accumulate usage.

Warranty Program Mileage Limitation (Warranty Program Types 2 or 3)

If the user is able to apply vehicle usage profiles to his/her analysis and chooses to do so, then the user is provided the capability to specify the warranty program limitation for the usage dimension (e.g., mileage). Specifying this value is used because it identifies when, on that usage scale, a unit will fall out of warranty coverage (e.g., 36,000 miles).

Time in Service Point of View (Warranty Program Types 3 or 4)

For many warranty programs, sales data is not available for all units that are put into service. This is often the case with consumer electronics and appliances. In these situations, the manufacturer knows when units were built; however they do not know when units were sold to the end user of the product until either a claim is made, or the customer mails in a registration. Registrations are often only sent in for a very small percentage of product units.

Since in service dates are unknown for all units in the population at risk, it is very challenging to define the number of units at risk for various values of time in service. For example, identifying how many units would be at risk at 6 months in service is illusive because it is unknown when things are put into the customer's hands. However, it is possible to provide estimates for when things go into service in order estimate the number of units at risk at different time in service periods.

Within the application, users are able to choose what perspective to use in order to define the starting point of a product unit's life: from build or from sale. This perspective, or point of view, is then used in the calculations for time in service.

The from build point of view assumes a unit is placed in the at risk population the moment it is built. All exposure or time in service values are calculated using the build date as the in service date for the units. The data that is available when warranty program type is either 3 or 4 supports these calculations without having to make any adjustments.

The from sale point of view assumes a unit is placed in the at-risk population the moment it is put into the customer's hands. Any claim that happens prior to this event is considered a pre-delivery claim. Since warranty coverage is initiated when a unit is put into service, the from sale perspective provides a more realistic measure of product exposure, or time in service, to use when analyzing warranty data. Selecting the from sale point of view will result in product exposure from sale being estimated using time in service measured from the build date and a build to sale lag profile.

Figure 22:
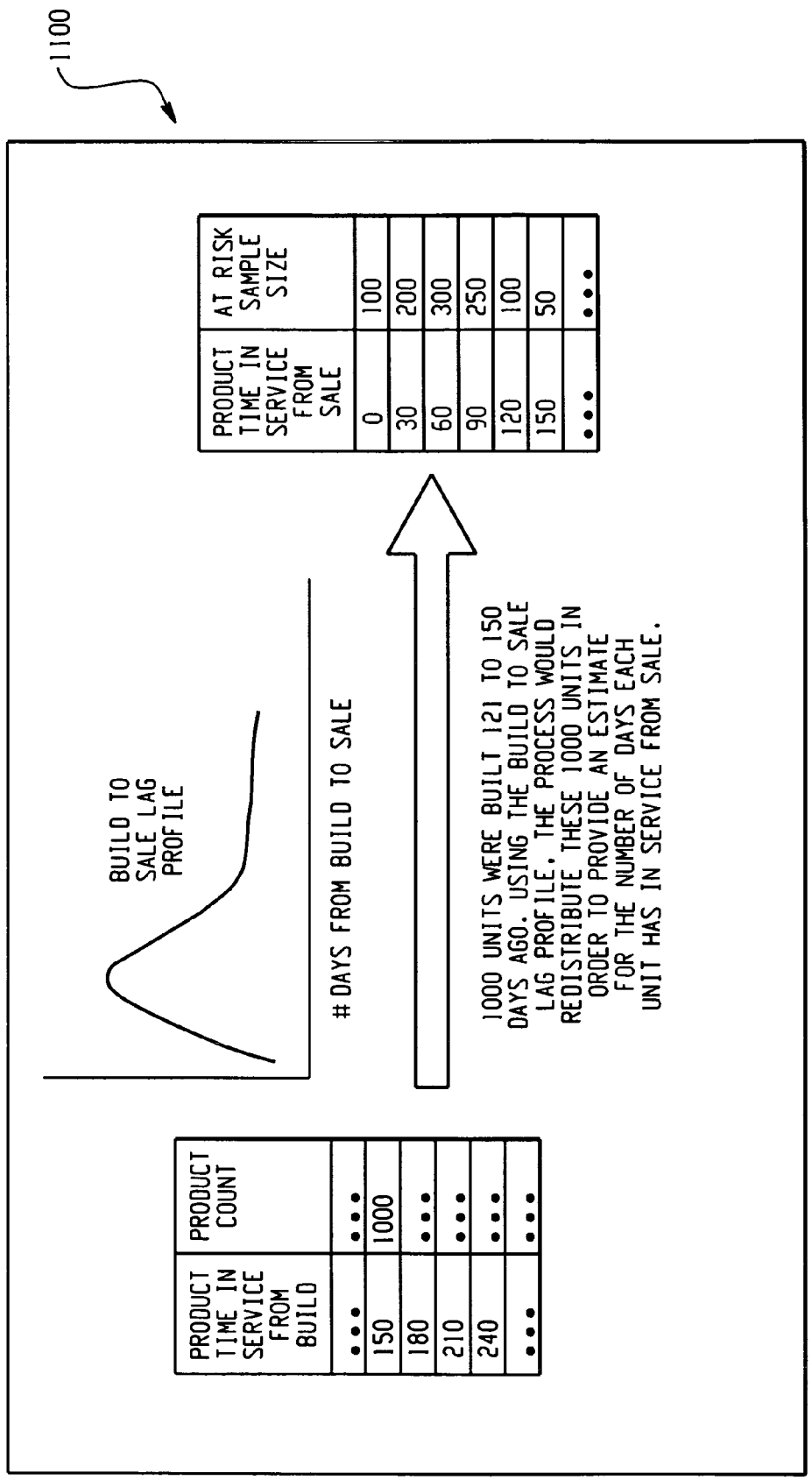
FIG. 22 illustrates the build to sale lag profile redistributing data from a "from build" to "from sale" perspective.

The build to sale lag profile is a distribution for the lag (in days) between a unit's build date and its sale date. Applying the build to sale lag profile within an analysis will result in product information, summarized with respect to product time in service from build, being redistributed into product information that is summarized by estimated product time in service from sale. FIG. 22 illustrates at 1100 a view of the redistribution process.

Minimum Sample Size

In the calculation process, the number of units at risk for each time in service period in the data is identified. This value, along with the sample size across all time in service periods, can be used to calculate the percentage of units at risk for each time in service period. Depending on how the age base of the population is distributed in the products data subset, the values for the number of units at risk and percentage of units at risk could be quite small for some time in service bins. If the sample size at risk for certain time in service periods is deemed too small (i.e., immature) then the user may want to exclude those particular immature time in service periods from the calculations. Excluding immature time in service periods would prevent calculated amounts from being artificially overstated when using the adjusted calculation method. The effect of immature time in service periods when using the unadjusted calculation method is negligible.

In order to identify whether or not to exclude immature time in service periods from the analysis, users are able to specify:
(1) Minimum Sample Size Type
(2) Minimum Sample Size Value There are 3 Minimum Sample Size Types: none, percent, and count. Selecting none will allow all time in service periods to be included in the calculations, regardless of the number of units or percentage of units at risk in each of them. This is the default selection and, in most circumstances, should be the selection for the unadjusted calculation.

Selecting percent identifies that a minimum percentage of units at risk should either currently reside in or have passed through the time in service period for that time in service period to be included in the report/analysis. In other words, if the total number of units being analyzed from the detail products data subset is M, and the sample size at risk for a particular time in service (after having been adjusted for other analysis options, such as usage profiles) is m, then m/M*100 should meet a minimum criteria for information (e.g., claims) from that time in service period to be included in the analysis.

Selecting count identifies that there should be a minimum number of units at risk within a particular time in service period for that period to be included. Using the example above, m should meet the minimum criteria for that time in service period to be included.

If a Minimum Sample Size Type of count or percent is selected, then the user should enter a Minimum Sample Size Value. For count, the Minimum Sample Size Value can be any non-negative integer value. For percent, it can be any integer value between 0 and 100. Default values can be set for an implementation.

Figure 23:
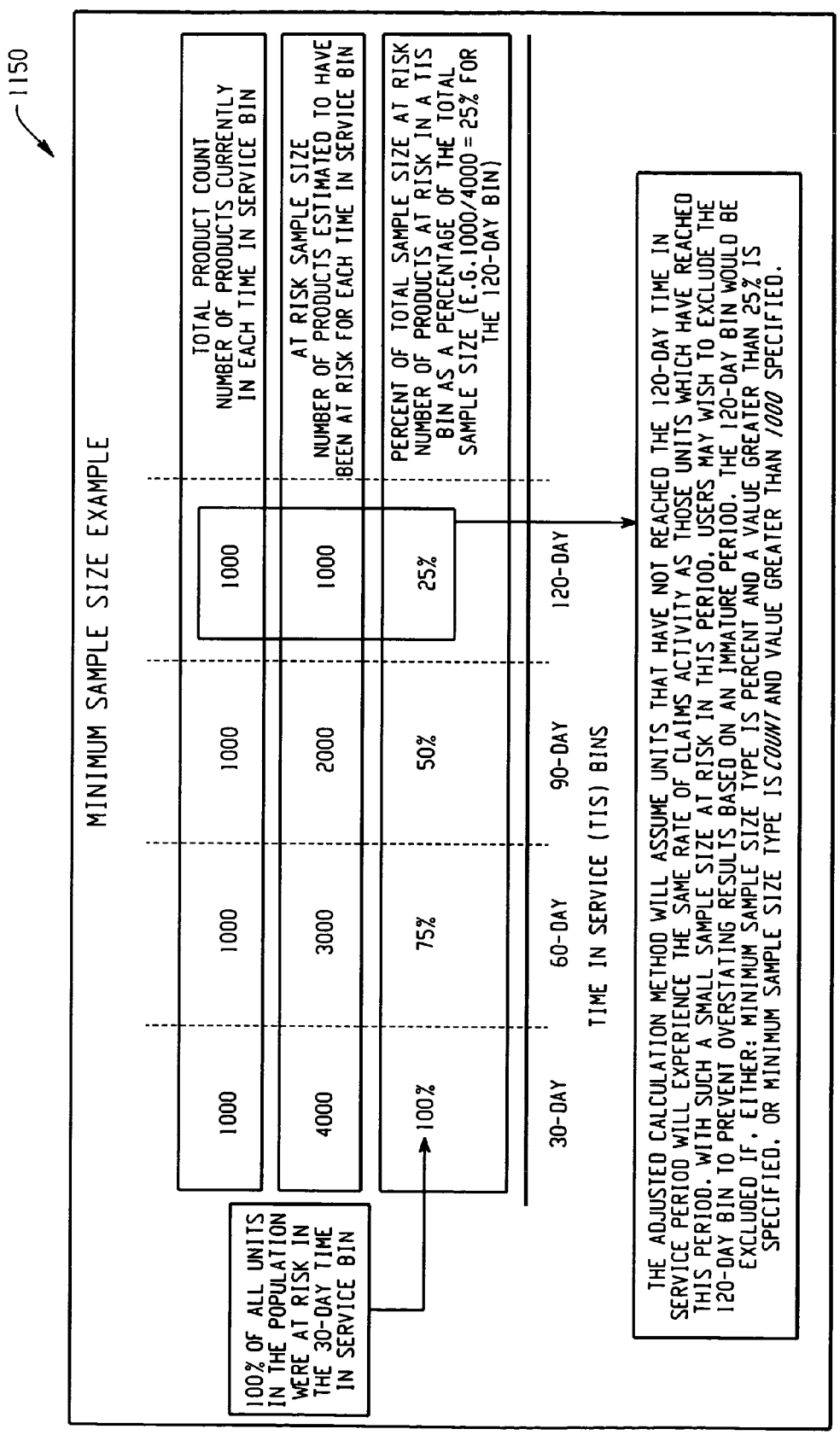
FIG. 23 illustrates a minimum sample size example.

FIG. 23 illustrates at 1150 the minimum sample size concept.

Warranty Claims to Consider

Directly, this analysis option affects which claims to consider in the analysis. Indirectly, the value selected for this analysis option will affect how the at-risk population should be identified within each time in service period.

When a customer brings in a unit for some type of repair, the unit is fixed or replaced and returned back into service. Some time after, that unit may be brought back into a service center again for the same type of failure, resulting in the same type of claim being made on the same unit (or under the same warranty contract). It is sometimes misleading to include these subsequent claims of the same claim type on a particular unit in an analysis because: (1) the subsequent claim could result from the service center not correctly making the repair (e.g., a technician did not reinstall the part as it should have been), and (2) the claim time in service of the $2^{nd}$ identical claim is relative to the first claim date, however claim time in service is dependent on the in service date of the unit and is not relative to other claim dates by definition. As a result, including these subsequent claims could distort calculated values in an analysis and may misrepresent what is actually happening.

To deal with this situation, users are able to identify, on applicable analyses, which claims should be counted/considered in that run. The selections are:
(1) Consider all claims
(2) Consider only the $1^{st}$ occurrence of a claim of a particular claim type per unit
(3) Given claims in the claims data subset (as defined by the filter definition), only keep the $1^{st}$ occurrence of a claim per unit (regardless of claim type).

By considering all claims, users want to consider all claims in the claims data subset regardless of whether or not there were reoccurrences of the same claim type on a unit. This is the default selection.

If a user chooses to only consider the first claim occurrence of a particular claim type per unit, then only those claims will be used in the calculations regardless of which claims were retrieved by the filter definition. In this scenario, the identification of the first claim is independent of the claims retrieved via the filter subset (i.e., a flag identifying the first occurrence of a claim of a particular type per unit would be assigned in the warranty information store). Users will select this option if they wish to exclude the effect that repeat repairs may have on the results.

If a user chooses to only consider the first occurrence of a claim per unit with respect to the claims retrieved based on the filtering criteria, then the calculation will only include the very first claim per unit that is part of the claims data subset, regardless of claim type. In this situation the identification of the first claim is dependent on the claims retrieved by the filter subset (i.e., a flag identifying the first claim per unit would be assigned in the claims subset during the filtering process). Users will choose this option if a particular issue of interest spans different claim types, and the user wishes to only look at the first occurrence of either of those claims.

Figure 24:
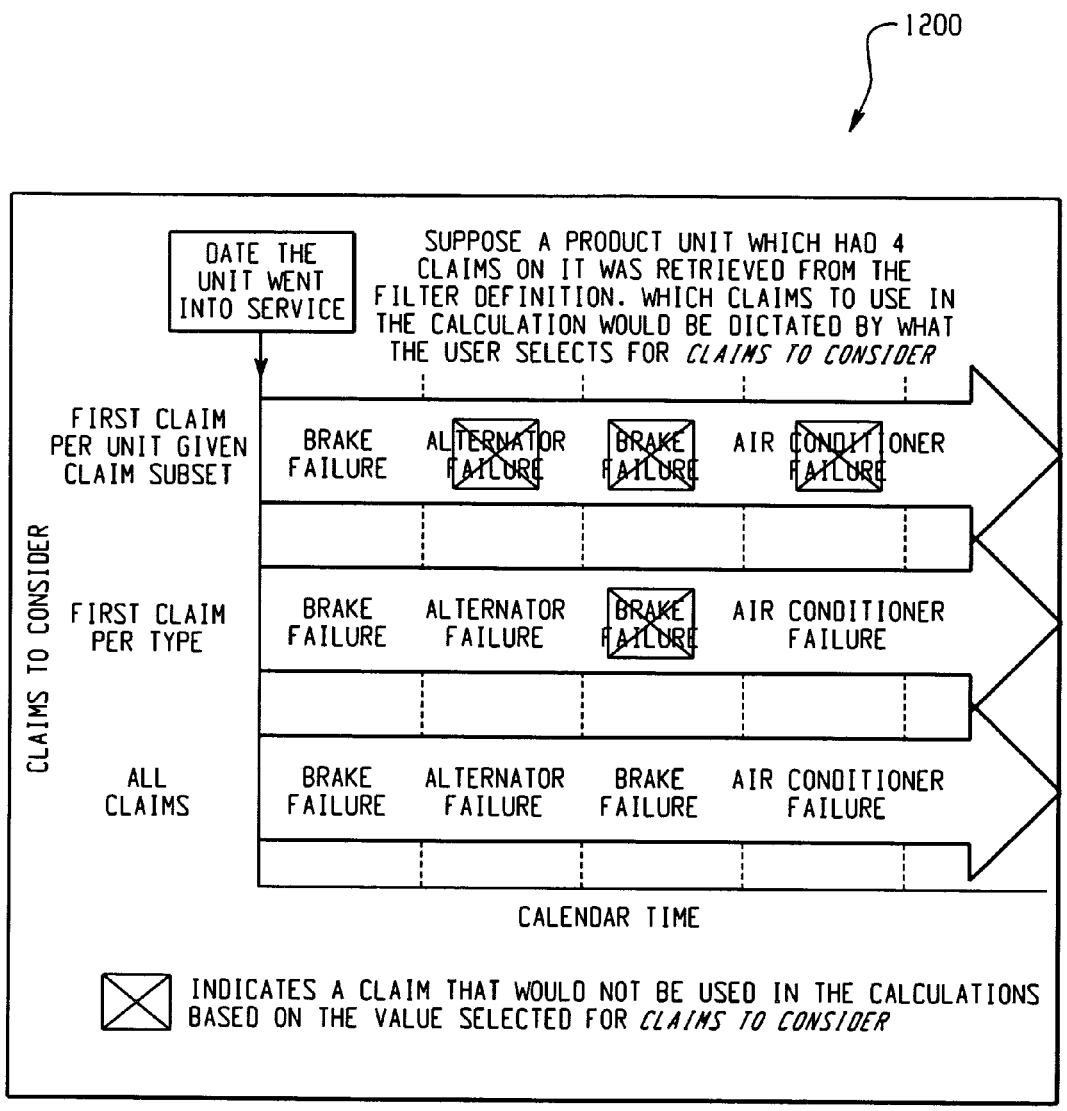
FIG. 24 illustrates effect of the "claims to consider" selection.
Figure 25:
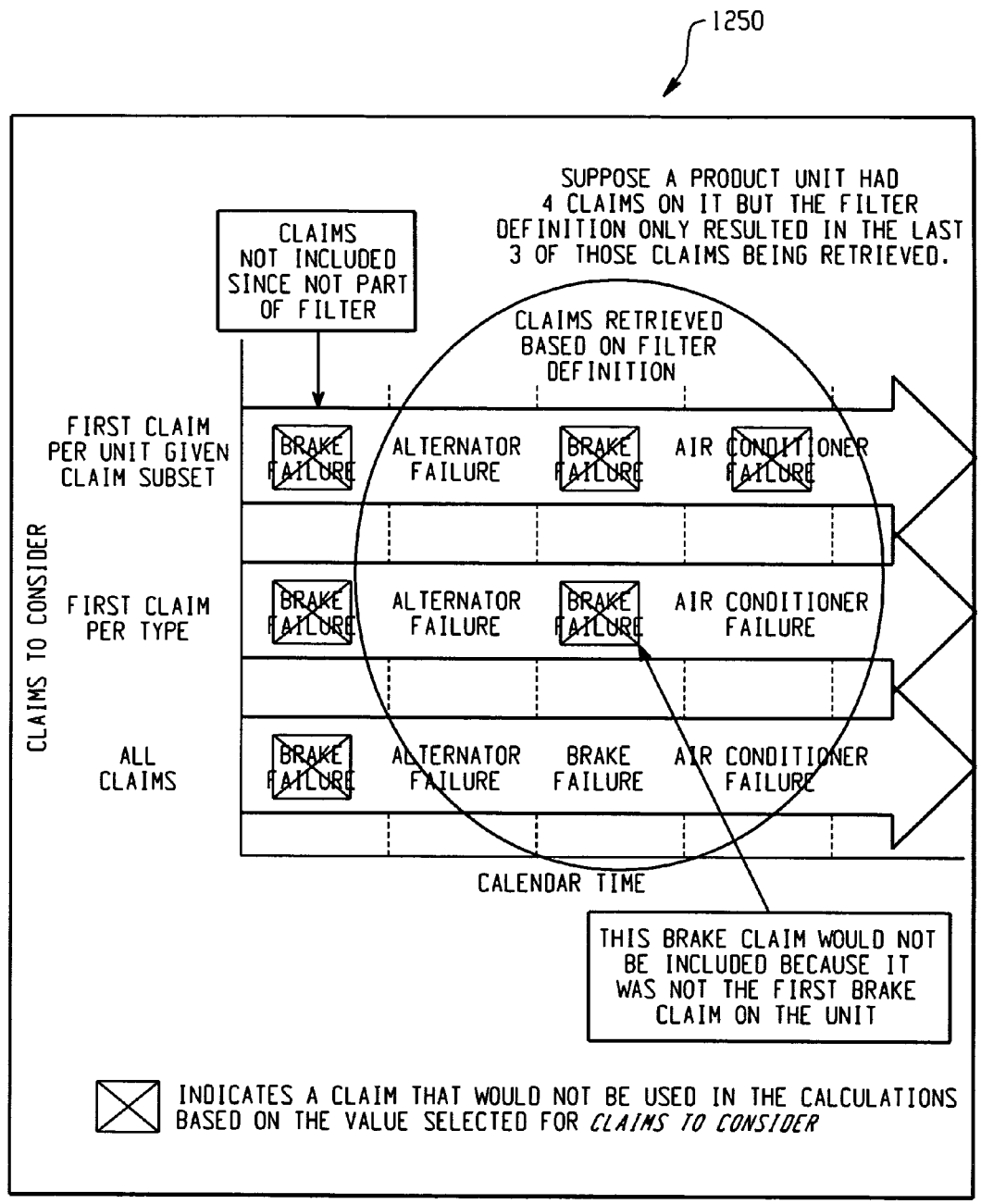
FIG. 25 illustrates effect of the "claims to consider" selection and its dependence on the claims data subset.

This capability provides users additional flexibility to identify which claims to use in their analysis based on the business questions that needs to be answered. When selecting First Claim Per Type, it is recommended that users ensure that they did not specify any sort of restrictions on claim date variables in the filter definition that would limit the historic claim records retrieved. This will prevent certain claims from being excluded in the analyses by mistake. FIG. 24 at 1200 and FIG. 25 at 1250 illustrate the effect of the different selections for this option and how they are specifically dependent on the claims data subset retrieved based on the filter definition.

Graphical Options

The user can provide a title, subtitle, and footnote for the report. By default, the title is set to the name of the filter definition applied, but users may override this value.

Occasionally users will want to specify the scale for the analysis variable. This can be helpful when one or more data points make the output difficult to read because of a disproportional scale. It may also help when users want to compare the same report between runs by giving them the same scaling. Users specify the minimum value, maximum value, and scale increment. Any points outside the range will not be displayed; however, they will still be part of the summarized data that may be downloaded to CSV (spreadsheet).

For analysis types that include a line chart (e.g., Exposure Analysis, Time of Claim Analysis), users may choose whether or not to display gridlines. This will draw reference lines at all major tick marks on both the X and Y axes. This may make the output easier to read for some users.

Warranty Analysis Example Analyses

The Reporting & Analysis component of the application can include multiple analyses, such as but not limited to:
  Pareto Analysis
  Trend/Control Analysis
  Exposure Analysis
  Trend by Exposure Analysis
  Reliability Analysis
  Statistical Drivers Analysis
  Forecasting Analysis
  Time of Claim Analysis
  Geographic Analysis
  Detail Report (Product or Claim).

Pareto Analysis

Pareto charts are often used to graphically represent top issues lists. Pareto charts are tools for visualizing the Pareto principle, which states that a small subset of problems tends to occur much more frequently than the remaining problems. Pareto charts display the relative frequency of quality issues in decreasing magnitude with respect to some objective value, such as number or cost, identifying which subset of problems deserves the most attention and resources.

Pareto charts can be developed in order to present various types of information. Charts can be used to display warranty counts, warranty count rates, warranty costs, etc. In addition, comparative charts can be formulated to compare the Pareto frequencies across levels of classification variables. For example, a user can view the top 10 problems for a specific product, and then compare how those problems are distributed across two plants and when the product is produced.

Pareto charts often provide a good first step in performing warranty data analysis. They are also often generated for management reports.

The Pareto Analysis provides the capabilities to generate a top N list, with respect to the calculated analysis variable, for the reporting variable for each value of the by variable, provided a by variable was specified. For example, the Pareto Analysis could illustrate the top ten labor codes with the highest claim rates for units built at four different plants (i.e., by plant). Furthermore, in addition to selecting an analysis variable, several additional options may be chosen that will dictate how the analysis variable is being calculated for each value of the reporting variable, and which claims and products to include. For example, the Pareto Analysis could illustrate the top 10 labor codes with highest projected claim rates (i.e., adjusted calculation method), at 2 years in service, only considering first claim per unit, by plant.

The following analysis options are made available on the Pareto Analysis:
   Analysis Variable
   Reporting Variable
   By Variable
   Calculation Method—Adjusted or Unadjusted
   Time in Service Point of View (warranty program types 3 or 4)
   Apply Usage Profile (warranty program types 2 or 3)
   Warranty Program Mileage Limitation (warranty program types 2 or 3)
   Claims to Consider
   Maximum Exposure Value
   Maturity Level
   Include Pre-Delivery Claims
   Minimum Sample Size Type and Value
   Number of Bars—The user can identify the maximum number of top items they wish to have illustrated in the output (e.g., top 10 list, top 15 list, etc.). The number should be a value between 1 and 25. By default, a top 10 chart would be generated.
   User Title, Subtitle, and Footnote.

The Pareto output includes a chart of the top N values of the reporting variable for each value of the by variable (if specified and a threshold is not exceeded). This information is repeated in tabular form along with additional calculated variables to assist with analysis.

From the output, users may:
   Click-to another analysis
      Pareto, Trend, Geographic, Exposure, Statistical Drivers, Reliability, Time of Claim, Trend by Exposure, Forecasting, Detail
   Drill-to another analysis
      Pareto, Trend, Geographic, Exposure, Statistical Drivers, Reliability, Time of Claim, Detail Trend/Control Chart Analysis Warranty problems are often attributable to the period of time units were manufactured in the plant (e.g., something occurring in the plant during the manufacturing process or a change in a particular supplier at that point in time) and may not be attributed to the design of the part itself The trend/control chart analysis allows users to view warranty claims activity from a time of build point of view. Specifically, this analysis allows users to plot a quantitative value, such as total claim count or cost, claim rate, claim cost per unit, etc., versus a production time period, such as month of production or week of production. The plot could be generated with respect to a particular time in service period (e.g., at 90 days in service) or incorporate all data.

In addition, users would be able to apply control limits to the trend charts in order to create a control chart of the data. Control charting is a methodology that can be used to help distinguish normal variation in warranty claims activity from statistically significant trends, deciphering random noise from assignable cause variation. This prevents a user from thinking a trend may exist while one might not be there. The analysis may also be stratified by values of a categorical variable for comparative purposes.

Trend/Control Analysis Options can include:
   Analysis Variable
   Production Period—Identifies the production time period interval to calculate the analysis variable for and, if requested, generate the control chart in terms of Possible selections include Month of build and Week of build.
   By Variable
   Calculation Method
   Time in Service Point of View (warranty program types 3 or 4)
   Apply Usage Profile (warranty program types 2 or 3)
   Warranty Program Mileage Limitation (warranty program types 2 or 3)
   Claims to Consider
   Maximum Exposure Value
   Maturity Level
   Include Pre-delivery Claims
   Minimum Sample Size Type
   Minimum Sample Size Value
   Include control charts—By default, a trend chart is created (i.e., a chart plotting production period on the X-axis versus the analysis variable on the Y-axis. Additionally, users may request to add a control chart to the output. If the user does request a control chart, they additionally will have the ability to specify the upper and lower control limits, or have them calculated by the application. If a by variable is being considered, a separate control chart would be generated for each value of the by variable, however only one trend chart will be displayed having d separate line for each value of the by variable.
   Analysis Variable Axis Scale
   Display gridlines
   User title, subtitle, footnote.

Trend/Control output includes a line chart showing the analysis variable across production periods for each value of the by variable (if specified and a threshold is not exceeded). Each distinct value of the by variable produces a separate line on the chart. This information is repeated in tabular form along with additional calculated variables to assist with analysis. If control limits are specified or requested, a control chart is created (for each value of by variable if specified), provided the summarized data meets certain criteria.

From the output, users may:
   Click-to another analysis
      Pareto, Trend, Geographic, Exposure, Statistical Drivers, Reliability, Time of Claim, Trend by Exposure, Forecasting, Detail
   Drill-to another analysis
      Pareto, Geographic, Exposure, Reliability, Statistical Drivers, Detail Exposure Analysis The Exposure Analysis allows users to view how warranty claims activity varies by product exposure, or time in service. It plots time in service (e.g., days in service) on the X-axis versus a quantitative value, such as claim count, cost, rate, etc., on the Y-axis. In addition, users may specify a variable by which to stratify the exposure analysis (e.g., model years of a product, suppliers, etc.) in order to visually compare warranty activity at different times in service values across a series of stratums. Finally, users may be able to view either incremental or cumulative calculated values of the quantitative value at different time in service periods (e.g., view the incremental claim rate for the 61-90 days in service period or the cumulative claim rate for the entire period up to 90 days in service).

Exposure Analysis Options can include:
    Analysis Variable
    By Variable
    Calculation Method
    Time in Service Point of View (warranty program types 3 or 4)
    Apply Usage Profile (warranty program types 2 or 3)—Option made available if the Adjusted Calculation Method is applied.
    Warranty Program Mileage Limitation (warranty program types 2 or 3)—If the user chooses to apply usage profiles.
    Claims to Consider
    Maximum Exposure Value
    Maturity Level
    Include Pre-delivery Claims
    Minimum Sample Size Type
    Minimum Sample Size Value
    Exposure Chart Type—Users may specify whether the exposure chart should be from an Incremental or Cumulative value perspective. If an incremental chart is generated, then the calculated analysis variable will represent claims activities that only occurred within a time in service period. If a cumulative chart is generated, then, for each time in service period, the calculated analysis variable will represent claims activities that occurred in time in service periods up to and including that time in service period. For example, the incremental chart value for 90 days in service will only quantify claims activities that occurred within the 90-day time in service period, while the cumulative chart value for 90 days in service will quantify claims activities that occurred up to 90 days in service. How the claims activity is quantified would be dependent on the analysis variable, calculation method, and other options selected. The chart would display the calculated analysis variables for each claim time in service value up to either the maximum exposure value (if specified) or the maximum time in service period represented in the data, whichever is smaller.
    Analysis Variable Axis
    Display gridlines
    User title, subtitle, footnote The Exposure Analysis output includes a line chart showing the analysis variable across time in service periods for each value of the by variable (if specified and a threshold is not exceeded). Each distinct value of the by variable produces a separate line on the chart. This information is repeated in tabular form along with additional calculated variables to assist with analysis.

From the output, users may:
    Click-to another analysis
        Pareto, Trend, Exposure, Geographic, Reliability, Statistical Drivers, Detail, Time of Claim, Trend by Exposure, Forecasting
    Drill-to another analysis
        Pareto, Trend, Geographic, Statistical Drivers, Time of Claim, Detail Trend by Exposure Analysis The Trend by Exposure Analysis allows users to visualize how warranty claims activity varies across production periods at various time in service values. It plots the cumulative value of a quantitative variable (i.e., total claim count, total claim cost, claim rate, etc.), given a time in service value, on the Y-axis versus production month of the X-axis. A separate line is generated for each of several time in service values. This analysis combines traits of the trend and exposure analyses.

Trend by Exposure Analysis Options can include:
    Analysis Variable
    Calculation Method—Adjusted or Unadjusted
    Time in Service Point of View (warranty program types 3 or 4)
    Apply Usage Profile (warranty program types 2 or 3)—Option made available if the Adjusted Calculation Method is applied.
    Warranty Program Mileage Limitation (warranty program types 2 or 3)—If the user chooses to apply usage profiles.
    Claims to Consider
    Maximum Exposure Value
    Maturity Level
    Include Pre-Delivery Claims
    Minimum Sample Size Type
    Minimum Sample Size Value
    Display gridlines
    User Title, Subtitle, and Footnote Trend by Exposure Analysis output includes a line chart showing the analysis variable across production periods for various time in service periods (e.g., 30, 60, 90, 180, 360, 720, and 1080 day intervals). Each time in service period is displayed as a separate line on the chart. This information is repeated in tabular form along with additional calculated variables to assist with analysis.

From the output, users may:
    Click-to another analysis
        Pareto, Trend, Geographic, Exposure, Reliability, Statistical Drivers, Detail, Time of Claim, Trend by Exposure, Forecasting
    Drill-to another analysis
        Pareto, Geographic, Statistical Drivers, Detail Statistical Drivers Analysis The Statistical Drivers Analysis allows users to identify factors that may be influential to the occurrence of claims because the values of those factors have statistically significant differences in claims activities. A factor is deemed significant if claims do not randomly occur across the values of that factor (i.e., claims occur disproportionately across the different values of the variable).

The analysis identifies significance by performing an analysis of means (ANOM) on each variable selected by the user. For each variable selected, the process identifies whether or not the claim rate associated with each value of that variable differs significantly from the group, flagging those that do. In addition to identifying which factors (variables) are significant, the results also graphically depict, for each significant variable, the values of the variable that significantly differ as well as their magnitude.

This functionality assists users in their root cause analysis of a warranty problem in order to better understand the influential factors, and values of those factors, that have significantly higher claim rates. This is problem definition through data analysis.

Statistical Drivers Analysis Options can include:
    Reporting Variables—Users are able to select multiple values for reporting variable. This is in contrast to other analyses where only one can be selected. The Statistical Drivers analysis is generated for each reporting variable selected.

Calculation Method
  Time in Service Point of View (warranty program types 3 or 4)
  Apply Usage Profile (warranty program types 2 or 3)—Option made available if the Adjusted Calculation Method is applied.
  Warranty Program Mileage Limitation (warranty program types 2 or 3)—If the user chooses to apply usage profiles.
  Maximum Exposure Value
  Include Pre-delivery Claims
  Alpha level—User can select an alpha level which adjusts the sensitivity of their analysis when determining significance (i.e., the selection of alpha dictates the false alarm rate). Users will be able to select an alpha level of 0.01, 0.05, or 0.10.
  User title, subtitle, footnote The Statistical Drivers output includes a separate chart for each reporting variable to show those values that are significantly influential to the occurrence of claims. A summarized table at the top indicates those reporting variable values that have at least one point outside of the decision limits.

From the output, users may:
  Click-to another analysis
    Pareto, Trend, Geographic, Exposure, Reliability, Time of Claim, Statistical Drivers, Detail, Trend by Exposure, Forecasting
  Drill-to another analysis
    Pareto, Trend, Geographic, Exposure, Reliability, Detail Reliability Analysis Reliability analysis is used to answer questions concerning the durability of a product and to characterize how a product functions in the field throughout the course of its lifetime. For warranty program types 2 and 3, lifetime can be defined by either time or usage (e.g., mileage) and the reliability analysis can be generated in terms of either dimension. For warranty program types 1 and 4, lifetime would only be defined by time.

For a specific product, the process uses data about the items that failed, and others that did not, to perform a parametric reliability analysis and develop distributions modeling time to first failure, or occurrence of a claim. A lifetime distribution (e.g., Weibull, Lognormal, Exponential) is fit to the claims (failures) and products (the population at risk) information. From the fitted distribution, several different items could be generated based on what the user requests. What is requested by the user is dependent on his/her business questions. The things that can be generated are a table of projected values, b-life values, and other plots (e.g., Hazard, Failure, Cumulative Failure) based on the fitted distribution. In addition, users can specify a by variable to stratify their analysis for comparison purposes.

Reliability Analysis Options can include:
  By Variable
  Reliability Variable (warranty program types 2 or 3)—If the warranty program is 2 dimensional (i.e., involves, both time and usage), then the user will be able to generate a reliability analysis in terms of time or usage.
  Time in Service Point of View (warranty program types 3 or 4)
  Apply Usage Profile (warranty program types 2 or 3)—Option made available provided the Reliability Variable is Time in Service. By default, usage profiles will be applied if the Reliability Variable selected is usage.
  Warranty Program Mileage Limitation (warranty program types 2 or 3)—If usage profiles are applied to the analysis either directly or indirectly (i.e., by selecting usage for the reliability variable). If the reliability variable is usage, this value identifies the maximum data point (i.e., usage interval) to use when fitting the lifetime reliability model to the data since usage periods beyond this value would not represent complete information (i.e., since warranty coverage ends at this point in time, the data would not contain all failure information beyond this period).
  Warranty Program Time Limitation—If the reliability analysis is in terms of time in service (i.e., warranty program type is 1 or 4, or warranty program type is 2 or 3 and the reliability variable selected is time), then the user will be able to select a warranty program time limitation. The value selected should match up with the time limitation of the warranty program offered (e.g., 360 days in service for a 1 year warranty). This identifies the point in time (in terms of time in service) that a unit is no longer covered under warranty. This value will be used to identify that maximum data point (i.e., time in service interval) to use when fitting the model.
  Build to Sale Lag (warranty program types 3 or 4)—If the user selects the from build Time in Service Point of View, then the user will be able to select a value (e.g., 30 days, 60 days, 90 days) to represent the number of days that should be accounted for between the build and sale dates. If the user selected the from sale, the build to sale lag profile is applied in order to account for the time lag between the build and sale dates of units.
  Minimum Sample Size Type
  Minimum Sample Size Value
  Lifetime Distribution—Identifies what lifetime distribution when fitting the data. The options are Weibull, Lognormal, and Exponential.
  Lifetime Distribution Fit Type—Identifies the method that should be used when fitting the lifetime distribution to the data. The methods that will be made available are maximum likelihood estimation and least squares estimation.
  Identify graphical and tabular output to include—User to identify which of the following plots/tables to include in the output. All of these output components are based on the fitted lifetime model.
    Failure Probability Plot—Plots the probability of a claim for values of the reliability variable.
    Hazard Plot—Plots the instantaneous propensity of a claim occurring for values of the reliability variable. The slope of this plot helps to identify whether the claim rate is increasing, decreasing, or constant with respect to the reliability variable.
    Cumulative Failure Probability Plot—Plots the cumulative probability of a claim versus values of the reliability variable.
    Probability Plot—Provides a graphical perspective of how the fitted lifetime model fits the data and also provides insight on the fitted distribution (i.e., can identify whether the claim rate is increasing or decreasing by using the slope of the fitted curve, can visually retrieve future projected incident rates, etc.)
    B-Life Table—Will provide measure of usage (time or mileage) at which certain percentages of failed units are expected to occur.
    Projected Value Table—Identifies projected claim rates for future values of the reliability variable.
    Select desired projected values—If a Projected Value Table is requested, the user can select which values of the reliability variable to calculate incident rates for.

The list a user may select from is dependent on the reliability variable selected.

Display gridlines

User Title, Subtitle, and Footnote

The Reliability Analysis output may include a number of charts and tables (depending on the user selection as described above).

From the output, users may:

Click-to another analysis

Pareto, Trend, Geographic, Exposure, Reliability, Statistical Drivers, Detail, Time of Claim, Trend by Exposure, Forecasting Drill-to another analysis—not available Forecasting The application provides forecasting functionality that can be used in the warranty data analysis process in order to identify future magnitude of a warranty issue, playing a role in the decision making process of how to prioritize warranty issues.

The forecasting analysis generates forecasts over the next 12 calendar months (or another period of time) for claim count or claim cost related to a particular warranty issue or concern (e.g., a labor code, part number). Forecasted values take into account: (1) historic claim rates associated with a warranty issue or concern, (2) projected claim rates for the warranty issue or concern based on a parametric reliability analysis, and (3) the current age base of the population of products being investigated and how the age base of the population will change over future time periods (it can also consider future sales estimates specified by the user).

The results would provide a user the ability to understand what the associated warranty liability, in frequency and cost, will be at various points of time in the future for the specific concern being investigated. This piece of information would assist in determining priorities when allocating resources to address issues, making business cases for fixes, etc.

Forecasting Analysis Options can include:

Analysis Variable—The user will be able to select either Total Claim Count or Total Claim Cost Forecast Periods—The user can specify the number of calendar months to generate forecasts for. The number of months specified does not include the current calendar month. All calendar months (current and future) are relative to the data warehouse refresh date. Values that may be selected include 1, 3, 6, and 12 months.

Include Future Sales Estimates—Claim magnitude, in terms of the analysis variable selected, is estimated for future calendar periods based on the products, and their ages, that are in the products subset. However, the forecasted values may be underestimated if new units will be entering service in the months for which forecasts are generated. To help address this situation, users are able to specify future sales estimates for each forecast period which will be incorporated into the forecasted values. This analysis option is a dichotomous choice which should be checked if the user wishes to specify the estimated sales values.

Current Period Sales Estimate—If the user chooses to include future sales estimates, then the user is able to specify a sales estimate for the remainder of the current month, where current month would be defined by the data warehouse refresh date.

Future Period Sales Estimates—If the user chooses to include future sales estimates, then the user is able to specify a sales estimate for each forecast period (i.e., future calendar month) for which a forecasted value has been requested. The number of future period estimates specified should equal the number of forecast periods specified (e.g., If 12 forecast periods was selected and the user wishes to include future sales estimates, then the user should specify 12 future period sales estimates. If the future estimate for a particular forecast period is 0, then the 0 should be specified for that corresponding future period sales estimate).

Warranty Program Time Limitation—In the analysis, the specified value will help to identify the sample size at risk within each calendar month, both current and future. This assists in estimating the sample size at risk in each calendar month and is used in the calculation of the selected analysis variable.

Display gridlines

User title, subtitle, footnote

The Forecasting Analysis output includes a line chart showing the analysis variable across some claim calendar time (e.g., claim month). Actual values are distinguished from forecasted values in the chart. This information is repeated in tabular form along with additional calculated variables to assist with analysis.

From the output, users may:

Click-to another analysis

Pareto, Trend, Geographic, Exposure, Reliability, Statistical Drivers, Detail, Time of Claim, Trend by Exposure, Forecasting Drill-to another analysis—Pareto, Trend, Geographic, Reliability, Exposure, Detail (not available for forecasted periods)

Time of Claim Analysis

The Time of Claim Analysis allows the user to view how a quantitative value, such as total claim count or cost, varies with respect to calendar points in time. It plots a calculated quantitative value on the Y-axis versus past calendar periods (months) on the X-axis. The calendar periods may represent the time the claims were made, the time the claims were paid, or any other calendar date associated with claims. In addition, the user may specify a by variable in order to stratify their analysis by values of some categorical variable for comparison purposes.

The Time of Claim Analysis may be used to monitor claims activity by calendar periods and possibly detect seasonality trends in claims activity.

Time of Claim Analysis Options can include:

Analysis Variable

Claim Date Report Variable—This value will identify the date variable, associated with the claim that the analysis should be generated in terms of Examples of values include the month the claim was made, the month the claim was paid, etc. The date value will be processed as a month/year value (e.g., Jan. 15, 2002 would be processed as a January 2002 event).

By Variable

Apply Usage Profile (warranty program types 2 or 3)—Applying this option would allow the calculation process to remove units that are expected to have fallen out of warranty by exceeding the usage dimension of the warranty program prior to the time dimension from the at risk population for each calendar month.

Warranty Program Mileage Limitation (warranty program types 2 or 3)—If the user chooses to apply usage profiles.

Time in Service Point of View (warranty program types 3 or 4)

Warranty Program Time Limitation—The selection of a warranty program time limitation will be made available to a user if either the warranty program type is 1 or 2, or the time in service point of view of from sale is selected when the warranty program type is 3 or 4. The values that could be selected would include 24 months, 36 months, etc. (i.e., values representing endpoints of the warranty programs that are offered). In the analysis, the specified value will help identify the sample size at risk within each calendar month. This assists in estimating the sample size at risk in each calendar month and is used in the calculation of the analysis variables of type rate.

Build to Sale Lag (warranty program type 3 or 4)—If the Analysis Point of View selected is from build, then the user can specify the elapsed time value between a units build and in service date (e.g., a units takes 2 from it's build date to enter service). Specifying this value will help to estimate the number of units that are at risk of having a claim in each calendar month, based on the units in the product data subset. If the Analysis Point of View selected is from sale, then the build to sale lag profile is applied to account for the period of time between a units build and sale dates, based on historic information.

Include Pre-delivery Claims
Analysis Variable Axis Scale
Display gridlines
User title, subtitle, footnote The Time of Claim Analysis output includes a line chart showing the analysis variable across some claim calendar time (e.g., claim month). This information is repeated in tabular form along with additional calculated variables to assist with analysis.

From the output, users may:
Click-to another analysis
Pareto, Trend, Geographic, Exposure, Reliability, Statistical Drivers, Detail, Time of Claim, Trend by Exposure, Forecasting
Drill-to another analysis
Pareto, Trend, Geographic, Reliability, Exposure, Detail Geographical Analysis For many products, warranty problems may be attributable to some sort of condition related to a geographical region. Thus, it is often beneficial to look at how warranty is distributed geographically. Users will be able to perform this type of analysis by plotting a quantitative value, such as total claim cost, claim count, claim rate, etc., on a geographical map of the United States, Canada, and Mexico by state/province. Other geographic regions may be added as a customization.

Geographic Analysis Options can include:
Analysis Variable
Calculation Method—Adjusted or Unadjusted
Time in Service Point of View (warranty program types 3 or 4)
Apply Usage Profile (warranty program types 2 or 3)—Option made available if the Adjusted Calculation Method is applied.
Warranty Program Mileage Limitation (warranty program types 2 or 3)—If the user chooses to apply usage profiles.
Claims to Consider
Maximum Exposure Value
Maturity Level
Include Pre-Delivery Claims
Minimum Sample Size Type
Minimum Sample Size Value
Color Scale—Users may choose the color scale to be used on the geographical output. In the output, higher values of the calculated analysis variable will be depicted in a darker shade of the selected color. Lighter shades of the color will identify states with smaller values for the analysis variable.
User Title, Subtitle, and Footnote The Geographic Analysis output includes a geographic map showing the analysis variable using a relative scale across state/provinces or countries. This information is repeated in tabular form along with additional calculated variables to assist with analysis.

From the output, users may:
Click-to another analysis
Pareto, Trend, Geographic, Exposure, Detail, Reliability, Statistical Drivers, Time of Claim, Trend by Exposure, Forecasting
Drill-to another analysis
Pareto, Trend, Exposure, Reliability, Statistical Drivers, Detail, Time Of Claim Detail Report The Detail Report provides the user with the capability to view and download detailed level product or claim records at any point in the analysis process. In addition, users can perform keyword searches on comment fields in order to retrieve specific records.

Detail Report Options can include:
Select which data subset to use (products or claims)
Select variables to display (default selection available)
Claims to Consider
Maximum Exposure Value
Maturity Level
Include Pre-Delivery Claims
Records per page—this prevents too many records from being returned to the user's browser at one time
Comment Keyword Search—provide one or more keywords
User Title, Subtitle, Footnote
The Detail Report output includes a tabular view of the summarized data. From the output, users may:
Click-to another analysis
Pareto, Trend, Geographic, Exposure, Reliability, Statistical Drivers, Detail, Time of Claim, Trend by Exposure, Forecasting
Drill-to another analysis—not available Emerging Issues The purpose of the Emerging Issues Analysis is to: (1) monitor claims data in order to automatically detect and identify statistically significant upward shifts in claims activity, and (2) monitor user defined subsets of claims data in order to flag issues that have some criteria which surpasses a user specified threshold value. The goal is to detect emerging warranty issues as early as possible in order to minimize warranty cost liabilities, the cost associated with negative publicity for poor quality, and massive recalls pertaining to safety defects.

To achieve the purpose stated above, the Emerging Issues Analysis can use such processes as:
(1) Threshold Watch List
(2) Automated Analytical
(3) Analytical Watch List Threshold Watch List Process With the Threshold Watch List process, the system would monitor a variable for a defined subset of data in order to flag issues (values of the monitoring variable) that have criteria (i.e., a calculated value such as total claim count, claim rate, etc.) which surpasses a specified threshold value. In this circumstance, the subset of data would be defined using the filtering functionality of the application. Each group of monitoring variable, subset of data, quantitative value to monitor, additional options on how the quantitative value should be calculated, and threshold value is defined by the emerging issues administrator and represents an 'item' to be monitored. Each item is placed on the watch list, and all items on the watch list would be 'looked at' (processed in batch) every time the warehouse refreshes or when designated to run. Issues would be flagged when the quantitative calculated value exceeds the threshold value specified for a value of the variable being monitored in the subset of data considered. E-mail alerts for flagged issues may also be set up as well.

A system can be configured such that only an emerging issues administrator can define items and place them on a threshold watch list to monitor. However, when defining items to place on the watch list, the emerging issues administrator is allowed to copy filter definitions from other users of the application. Typical users of the application are allowed to view and interact with output for items which have been flagged as emerging issues.

The following options can be provided to the Emerging Issues administrator (or other users) when setting up items to monitor (i.e., place on a watch list) with the threshold watch list process.

Analysis Variable—identifies the calculated value to monitor and compare to the threshold value.
Monitoring Variable—Identifies the categorical variable whose values would be monitored
Calculation Method—Adjusted or Unadjusted
Time in Service Point of View (warranty program types 3 or 4)
Apply Usage Profile (warranty program types 2 or 3)—Option made available if the Adjusted Calculation Method is applied.
Warranty Program Mileage Limitation (warranty program types 2 or 3)—If the user chooses to apply usage profiles.
Claims to Consider
Maximum Exposure Value
Maturity Level
Include Pre-Delivery Claims
Minimum Sample Size Type
Minimum Sample Size Value
Number of Bars—The user can identify the maximum number of top items they wish to have illustrated in the output (e.g., top 10 list, top 15 list, etc.). The number should be a value between 1 and 25. By default, a top 10 chart would be generated.
User Title, Subtitle, and Footnote
E-mail addresses—The EI administrator can define e-mail addresses for individuals who should be notified if the item being defined is flagged as an emerging issue.

Threshold Watch List Report Output can include:
Pareto chart and summary table
Click-to another analysis—Not available
Drill-to another analysis
Pareto, Trend, Geographic, Exposure, Statistical Drivers, Reliability, Time of Claim, Detail Automated Analytic and Analytical Watch List Processes The Automated Analytical Process and the Analytical Watch List process are geared at monitoring claims activity on a 'defined subset of units' in order to identify where there has been an upward shift in claims activity. Instead of using a specified threshold value, these processes incorporate analytical methodologies to compare current claims activity levels with what is expected to happen and flag those items where the actual is greater than the expected. The Automated Analytical and Analytical Watch List are similar because they both incorporate similar analytics in their processing. The two processes differ in how the 'defined subset of units' being monitored is derived.

In the Automated Analytical Process, the variable to monitor in the claims data (i.e., what to monitor) and the hierarchy by which to subset the groups of product units that are being monitored by (i.e., where to monitor) are predefined. The claims variable to monitor is called the defined entity and the rule, or hierarchy, by which to subset the groups of product units to monitor is called the defined hierarchy. The automated process would monitor the defined entity on product units by the values of the defined hierarchy (e.g., monitoring labor codes—a defined entity—by product model and product manufacturing location—making up the defined hierarchy).

In the Analytical Watch List process, users define the variable to monitor and the subset of product information to monitor explicitly. The subset of product information to monitor would be defined using the application's filtering capabilities (similar to the Threshold Watch List Process), or can be an imported filter from another user. The variable to monitor, which was the defined entity in the automated process, would be selected by the emerging issues administrator when the user sets up an item on the watch list. This variable will be referred to as the monitoring variable, as it was called in the threshold process. If no monitoring variable is specified, then all claims identified via the filter definition would be monitored collectively, as the same type. Each definition of what to monitor, and where to monitor it, results in an item on the watch list process.

Both analytical processes would run in batch, either subsequent to the warehouse being refreshed or at some other predetermined point in time. In one embodiment, the emerging issues administrator is the only user role that is able to define items to monitor via the analytical watch list process. The set up and administration of the automated process is handled through metadata of the application. If this had to be altered, it would have been done so by both the system administrator and emerging issues administrator roles. As with the threshold watch list process, the Emerging Issues administrator can set up an item on the analytical watch list that will notify particular users by e-mail if an issue has been flagged. All users can be notified by e-mail when the automated process has completed running and reports are ready for viewing.

Typical users will only interact with the report output from either analytical based emerging issues process. Issues that were flagged with unexpected increases in claims activity should be investigated further using other analytical tools within the application.

The automated analytic emerging issues process does not provide a list of analysis options that an Emerging Issue Administrator could select from. In the automated process, options are set in the application's metadata. Elements that would be set up include the defined entity, defined hierarchy, alpha level (i.e., false alarm probability), the window of data to use in the analysis, and the number of time in service periods to monitor. By default, all claims would be considered, except pre-delivery claims, and usage profiles would not be applied (for warranty program types 2 or 3) since the purpose of the system is to flag upward shifts in claims activity while units are in service.

The analytical watch list emerging issues process does provide some analysis options that an Emerging Issue Administrator could select from, with others being set in metadata to ensure similar processing to its automated counterpart. In the analytic watch list process, options that are set in the application's metadata include the window of data to use in the analysis, the selection for all claims, except pre-delivery claims, to be considered, and usage profiles not to be applied (for warranty program types 2 or 3) since the purpose of the system is to flag upward shifts in claims activity while units are in service. The options the emerging issues administrator will specify explicitly can include:

- The filter of data to investigate (products and claims)—Similar to the threshold watch list process, the emerging issues administrator would be able to import a filter definition from another user
- The claim attribute whose values are to be monitored (i.e., the defined entity)
- Alpha level (false alarm probability)
- The number of time in service period to monitor (e.g., first 12 months in service)
- User Title, Subtitle, and Footnote
- E-mail addresses—The EI administrator can define e-mail addresses for individuals who should be notified if the item being defined is flagged as an emerging issue.

For all identified Emerging Issues, a high-level matrix chart is produced, indicating which production period/time in service combination(s) was flagged. Each issue has another supporting chart behind it that provides additional detail, but this is not something that most users will need to view. It shows the actual value versus the critical value for each grouping of "sales months since production." Basically, if the last point shows an actual value beyond the critical value, the production period/time in service period had an emerging issue. It shows what happened in previous months (i.e., it is this a recurring issue). Although the standard output is HTML like the Base Analyses, these Emerging issue Processes do not have output that allows the typical interactivity found in the Base Analyses. Hover-over information is included to provide some additional level of detail. The output is also available in PDF format.

Analysis Processing Operational Scenario

In order to create an analysis or report, the user should first create a filter definition and a report definition. The filter definition defines what products he/she wishes to study and which claims on those products to analyze or report on. The report definition identifies what analysis or report is going to be generated and how (e.g., what analysis options to apply, calculation method to apply, graphical options to apply, etc.). When a report/analysis is submitted for processing, the criteria specified within the filter and report definitions are executed via a filtering process and analysis process, respectively. The result of executing the filter definition within the filtering process are 2 data sets: (1) A detailed products data subset identifying what units are under investigation, and (2) a detailed claims data set, identifying which claims are being analyzed or reported on. These two data sets are the inputs into the analysis process, which is comprised of multiple steps.

Figure 26:
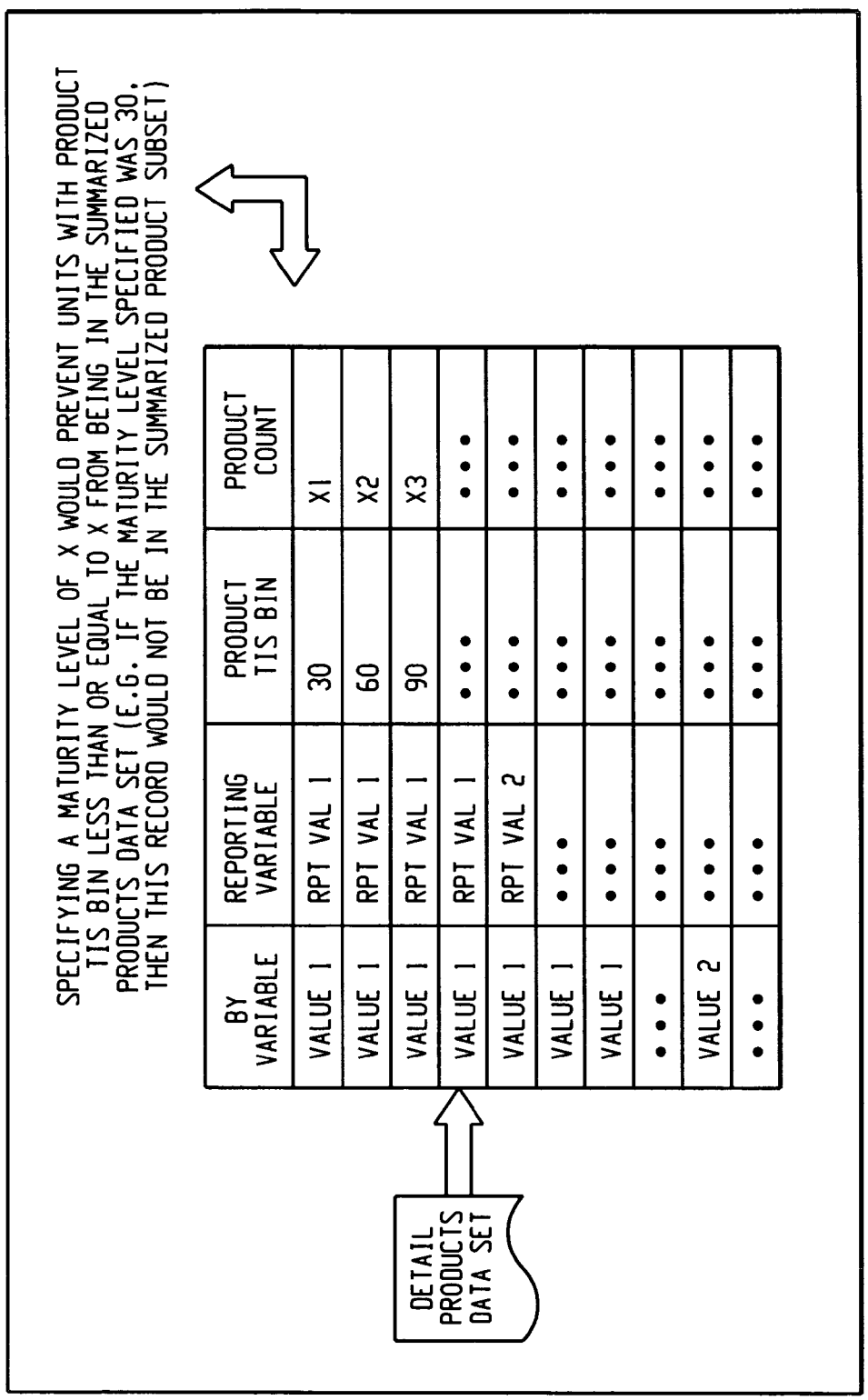
FIG. 26 illustrates step 1 of analysis processing for summarizing the detail product records.

Step 1—Summarize the detail product records that reside in the products data subset. The detailed products data subset contains a detail product record for each product unit with criteria that meets the product selection component. The first step in the analysis process is to summarize the detailed product subset by criteria that is, either, inherent to the analysis or a combination of elements inherent to the analysis and specified by the user in the report definition of the analysis. FIG. 26 illustrates at 1300 a summarization of the detailed products data set by a by variable, reporting variable, and product time in service bin. If a maturity level was specified, certain time in service buckets may be eliminated from consideration as units in those buckets have not achieved the time in service value specified.

Step 2—Summarize the detail claim records that reside in the claims data subset. The detailed claims data subset contains a detailed claim record which meets the criteria specified in the claim selection component on product units meeting the criteria specified in the product selection component. The first step in the analysis process is to summarize the detailed product subset by criteria that is, either, inherent to the analysis or a combination of elements inherent to the analysis and specified by the user in the report definition of the analysis. FIG. 27 illustrates at 1350 a summarization of the detailed products data set by a by variable, reporting variable, current product time in service bin of the unit, and claim time in service of the claim. If a maturity level was specified, certain claims on units may be eliminated as those units do not meet the maturity level criteria (i.e., units in those buckets have not achieved the time in service value specified). If pre-delivery claims are to be excluded, then claims which happened on units prior to them being sold would be excluded from consideration. If a maximum exposure value was specified, than claims which occurred beyond that value would be excluded since the results would not need to include them.

Figure 28:
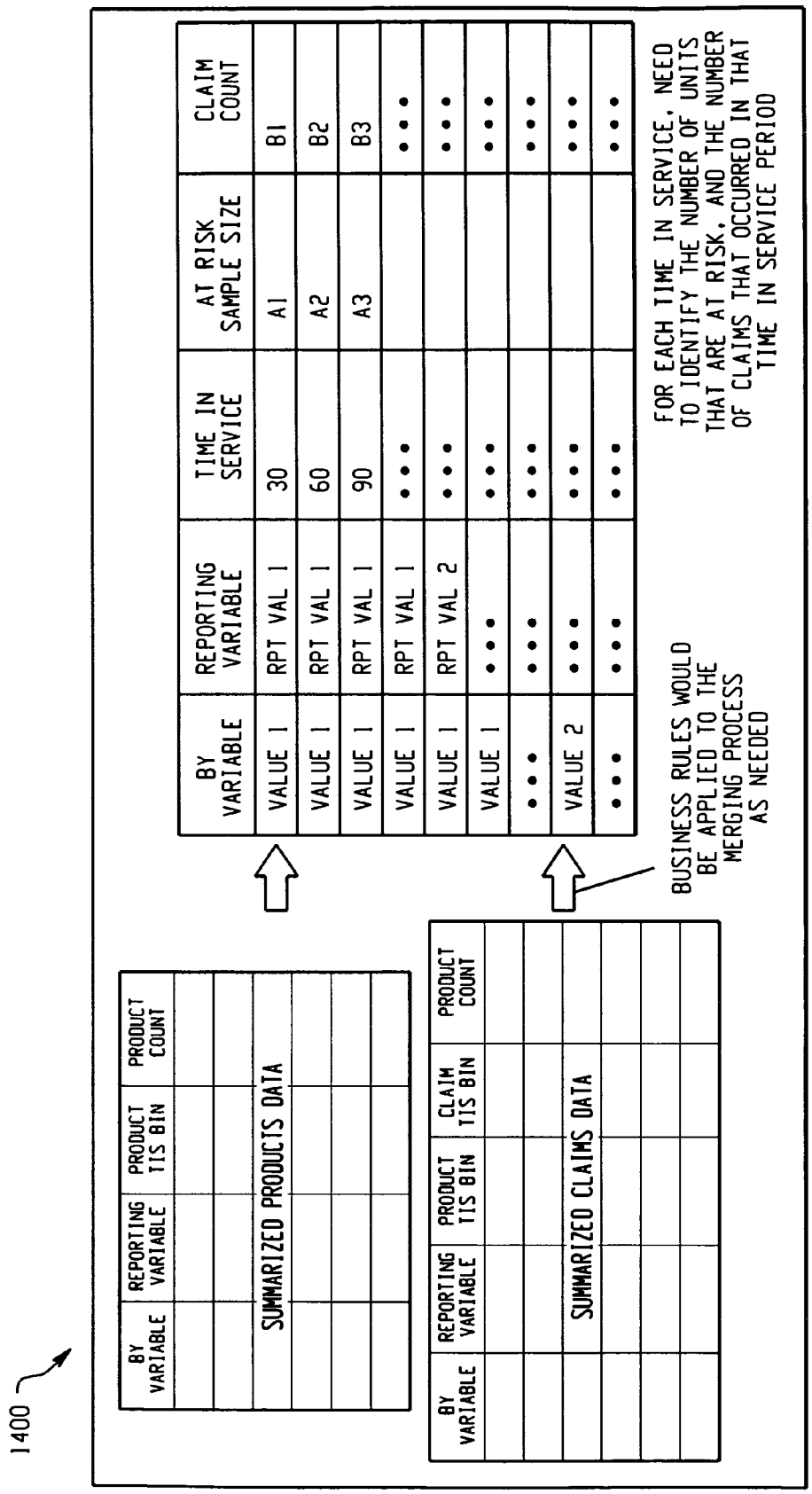
FIG. 28 illustrates step 3 of analysis processing for merging the summarized claims and products information.

Step 3—Merge the summarized claims and products data subsets together. After summarizing the detailed products and claims information, which were retrieved based on the filter criteria, and excluding any product or claim records based on other specified analysis options, the summarized claims and products information should be brought together. The merge should match up claim counts that occurred within a particular time in service period, by whichever other criteria (e.g., by variables, reporting variables), with the number of units that should be counted as at risk during that period. The process by which the actual merge takes place is dependent on the type of analysis, analysis options being applied, and the calculation that needs to be made. FIG. 28 illustrates at 1400 merging the summarized claims and products information.

Figure 29:
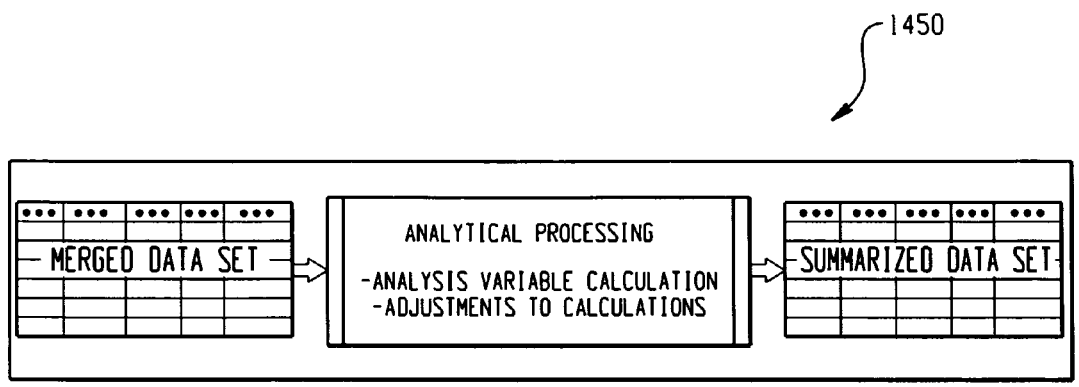
FIG. 29 illustrates step 4 of analysis processing for performing analytical routines used by the analysis.

Step 4—Analytical Processing. After the summarized claims and products information has been merged together to align the claims which occurred in a time in service bin with what was at risk in that time in service bin, organized by other criteria (e.g., by variable, reporting variable) as applicable, the next step in the process is to perform all calculations and run all analytical routines as dictated by the analysis type and whichever options were selected by the user. For example, this is the step in the process where the calculation method would be applied in order to calculate the analysis variable, where the lifetime model would be fit to data in order to generate a reliability projection, etc. FIG. 29 illustrates at 1450 various analytical processing that may be performed with respect to this step.

Figure 30:
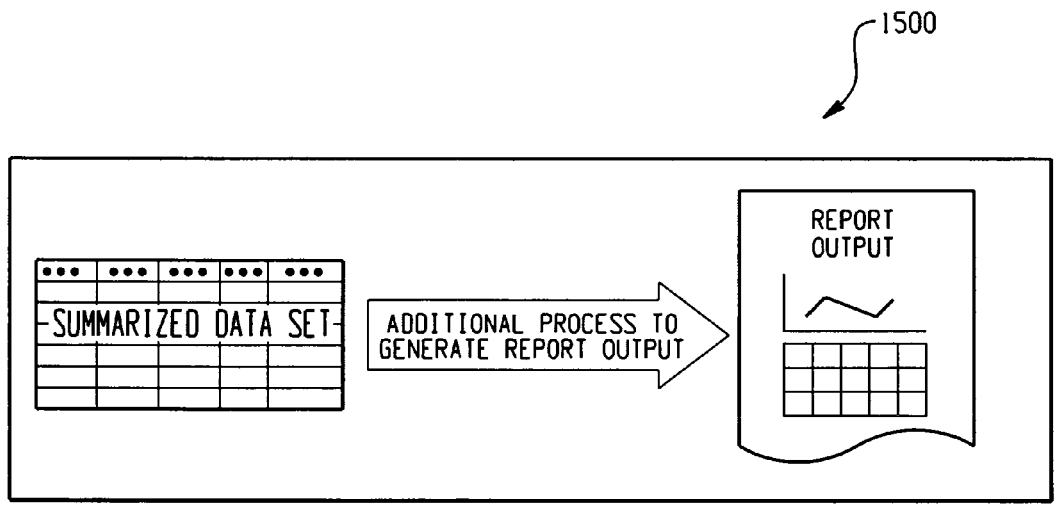
FIG. 30 illustrates step 5 of analysis processing for creating the report output.

Step 5—Generation of the report/analysis output. After the analytical processing occurs, the results are presented either graphically, in tables, or a combination both. The type of report output is mainly dependent on the analysis type, however user selected options do play a role in some circumstances. For most of the base analyses, output would include graphics and a summary table. FIG. 30 illustrates at 1500 creating the report output.

The steps that have been outlined above provide an overview of the steps that takes place in order to create a report or analysis from the detailed claims and product information retrieved from the filtering process. More detailed information about the basic processing steps which occur in each analysis specifically are provided below.

The calculation method selected by the user will dictate how the analysis variable would be calculated when creating a report/analysis. As described in the document, 2 calculation methods are supplied by default: (1) Unadjusted Calculation method, and (2) Adjusted Calculation method. The main difference between the two methods is that the adjusted method will take into account the age base of the population, treating units with different ages differently in the calculation. As a result, the adjusted method would provide a projected value of the analysis variable; a value which would be expected if all units were to reach the same time age. In contrast, the unadjusted method treats units that have different values for time in service (i.e., different age) the same. In other words, the unadjusted method will not treat age as a factor in the calculation.

The following provides more details and the mathematical formulas behind the analysis variable calculations for each calculation method.

The following notation will be used into the formulas for calculating the analysis variables via unadjusted and adjusted calculation methods. When referred to, claim time in service bin value may represent the claim time in service bin value, claim time in service bin value from build, or claim time in service bin value from sale, whichever may be applicable based on the warranty program type and selection of time in service point of view (if warranty program type is 3 or 4). Similarly, product time in service bin value may be the product time in service bin value, product time in service bin value from build, or the product time in service bin value from sale.

- Let $i=1, 2, \ldots, K$ represent the $i^{th}$ claim time in service bin value divided by the usage bin length (default value of 30).
- Let K represent the Maximum Exposure Value divided by the usage bin length (default value of 30). If no Maximum Exposure Value is specified, then K represents the maximum claim time in service bin value in the claims data subset divided by the usage bin length.
- Let $j=1, 2, \ldots, M$ represent the $j^{th}$ product time in service bin value divided by the usage bin length (default value of 30).
- Let M represent the maximum product time in service bin value in the product data subset divided by the usage bin length.
- Let T represent the Maturity Level specified divided by the usage bin length (default value of 30).
- Let $c_{ij}$ represent the number of claims made in the $30*i^{th}$ claim time in service bin period for units currently in the $30*j^{th}$ product time in service bin period, assuming the usage bin length is 30.
- Let $n_j$ represent the number of units currently in the $30*j^{th}$ product time in service bin period, assuming the usage bin length is 30.
- Let $s_{ij}$ represent the sum of the cost for all claims made in the $30*i^{th}$ claim time in service bin period for units currently in the $30*j^{th}$ product time in service bin period, assuming the usage bin length is 30.
- Let $X_k$ represent the cumulative claim rate at the $k^{th}$ time in service period
- Let $S_k$ represent the cumulative total claim cost at $k^{th}$ time in service
- Let $C_k$ represent the cumulative total claim count at the $k^{th}$ time in service
- Let $q_k$ represent the cumulative claim cost per unit at the $k^{th}$ time in service period Unadjusted Calculation Method The formulas for calculating the analysis variables using the unadjusted method are:

(1) Unadjusted Total Claim Count $$C_k = \sum_{i=max(1,T)}^{M} \sum_{j=1}^{K} c_{ij}$$

(2) Unadjusted Claim Rate $$X_k = \frac{\sum_{i=max(1,T)}^{M} \sum_{j=1}^{K} c_{ij}}{\sum_{i=max(1,T)}^{M} n_i}$$

(3) Unadjusted Total Claim Cost $$S_k = \sum_{i=max(1,T)}^{M} \sum_{j=1}^{K} s_{ij}$$

(4) Unadjusted Claim Cost Per Unit $$q_k = \frac{\sum_{i=max(1,T)}^{M} \sum_{j=1}^{K} s_{ij}}{\sum_{i=max(1,T)}^{M} n_i}$$

Adjusted Claim Rate Calculation

The following are the formulas for adjusted claim rate and adjusted claim cost per unit.

(1) Adjusted Claim Rate $$X_k = \sum_{j=1}^{K} \frac{\sum_{i=max(1,T)}^{M} c_{ij}}{\sum_{i=max(j+1,T)}^{M} n_i + \frac{1}{2} n_j}$$

(2) Adjusted Cost Per Unit $$q_k = \sum_{j=1}^{K} \frac{\sum_{i=max(1,T)}^{M} s_{ij}}{\sum_{i=max(j+1,T)}^{M} n_i + \frac{1}{2} n_j}$$

(1) Adjusted Claim Rate $$X_k = X_{k-1} + \left(\frac{f_k}{n_k}\right)(1 - X_{k-1}) \text{ where}$$

$$\frac{f_k}{n_k} = \sum_{j=1}^{K} \frac{\sum_{i=max(1,T)}^{M} c_{ij}}{\sum_{i=max(j+1,T)}^{M} n_i + \frac{1}{2} n_j - \sum_{i=max(j+1,T)}^{M} \sum_{j=1}^{M} c_{ij}}$$

(2) Adjusted Cost Per Unit $$q_k = X_{k-1} + \left(\frac{f_k}{n_k}\right)(1 - X_{k-1}) \text{ where}$$

$$\frac{f_k}{n_k} = \sum_{j=1}^{K} \frac{\sum_{i=max(1,T)}^{M} s_{ij}}{\sum_{i=max(j+1,T)}^{M} n_i + \frac{1}{2}n_j - \sum_{i=max(j+1,T)}^{M} \sum_{j=1}^{M} c_{ij}}$$

Independent of the selection identifying which claims to consider, the following are the formulas to calculate total claim count and total claim cost, via the adjusted method. These are sometimes referred to as projected values.

(1) Adjusted Total Claim Count $$S_k = \left(\sum_{i=max(1,T)}^{M} n_i\right)(x_k)$$

(2) Adjusted Total Claim Cost $$S_k = \left(\sum_{i=max(1,T)}^{M} n_i\right)(q_k)$$

Pareto Analysis Processing Details

The following steps outline the processing which occurs to generate a Pareto Analysis from the detailed products and claims information that results from the filtering process.

(1) The detailed products data is summarized by the by variable, reporting variable, and the product time in service bin value as applicable given options selected by the user, the warranty program type, and elements in the products data set. Some product records would be excluded if a maturity value was specified. This process creates a summarized products data set.

(2) For warranty program type 3 or 4, if the Time in Service point of view selected is from sale, then the build to sale lag profile is applied to the summarized products information in order to create estimated sales data.

(3) The detailed claims data set is summarized by the by variable, reporting variable, and the claim time in service bin value as applicable given options selected by the user and the warranty program type. Some claim records may be excluded if a maturity level and/or maximum exposure value were specified and if pre-delivery claims are to be excluded. This process creates a summarized claims data set.

(4) The summarized claims and products data sets are merged together in order to match up the number of units at risk with the number of claims occurred within each time in service period, given values of the by and reporting variables as applicable. How the merge occurs would be dictated by the values selected for calculation method and claims to consider, both of which identify how the number of units at risk should be identified within a time in service period (e.g., whether or not to adjust for the age base of the population will result in a different quantity to use for the number of units at risk within each time in service period).

(5) For warranty program types 2 or 3, if usage profiles are to be applied to the analysis then the at-risk sample size within each time in service period (for each by and reporting variable value, if applicable) in the merged data set would be updated to account for those units that are estimated to have fallen out of warranty by exceeding the usage dimension prior to the time dimension of the warranty program.

(6) All variables associated with the analysis variable type of the selected analysis variable, along with all other values such as sample size, maximum exposure value and mean exposure value, would be calculated based on the calculation method and taking into consideration all other analysis options selected. One record would result for each combination of by and reporting variable values. This record would contain cumulative calculated quantities with respect to, either, the maximum exposure value (if one was specified) or the maximum claim time in service bin value in the data (e.g., if a user specifies a maximum exposure value of 90 days, then all calculated values associated with the analysis variable type would be cumulative values at 90 days in service). The sample size, maximum exposure time, and mean exposure time would also included to provide a summary of the products data used in the calculations. This summarized table is the information which may be downloaded to a CSV (comma separated value) file from the report output, and is the basis that the report output is generated from.

(7) Graphical and tabular output is created using Proc Pareto from SAS/QC which is available from SAS Institute Inc. The graphical and tabular output will only display the top N values (N being the maximum number of bars specified in the analysis options) of the reporting variable, for each value of the by variable (provided a by variable was specified and does not violate the maximum by variable value rule for Pareto). While the report output displayed would only contain the top N values, the summarized table, which can be downloaded to a CSV (comma separated value) file, will contain records for all values of the reporting and by variable (if applicable).

Trend/Control Analysis Processing Example

The following steps outline the processing which occurs to generate a Trend/Control Analysis from the detailed products and claims information that results from the filtering process:

(1) The detailed products data is summarized by the by variable, production period, and the product time in service bin value as applicable given options selected by the user, the warranty program type, and elements in the products data set. Some product records would be excluded if a maturity value was specified. This process creates a summarized products data set.

(2) For warranty program type 3 or 4, if the Time in Service point of view selected is from sale, then the build to sale lag profile is applied to the summarized products information in order to create estimated sales data.

(3) The detailed claims data set is summarized by the by variable, production period, and the claim time in service bin value as applicable given options selected by the user and the warranty program type. Some claim records may be excluded if a maturity level and/or maximum exposure value were specified and if pre-delivery claims are to be excluded. This process creates a summarized claims data set.

(4) The summarized claims and products data sets are merged together in order to match up the number of units at risk with the number of claims occurred within each time in service period, given values of the by and production period as applicable. How the merge occurs would be dictated by the values selected for calculation method and claims to consider, both of which identify how the number of units at risk should be identified (e.g., whether or not to adjust for the age base of the population will result in a different quantity to use for the number of units at risk within each time in service period).

(5) For warranty program types 2 or 3, if usage profiles are to be applied to the analysis then the at-risk sample size within each time in service period (for each by and production period variable value, if applicable) in the merged data set would be updated to account for those units that are estimated to have fallen out of warranty by exceeding the usage dimension prior to the time dimension of the warranty program.

(6) Since the production period to chart represents a date value, missing intermittent production periods (i.e., production periods that are missing between the minimum and maximum production periods that are present in the products subset of data) will be imputed. The imputed values, for variables such as claim count or product count, for that production period would be missing characters (i.e., we want to signify these values as missing and not 0).

(7) All variables associated with the analysis variable type of the selected analysis variable, along with all other values such as sample size, maximum exposure value and mean exposure value, would be calculated based on the calculation method and taking into consideration all other analysis options selected. One record would result for each combination of by and reporting variable values. This record would contain cumulative calculated quantities with respect to, either, the maximum exposure value (if one was specified) or the maximum claim time in service bin value in the data (e.g., if a user specifies a maximum exposure value of 90 days, then all calculated values associated with the analysis variable type would be cumulative values at 90 days in service). The sample size, maximum exposure time, and mean exposure time would also included to provide a summary of the products data used. This summarized table is the information which may be downloaded to a CSV (comma separated value) file from the report output, and is the basis that the report output is generated from.

(8) Graphical and tabular output is created from the summarized table. If no control chart was requested by the user, then only a trend chart would be created. The trend chart would be a plot displaying the selected analysis variable (on the y-axis) versus each production period (on the x-axis). A separate line would be generated for each value of the by variable, provided one was specified and it does not violate the maximum by variable value rule for Trend/Control, and all lines would be overlaid on the same plot. The summary table would include all information displayed in the chart, along with all other calculated values, such as those values calculated based on the type of analysis variable selected, sample size, etc.

(9) If the user requests a control chart in addition to the trend chart, then a control chart is generated using Proc Shewhart from SAS/QC. The control chart would be setup to monitor the selected analysis variable across production periods, with respect to a particular time in service value (either the maximum exposure value, if specified, or the maximum claim time in service bin value in the data). If a by variable was specified and applied, then a different control chart would be created for each value of that variable. The type of control chart generated would be an IR Chart (Individual Measurements with Moving Ranges), and all Western Electric rules would be applied. Control limits for the chart will be calculated by the SAS procedure unless the user has specified specific values to use in the analysis options. For more details on the generation of the control chart, please refer to SAS/QC documentation.

Exposure Analysis Processing Example

The following steps outline the processing which occurs to generate an Exposure Analysis from the detailed products and claims information that results from the filtering process.

(1) The detailed products data is summarized by the by variable and the product time in service bin value as applicable given options selected by the user, the warranty program type, and elements in the products data set. Some product records would be excluded if a maturity level was specified. This process creates a summarized products data set.

(2) For warranty program type 3 or 4, if the Time in Service point of view selected is from sale, then the build to sale lag profile is applied to the summarized products information in order to create estimated sales data. The resulting data set would identify the number of units estimated to be at risk for each product time in service from sale value, for each value of the by variable (if applicable).

(3) The detailed claims data set is summarized by the by variable and the claim time in service bin value as applicable given options selected by the user and the warranty program type. Some claim records may be excluded if a maturity level and/or maximum exposure value were specified and if pre-delivery claims are to be excluded. This process creates a summarized claims data set.

(4) The summarized claims and products data sets are merged together in order to match up the number of units at risk with the number of claims which occurred within each time in service period, given values of the by variable, if applicable. How the merge occurs would be dictated by the values selected for calculation method and claims to consider, both of which identify how the number of units at risk should be identified (e.g., whether or not to adjust for the age base of the population will result in a different quantity to use for the number of units at risk within each time in service period).

(5) For warranty program types 2 or 3, if usage profiles are to be applied to the analysis then the at-risk sample size within each time in service period (for each by variable value, if applicable) in the merged data set would be updated to account for those units that are estimated to have fallen out of warranty by exceeding the usage dimension prior to the time dimension of the warranty program.

(6) If the type of Exposure Chart requested is cumulative, then all variables associated with the analysis variable type of the selected analysis variable, along with all other values such as sample size, maximum exposure value and mean exposure value, would be calculated based on the calculation method and taking into consideration all other analysis options selected. A record would be kept for each combination of the by variable, if applicable, and time in service value up to either the maximum exposure value (if one was specified) or the maximum product time in service bin value in the data, whichever value is smaller. Each record would contain cumulative calculated quantities, such as claim count, rate, etc., with respect to that particular time in service value (and by variable, if applicable). For example, if a user specified a maximum exposure value of 360 days, an analysis variable of claim count, and no by variable, then there would be a record for each time in service bin value from 0 to 360 (i.e., 0, 30, 60, 90, ... , 360) displaying calculated values for cumulative claim count (and cumulative claim cost) at that time in service value (based on formulas presented herein). Each record would also present values for sample size, maximum exposure time, and mean exposure time to provide a summary of the products data used.

(7) If an incremental Exposure Chart was requested, then all variables associated with the analysis variable type of the selected analysis variable, along with all other values such as sample size, maximum exposure value and mean exposure value, would be calculated using the following formulas which are slight modifications to those presented earlier.

a. Adjusted Calculation Method and Analysis Variable Claim Count $$C_j = \left( \frac{\sum_{i=max(j,T)}^{M} c_{ij}}{\sum_{i=max(j+1,T)}^{M} n_i + \frac{1}{2} n_j} \right) \left( \sum_{i=max(1,T)}^{M} n_i \right)$$

b. Adjusted Calculation Method and Analysis Variable Claim Cost $$S_j = \left( \frac{\sum_{i=max(j,T)}^{M} s_{ij}}{\sum_{i=max(j+1,T)}^{M} n_i + \frac{1}{2} n_j} \right) \left( \sum_{i=max(1,T)}^{M} n_i \right)$$

c. Adjusted Calculation Method and Analysis Variable Claim Rate $$X_j = \left( \frac{\sum_{i=max(j,T)}^{M} c_{ij}}{\sum_{i=max(j+1,T)}^{M} n_i + \frac{1}{2} n_j} \right) \left( \sum_{i=max(1,T)}^{M} n_i \right)$$

d. Adjusted Calculation Method and Analysis Variable Cost Per Unit $$q_j = \left( \frac{\sum_{i=max(j,T)}^{M} s_{ij}}{\sum_{i=max(j+1,T)}^{M} n_i + \frac{1}{2} n_j} \right)$$

e. Unadjusted Calculation Method and Analysis Variable Claim Count $$C_j = \sum_{i=max(j,T)}^{M} c_{ij}$$

f. Unadjusted Calculation Method and Analysis Variable Claim Cost $$S_j = \sum_{i=max(j,T)}^{M} s_{ij}$$

g. Unadjusted Calculation Method and Analysis Variable Claim Rate $$X_j = \frac{\sum_{i=max(j,T)}^{M} c_{ij}}{\sum_{i=max(j,T)}^{M} n_i}$$

h. Unadjusted Calculation Method and Analysis Variable Cost Per Unit $$q_j = \frac{\sum_{i=max(j,T)}^{M} s_{ij}}{\sum_{i=max(j,T)}^{M} n_i}$$

(8) Similar to the cumulative exposure chart, one record would be kept for each combination of the by variable, if applicable, and time in service values. More specifically, a record would be kept for each time in service value up to either the maximum exposure value (if one was specified) or the maximum product time in service bin value in the data, whichever value is smaller. However, in contrast to the cumulative exposure chart, each record would contain incrementally calculated quantities, such as claim count, rate, etc., with respect to that particular time in service value (and by variable, if applicable). For example, if a user specified a maximum exposure value of 360 days, an analysis variable of claim count, and no by variable, then there would be a record for each time in service bin value from 0 to 360 (i.e., 0, 30, 60, 90, ... , 360) displaying calculated values for the incremental claim count (and cumulative claim cost) for that particular time in service value. Each record would also present values for sample size, maximum exposure time, and mean exposure time.

Therefore, for a particular time in service period, the cumulative exposure chart would represent claims activities up to and including that particular time in service interval. With the incremental exposure chart, the calculated values would represent claims activities that occurred within that particular time in service interval.

This summarized table is the information which may be downloaded to a CSV (comma separated value) file from the report output, and is the basis that the report output is generated from.

(9) Graphical output would plot the selected analysis variable on the Y-axis versus time in service on the X-axis. If a by variable was specified and if it meet the distinct by variable value rule for the exposure analysis, then each value of the by variable would result in a different line being plotted, with all lines overlaid in the graphical display.

Trend by Exposure Analysis Processing Example

The following steps summarize the process which occurs to generate a Trend by Exposure Analysis from the detailed products and claims information that results from the filtering process.

(1) The detailed products data is summarized by production month (the implicit reporting variable for the Trend by Exposure analysis) and product time in service bin value, as applicable given options selected by the user, the warranty program type, and elements in the products data set. Some product records would be excluded if a maturity value was specified. This process creates a summarized products data set.

(2) For warranty program type 3 or 4, if the from sale Time in Service point of view is selected, then the build to sale lag profile is applied to the summarized products information in order to create estimated sales data.

(3) The detailed claims data set is summarized by production month and claim time in service bin value, as applicable given options selected by the user and the warranty program type. Some claim records may be excluded if a maturity level and/or maximum exposure value were specified and if pre-delivery claims are to be excluded. This process creates a summarized claims data set.

(4) The summarized claims and products data sets are merged together in order to match up the number of units at risk with the number of claims that occurred within each time in service period, within values of production month. How the merge occurs would be dictated by the values selected for calculation method and claims to consider, both of which identify how the number of units at risk should be identified within a time in service period (e.g., whether or not to adjust for the age base of the population will result in a different quantity to use for the number of units at risk within each time in service period).

(5) For warranty program types 2 or 3, if usage profiles are applied to the analysis then the at-risk sample size within each time in service period (for each production month) in the merged data set would be updated to account for those units that are estimated to have fallen out of warranty by exceeding the usage dimension prior to the time dimension of the warranty program.

(6) Missing intermittent production periods (i.e., production periods that are missing between the minimum and maximum production periods that are present in the products subset of data) will be imputed. The values imputed would be missing characters (i.e., we want to signify these values as missing and not 0).

(7) All variables associated with the analysis variable type of the selected analysis variable, along with all other values such as sample size, maximum exposure value and mean exposure value, would be calculated based on the calculation method and taking into account all other analysis options selected. Several records, each with respect to a different time in service interval value, would result for each production month value. By default, for each production month, records would be calculated with respect to the 30 day, 90 day, 180 day, 360 day, 720 day, and 1080 day time in service intervals. Each of these records, for each production month, would contain cumulative calculated quantities for the analysis variable with respect to the time in service interval of that particular record. For example, for July 2000, there would be a record representing cumulative claims activity for each of the 30, 60, 90, 180, 360, 720, and 1080-day in service intervals. If the analysis variable selected was claim rate then, for the record corresponding to the July 2000 and 90-day time in service interval, the cumulative claim count at 90 days in service (representing claims activity from 0 to 90 days), cumulative claim cost at 90 days in service, and cumulative claim rate and cost per unit would all be calculated. Records with respect to 30, 60, 180, 360, 720, and 1080 days in service would also be calculated, similarly, for the July 2000 production month.

The sample size, maximum exposure time, and mean exposure time are also included to provide a summary of the products data used. This summarized table is the information which may be downloaded to a CSV (comma separated value) file from the report output, and is the basis that the report output is generated from.

(8) The graphical representation will display production month on the x-axis versus the selected analysis variable on the y-axis, with a separate line plotted for each time in service value (i.e., 30, 60, 90, 180, 360, 720, and 1080 day intervals). All of the plotted lines would be overlaid on the same graphical plot. The output is similar to the trend chart where an analysis variable is plotted versus production month with a categorical by variable. The difference with the Trend by Exposure output is that the by variable is time in service, and its calculation is determined a little differently. The summarized table will contain all information represented graphically, along with all other values that have been calculated (e.g., those based on the analysis variable type, sample size, maximum exposure time in service value, mean time in service value, etc.).

Statistical Drivers Analysis Processing Example

The following steps outline the processing which occurs to generate a Statistical Drivers Analysis from the detailed products and claims information that results from the filtering process.

(1) If none of the reporting variables selected are part of the products data subset, then the detailed products data is summarized solely by the product time in service bin value (refer to this as the overall product summary). If all of the reporting variables selected are part of the products data set then the detailed products data is, effectively, summarized several times, once for each reporting variable specified. Each summarization, for each reporting variable selected, would be by the reporting variable and the product time in service value. If some, but not all, of the reporting variables selected are part of the products data set then the products data set would be summarized several times, once for each reporting variable selected, by the reporting variable and the product time in service value and it would also be summarized solely by product time in service as well (creating the overall product summary). The product time in service bin variable to use would depend on the warranty program type and the selection of time in service point of view, if warranty program type was either 3 or 4. Some product records may be excluded if a maturity level was specified. This process would create summarized product information for each reporting variable specified and/or an overall product summary, depending on the reporting variables specified and whether they reside on the products or claims data sets, or both.

(2) For warranty program types 3 or 4, if the Time in Service point of view selected is from sale, then the build to sale lag profile is applied to the summarized product information (i.e., to the overall product summary and to the product summary for each reporting variable that is part of the products data set) in order to create estimated sales data for each reporting variable in the products data set, and overall.

(3) The detailed claims data is also summarized several times, once for each reporting variable specified. Each summarization would be by the reporting variable and the claim time in service value. Which claim time in service variable to use would depend on the warranty program type and the selection of time in service point of view if warranty program type was either 3 or 4. Some claim records may be excluded if a maximum exposure value is specified, a maturity level is specified, and/or if pre-delivery claims are to be excluded. This process would create summarized claims information for each reporting variable specified.

(4) For each reporting variable specified, the summarized claims and products information would be merged together in order to match up the number of units at risk with the number of claims that occurred within each time in service period. How the merge would occur for each selected reporting variable would be dependent on whether or not the reporting variable was part of the products data and the calculation method selected.

(5) For warranty program types 2 or 3, if usage profiles are to be applied to the analysis then the at-risk sample size within each time in service period, for each reporting variable, would be updated to account for those units that are estimated to have fallen out of warranty by exceeding the usage dimension prior to the time dimension of the warranty program.

(6) Cumulative claim counts and claim rates, along with other values such as sample size, maximum exposure value and mean exposure value, would be calculated based on values selected for the calculation method and other analysis options. The calculations would occur for each reporting variable value resulting in a single record being generated for each value of a reporting variable, for each reporting variable selected. This record would contain calculated cumulative quantities (i.e., claim rate and claim count) with respect to either the maximum exposure value (if one was specified) or the maximum claim time in service bin value in the data, whichever is the lesser. For example, if a user specifies a maximum exposure value of 90 days, then cumulative values for total claim count and claim rate would be calculated that represent claims activity up to 90 days in service for each value of each reporting variable selected. This summarized table is the information which may be downloaded to a CSV (comma separated value) file from the report output and is the basis that the report output is generated from.

(7) The next step in the process would be to identify whether or not claims activity differs significantly across the values of each reporting variable. To run this test, an Analysis of Means is performed on each reporting variable. The first step is to define the area of opportunity for each value of each reporting variable selected. The area of opportunity identifies the population size at risk (i.e., the population of units that could have a claim) defined as the number of 1,000 unit groupings.

(8) To fit the Analysis of Mean models to each reporting variable, Proc ANOM is used within SAS/QC. Decision limits (i.e., the acceptable upper and lower limits for claim activity across the values of a reporting variable) are calculated based on the alpha level specified and the area of opportunity values. Proc ANOM will conclude that a reporting variable is significant if the calculated claims count per 1000 units at risk differs significantly across the values of that reporting variable. For each significant reporting variable, a graph is generated in order to represent which values of the reporting variable have values for calculated claim counts per 1000 units at risk that exceed the decision limits. In addition, a summary table is generated in order to highlight the reporting variables that are significant, if any, of those selected for investigation.

Reliability Analysis Processing Example

The following steps outline the processing which occurs to generate a Reliability Analysis from the detailed products and claims information that results from the filtering process.

(1) The detailed products data is summarized by the by variable and the reliability variable. The reliability variable used would be dependent on the warranty program type and, potentially, the value of other analysis options specified (depending on the warranty program type). If the warranty program type is 2 or 3 (i.e., the warranty program is bounded by 2 dimensions, time and some type of usage, and both dimensions are specified on the claim as a result), then the reliability variable can either be time or usage (e.g., miles, hours). If the warranty program type is 3 or 4, then the reliability variable would be time. If the warranty program type is 3 or 4, whether time would be measured from build or from sale (i.e., the estimated time of sale) is dependent on the value for Time in Service Point of View selected by the user.

(2) If the warranty program type is 2 or 3 and the reliability variable selected is usage (e.g., mileage) then there a series of processing steps which should occur prior to the summarizing the products information by the by variable and the reliability variable (usage) since there are no usage values associated with each record in the products data. In other words, the current amount of usage on each product unit should be estimated. First, the detail products data would be summarized by the by variable (if applicable) and product time in service. Usage profiles would then be applied to estimate the number of units that would be at risk for each usage interval given their current product time in service. For example, with automobiles, of those units which currently have between 91 and 120 days in service (i.e., in the 120 product days in service bin), the usage profile would be applied to estimate how many have at least 501 miles, at least 1001 miles, at least 1501 miles, etc. The type of usage would depend on the product and the size of the usage interval bin used (e.g., 500 mile bins) would depend on the implementation. These redistributed values would then be summarized by the by variable (if applicable) and the reliability variable (i.e., usage variable). The resulting summarized products data set would identify for each value of the by variable (if applicable) and for each usage (e.g., mileage) interval, the number of units that are estimated to have been at risk in that mileage interval.

(3) For warranty program types 3 or 4, if the Time in Service point of view selected is from sale, then the build to sale lag profile is applied to the summarized products information in order to create estimated sales data summarized by product time in service from sale.

(4) The detailed claims data set is summarized by the by variable (if applicable) and the reliability variable. For warranty program types 3 or 4, the physical variable to use in the summarization process would depend on the time in service point of view selected (from build or from sale).

Pre-delivery claims would be excluded from the analysis as they do not provide a true illustration of pre-delivery activities and may skew the model fit to the data. By default, the methodology in the reliability analysis models time to first failures. Therefore, if a user does not specify a by variable, if a by variable is specified but it does not meet the maximum by variable value rule for reliability, or if the user specifies a by variable that resides in the products data set, then only the first claim record per product unit would be considered in the analysis. In other cases where a by variable is specified and it is not part of the products data, then the first claim per specific claim type per product is kept while all others would be excluded. If a by variable is considered, the goal is to only consider the first claim that occurred on a product unit by value of the by variable. Also, only claims with values for the reliability variable that are less than the warranty program mileage limitation (if warranty program type is 2 or 3 and the reliability variable is usage) or less than the warranty program time length (if warranty program type is 1 or 4, or the warranty program type is 2 or 3 and the reliability variable is time) would be used to fit the reliability model. Other claims that occurred at values greater than these cut off points are excluded in order to prevent the model from being fit on incomplete data. For example, claims that occurred at usage values greater than these cutoffs may be goodwill claims, and including them would effectively underestimate the amount of failures actually occurring in the field and would skew the model fit to the data.

(5) The summarized claims and products data sets are merged together by values of the by variable (if applicable) and the reliability variable in order to match up the number of units that were at risk within each reliability variable interval with the number of claims that occurred in that interval (i.e., interval being some measurement of either time or usage). Details of how the merge occurs will be dependent on the warranty program type and, potentially, other analysis options.

(6) For each value of the by variable (if applicable), missing interval values, for the reliability variable, between the first interval (1-30 days in service or 1-500 miles) and the maximum interval (as determined by either the maximum interval value for the reliability variable that is in the data or the warranty program mileage limitation/warranty program time length specified by the user) would be imputed. The value imputed for claim count for these records would be 0 and the number of units at risk would be identified accordingly.

(7) For warranty program types 2 or 3, if the reliability variable is time and if the user requested usage profiles be applied to the analysis then the at-risk sample size within each time in service period (for each by variable value, if applicable) in the merged data set would be updated to account for those units that are estimated to have fallen out of warranty by exceeding the usage dimension prior to the time dimension of the warranty program. Note that if the reliability variable is usage then the usage profile would have already been applied in an earlier step in the process.

(8) The resulting table will have, for each value of the by variable (if applicable) and each interval of the reliability variable, the number of claims which occurred in that interval and the number of units considered to be at risk at the beginning of that interval. The minimum interval value for each value of the by variable (if applicable) would be the 1-30 day time interval or the 1-500 mile usage interval, for example, depending on what reliability variable was chosen (i.e., Time or Usage). The maximum interval value for each value of the by variable would be the minimum of: (1) the maximum interval value of the reliability variable in the data or, (2) the warranty program usage limitation/warranty program time length, whichever is applicable given the warranty program type and the reliability variable selected by the user. This summarized table would be the information which may be downloaded to a CSV (comma separated value) file from the report output and is the basis from which the report output is generated.

(9) The report output is created via a series of steps. The first step in creating the output is fitting a lifetime distribution to the summarized data. If a by variable was specified and it meets the maximum by variable value rule for reliability, a different model would be fit to each value of the by variable. Otherwise, one model would be fit to the entire data set.

The type of data the model is being fit to is considered Interval Censored data (sometimes referred to as readout data). In other words, for each interval of the reliability variable, the summarized data identifies the number of claims which occurred in that interval and the number of units at risk at the beginning the interval, and units that fell out of service within an interval are censored out. Proc Reliability within SAS/QC is used to fit the lifetime model. The method used to fit the model will either be maximum likelihood estimation or least squares estimation, whichever is specified by the user. The lifetime distribution the data is fit to will also be specified by the user, and will either be lognormal, exponential, or Weibull.

If requested, proc reliability will create a probability plot, b-life table for a select set of values, and/or a table of projected values (for values of the reliability variable) that are derived from the fitted model. In addition, proc reliability will output the parameters for the fitted model. These parameters will be displayed to the user and can be used to characterize the fitted model. These parameters will also be used to create the hazard, failure and/or cumulative failure probabilities as requested by the user.

If a by variable is specified and it meets the maximum by variable value rule for reliability, then a different model is fitted for each value of the by variable. In the graphical output, a different line would be plotted for each value of the by variable, with all lines being overlaid on the same plot. For tabular output, a different column would be displayed for each value of the by variable.

Forecasting Analysis Processing Example

The following steps outline the processing which occurs to generate a Pareto Analysis from the detailed products and claims information that results from the filtering process.

(1) Steps 1 through 6 of the Time of Claim Analysis Processing Details are executed (i.e., all Time of Claim Analysis processing up to the creation of the summarized data set specifying claim count and claim cost by calendar month). The quantitative variables calculated are total claims count and total claims cost and no by variable is specified. If the warranty program type is 2 or 3, no usage profile are applied (i.e., since the purpose of the forecasting analysis is to understand the cost liability of a potential warranty problem for future time periods versus estimating actual failure rates that take account usage profiles to adjust for early drop outs from the population). If the warranty program type is 3 or 4, than the from sale time in service point of view is applied in order to forecast claim costs and count based on what is in the customers hands (please refer to the Time of Claim analysis processing details for more information). The resulting summarized data set would contain records for all calendar months prior to, and including, the month of the last warehouse refresh date. Each record would have the total claim count, total claim cost, and estimated sample size at risk for that calendar month. This provides the historical view point used in the forecasting output.

(2) The next step is to non-parametrically estimate the claim rate for each time in service bin value (e.g., 30-day time in service interval) in the data. This would be accomplished by first summarizing the products data by product time in service bin (if warranty program type is 1 or 2) or product time in service bin from build (if warranty program type is 3 or 4). This results in summarized products data. If warranty program type is 3 or 4, then the build to sale lag profile would be applied to the summarized products data in order to transform the summarized product counts within each time in service interval from a from build perspective to a from sale perspective.

Next, the detailed claims data would be summarized by claim time in service bin (if warranty program type is 1 or 2) or claim time in service bin from sale (if warranty program type is 3 or 4). The average cost per claim would also be determined in this step. The average cost per claim would be the sum of all claim costs divided by the total number of claims being analyzed. This results in summarized claims data.

(3) The summarized claims and products data from the above step would be merged together in order to match up, for each time in service bin value, the number of claims which occurred in an interval with the number of units that were at risk within that interval. The result should contain a record for each time in service bin value from the first time in service interval (i.e., 30-day interval, by default) to the maximum product time in service interval that resides in the data. Missing intermittent intervals would be imputed. The claim counts for the imputed records would be 0, while the number of units at risk for those particular intervals would be determined based accordingly. For each time in service period, a nonparametric estimate for the claim rate is determined by dividing the claim count within that interval by the number of units at risk at the beginning of that interval, less half of the number of units which currently reside in that interval. A nonparametric claim rate estimate is not determined for any time in service period where the adjusted sample size at risk (i.e., the number of units at risk at the beginning of the interval less half of the number of units which currently reside in the interval) does not meet the minimum sample size criteria.

(4) Based on the number of forecasting periods specified by the user and the calendar time associated with these periods, all time in service intervals (i.e., 30-day bins by default) which would span that calendar time frame would be identified. In other words, all time in service periods that any units may experience over the forecasting periods would be identified. For example, suppose today is Jan. 15, 2004, and that units fall into several time in service bins from the 30-day bin to the 360-day bin. Next, suppose that the user wishes to forecast 3 periods into the future, (i.e., to the end of April). Then, those units that are currently 360 days old would fall into the 480-day time in service bin during some calendar time by the end of April. Therefore, we would identify that the 390, 420, 450, 480-day time in service bins would need to be considered in the calculations, in addition to all 30-day bins from 30 to 360.

(5) If a non parametric claim rate is not available for all time in service intervals required (i.e., all time in service bins that were identified in the above step) then a Reliability analysis would be run in order to determine (i.e., project) claim rates for future time in service values that units in the population have not yet experienced, or not enough units have yet to reach. In the example introduced above, nonparametric estimates for the claim rate for each 30-day time in service period from the 30 to 360-day time in service period would be determined from the data available but claim rates for the 390, 420, 450, and 480-day time in service bins would be determined from a fitted reliability model. Proc Reliability in SAS/QC is used to fit a Weibull lifetime model to the summarized interval data from step 2 (where, for each time in service bin, the number of claims within an interval and the number of units at risk at the beginning of that interval are specified). The model is fit using the least squares fit estimation method.

(6) The fitted model would be used to determine claim rates for each 30-day time in service periods that a parametric estimate for claim rate is required for. This information is concatenated to the non parametric rates calculated in step 2. When all is complete, there should be estimated claim rates for all time in service periods that units are expected to reside in between today and the end of the forecasting period (e.g., to continue the example introduced above, there should be an estimated claim rate for each 30-day time in service period from the 30-day bin to the 480-day time in service bin).

(7) For the end of each future forecast period (i.e., for the end of each future calendar month), identify the number of units that will be at risk within each time in service period (i.e., determine the age base of the population at the end of each future calendar month). Base this estimate on the current age base of the population and any future period sales estimates and/or current period sales estimates specified. In other words, identify the age base of the population at risk (using what's currently in service and what is estimated to go into service) for each future forecast period (month). For example, identify the number of units that will fall in each time in service bin, from the 30-day to the 480-day bin, at the end of February, March, and April.

(8) For each future calendar month, using the estimated age base of the population at that time (identified by time in service period) and the claim rate estimates for each time in service period (determined, either, parametrically or non-parametrically), estimate the number of claims expected to occur. This provides the forecasted claim count for each future calendar month. Multiplying this value by the average cost of a claim (identified in step 2 of the process) would provide a forecasted value for claim cost for each calendar month.

(9) The resulting data set would have a record for each calendar month (past, current, and future). The number of future calendar months (i.e., records corresponding to future calendar months) would equal the number of forecasting periods specified. Each record representing a past calendar periods would display the actual total claim count and total cost of claims activities that occurred within that month, along with the number of units that were at risk within that month. For each record representing a future calendar period (month), the record would display the forecasted claim count and total claim cost expected to occur in that calendar month, along with an estimated count for the number of units at risk within that month. Depending on the last warehouse refresh date, the current month (current month relative to the last warehouse refresh date) would contain the actual claim count, a forecasted claim count, or a combination of the two. This creates the summarized data set used to create the graphical output and that could be downloaded to a CSV (comma separated value) file.

(10) The graphical report is created. The graph will plot the selected analysis variable (claim cost of claim count) on the y-axis and calendar month on the x-axis. A different color, line type, and plotting positions would be used to discern the actual historic values from the forecasted values.

Time of Claim Analysis Processing Example

The following steps outline the processing which occurs to generate a Time of Claim Analysis from the detailed products and claims information that results from the filtering process.

(1) The detailed products data is summarized by the by variable (if applicable) and a calendar month that represents the month the unit went into service. This calendar month value assists in defining what is determined to be at risk for a given calendar point in time.

The date to use in order to define the calendar month that a unit went into service is dependent on the warranty program type and, potentially, other analysis options selected by the user. If the warranty program type is 1 or 2 then the calendar month used would be the month the unit was sold to the consumer. If the warranty program type is 3 or 4 and the time in service point of view is from build then the production month of the unit is the calendar month to use for the in service month. If the warranty program type is 3 or 4 and the time in service point of view is from sale then the estimated month of sale (which will be calculated in the following step utilizing the production month of all the units and the build to sale lag profile) would be used.

(2) For warranty program types 3 or 4, if the from sale Time in Service point of view is selected, then the build to sale lag profile is applied to the summarized products information in order estimate the number of units sold within each calendar month.

(3) The detailed claims data set is summarized by the by variable (if applicable) and the month in which the claim occurred. Some claim records may be excluded if pre-delivery claims are to be excluded. This process creates a summarized claims data set.

(4) The summarized claims and products data sets are merged together by the by variable (if applicable) and calendar month. Any months that are missing between the minimum product in service calendar month and the maximum month a claim occurred in are imputed. Values for variables such as claim count and claim cost would be set to 0 for these imputed months. For each calendar month, the number of units at risk in that month is determined using the summarized product counts from elapsed calendar months and information, specified by the user, for the warranty program time limitation or the warranty expiration date (dependent on the warranty program type and other options specified) which would identify when (what calendar month) a units should be removed from the population at risk because it has fallen out of warranty (for example).

Mathematically, within each value of the by variable (if applicable), the formula to determine the sample size at risk for each calendar month, $N_k$, would be as follows.

$$N_k = \sum_{i=max(0,K-T)}^{K} n_i$$

In the formula above, $n_i$ represents the number of products currently in the $i^{th}$ calendar month, where i=1 for the earliest calendar month for which products went in service and T represents the value selected for the warranty program time limitation or the warranty expiration date (whichever was specified). The values for i and T would be dependent on the by variable, if one was applicable. The processing would result in a data set that had the following for each calendar month (i.e., month/year value): (1) The number of claims that occurred in that month/year, (2) The cost of claims that occurred in that month/year, (3), The total for any other quantitative claim value that needs to be calculated (based on the analysis variable specified) using the claims activity which occurred in that month/year, and (4) The number of units at risk within that calendar month/year (based on the above formula).

(5) For warranty program types 2 or 3, if usage profiles need to be applied to the analysis then the at-risk sample size within each calendar month in the merged data set would be updated to account for those units that are estimated to have fallen out of warranty prior to that calendar month by exceeding the usage dimension prior to the time dimension of the warranty program.

(6) Any additional variables associated with the analysis variable type of the selected analysis variable would be calculated (e.g., claim rates for each calendar month). The resulting data set would have one record for each calendar month between the minimum product in service month and the maximum calendar month in which a claim occurred, for each value of the by variable provided one is applicable. The record would include calculated quantities for the analysis variable, all other quantitative values associated with the analysis variable type of the analysis variable selected, and the estimated sample size at risk within each calendar month. This summarized table is the information which may be downloaded to a CSV (comma separated value) file from the report output, and is the basis used to generate the report output.

(7) Graphical and tabular output is created. The graphical output would plot the calendar month on the x-axis versus the analysis variable selected on the y-axis. If a by variable was specified and it meets the maximum by variable value rule for Time of Claim, a different line overlaid on the same plot would be created for each of it's values. Tabular output will display all results from the summarized table.

Geographic Analysis Processing Example

The following steps outline the processing which occurs to generate a Geographic Analysis from the detailed products and claims information that results from the filtering process.

(1) The detailed products data is summarized by dealer state, an implicit reporting variable for the geographic analysis, and the product time in service bin value (whichever is applicable given the warranty program type and other analysis options selected). The dealer state variable has different meaning based on which data set it originates from (either product or claims). In the products data set, dealer state would represent the state where the unit went into service (i.e., the state the unit was sold in or put into the customer hands). In the claims data set, the dealer state would represent the state where the repair was made. This logic has been put into place in order to match up what was repaired in a particular location with what is in service in that location. Please note that the term "state" has been used to define a particular region of a country, and the region may differ from country to country. For example, in Canada, this value would represent province. Some product records would be excluded if a maturity value was specified. This process creates summarized products information.

(2) For warranty program types 3 or 4, if the Time in Service point of view selected is from sale, then the build to sale lag profile is applied to the summarized products information in order to create estimated sales data.

(3) The detailed claims data set is summarized by dealer state and the claim time in service bin value (whichever is applicable given the warranty program type and other analysis options selected). In the claims data set, the dealer state would represent the state where the repair was made. Some claim records may be excluded if a maturity level and/or maximum exposure value were specified and if pre-delivery claims are to be excluded. This process creates a summarized claims data set.

(4) The summarized claims and products data sets are merged together in order to match up the number of units at risk with the number of claims that occurred within each time in service period for each value of dealer state. How the merge occurs would be dictated by the values selected for calculation method and claims to considered, both of which identify how the number of units at risk should be identified within a time in service period (e.g., whether or not to adjust for the age base of the population will result in a different quantity to use for the number of units at risk within each time in service period).

(5) For warranty program types 2 or 3, if usage profiles are to be applied to the analysis then the at-risk sample size within each time in service period (for each value of dealer state) in the merged data set would be updated to account for those units that are estimated to have fallen out of warranty by exceeding the usage dimension prior to the time dimension of the warranty program.

(6) All variables associated with the analysis variable type of the selected analysis variable, along with all other values such as sample size, maximum exposure value and mean exposure value, would be calculated based on the calculation method and taking into consideration all other analysis options selected. One record would result for each value of dealer state. This record would contain cumulative calculated quantities with respect to either the maximum exposure value (if one was specified) or the maximum claim time in service bin value in the data (e.g., if a user specifies a maximum exposure value of 90 days, then all calculated values associated with the analysis variable type would be cumulative values at 90 days in service). The sample size, maximum exposure time, and mean exposure time are also included to provide a summary of the products data used in the calculations. This summarized table is the information which may be downloaded to a CSV (comma separated value) file from the report output, and is the basis that the report output is generated from.

(7) A geographical map and tabular output is created. The map is color coded, using differences in shades, to depict varying magnitude of the analysis variable. Locations with the highest value of the analysis variable will be darkest, while the location with the lowest value of the analysis variable will be lightest. Locations with no value receive no color (in this case white). The color to use is selected by the user and only a single color is used to prevent issues with individuals who are color blind. Currently this analysis will only display locations (i.e., states or provinces) that are part of North America. For each implementation of the solution, the project team will need to determine if other geographic areas are required. Adding additional geographic regions is available as a customization. The Pareto Analysis can also be used to present similar results, without any customizations, for areas outside the current scope of this analysis. For example, a Pareto chart can be generated using dealer state as the reporting variable. Tabular output will display all results from the summarized table.

Detail Report Processing Example

The following steps summarize the process which occurs to generate a Detail Report.

(1) The current subset of data (either claims or products depending on what type of detail report was selected) is used as the input. If the user specifies any keyword search criteria for a comment field, only those records that match the criteria will be included (the criteria may require either all keywords match or at least one).

(2) For a detailed product report, some product records may be excluded if a maturity value is specified.

(3) For a detailed claim report, some claim records may be excluded if a maturity level and/or maximum exposure value are specified and if pre-delivery claims are to be excluded. Other claim records may be excluded if the user chose something other than "include all claims" for the claims to consider option.

(4) The output is presented in a tabular format, with only the specified number of row per page as selected by the user. This option prevents extremely large tables from creating performance issues when returning results to the user's browser. The user can page forward and backward through the pages of information. Additionally, users may sort the table by clicking on any column included in the report. Clicking on the same column a second time will reverse the sort order (ascending vs. descending).

(5) The entire detail report may be downloaded to a CSV (comma separated value) file once the report has been created.

Build to Sale Lag Profiles Example

For warranty program types 3 or 4, sales data is not available for all units in the at risk population. In this situation, the user is given the opportunity to either analyze data with respect to the date units were built (from build) or estimate time in service of units from sale. This user makes his/her election by selecting a Time in Service Point of View. If a user chooses the from sale Time in Service Point of View, than a process occurs which takes applies the build to sale lag profile. This profile illustrates how units enter service. It is a distribution depicting the lag, in days, between the build date and sold date of units.

In the processing details for many of the analyses, there is a step that identifies that the build to sale lag is applied to create estimated sales data. The following example illustrates the steps in the process when applying the lag profiling.

Figure 31:
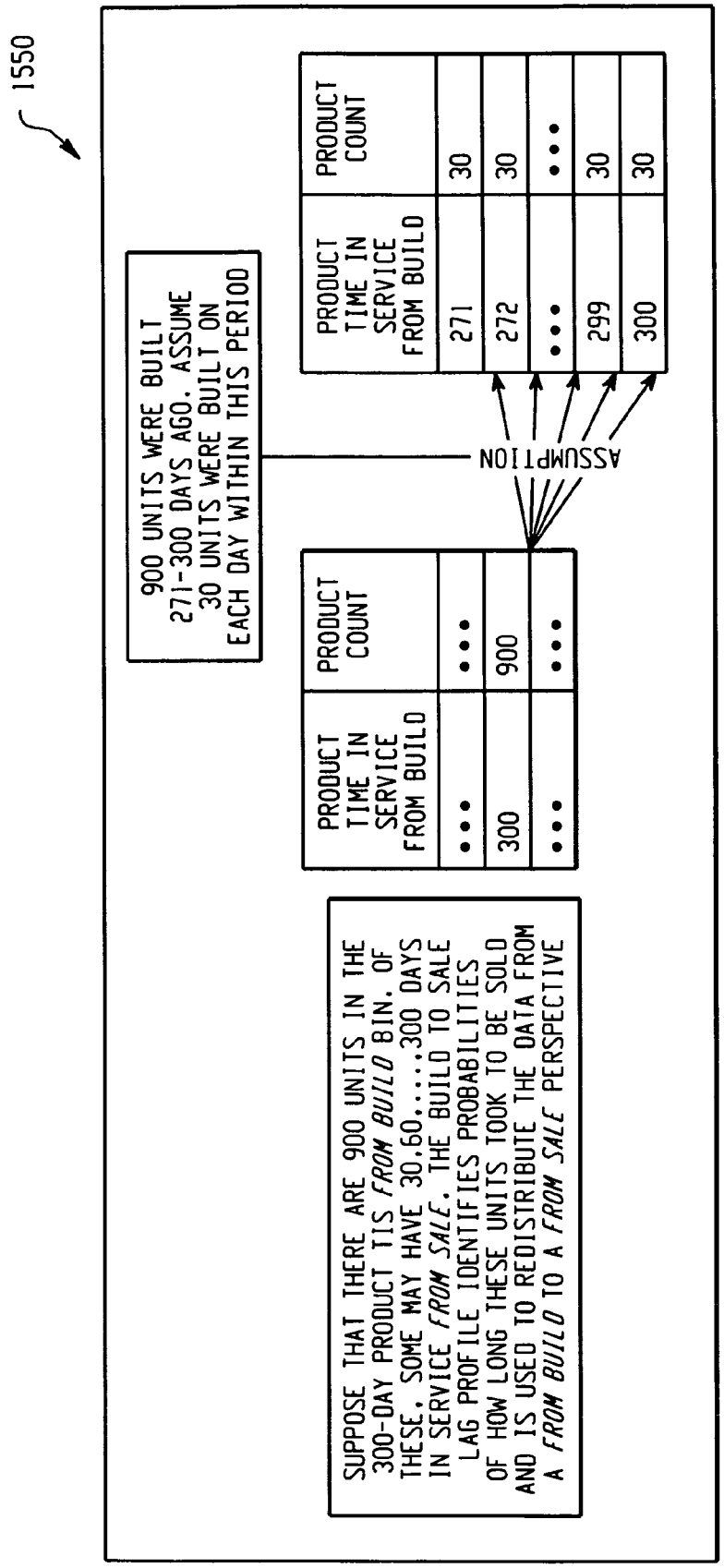
FIG. 31 illustrates how the build to sale lag profile process begins and assumption(s) used.

One of the inputs into the process is the detailed products data set summarized by the product time in service from build variable (if a by or reporting variable were applicable, than the detailed products data set would be summarized by those values as well). By default, the usage bin length is 30-days implying that the detailed product records have been bucketed into 30-day intervals. Assume that the summarized product count for each 30-day interval is evenly spread out across that interval as illustrated at 1550 in FIG. 31.

The second input into the process is a build to sale lag profile. This profile is a distribution of the lag, in days, between the build and sale of units. Using this distribution and knowing the amount of time in service a unit has from build, the amount of time in service a unit has from sale is estimated. Specifically, the product time in service bin from sale that each product unit would fall into is estimated.

Once the product time in service bin from sale that each unit would fall into has been estimated, the product information would be re-summarized by the product time in service bin from sale (and by variable, reporting variable if applicable). This would provide an estimate for the number of units that currently fall into each product time in service fin from sale, with respect to any other variables (e.g., by variable, reporting variable, etc.) as applicable.

Figure 32:
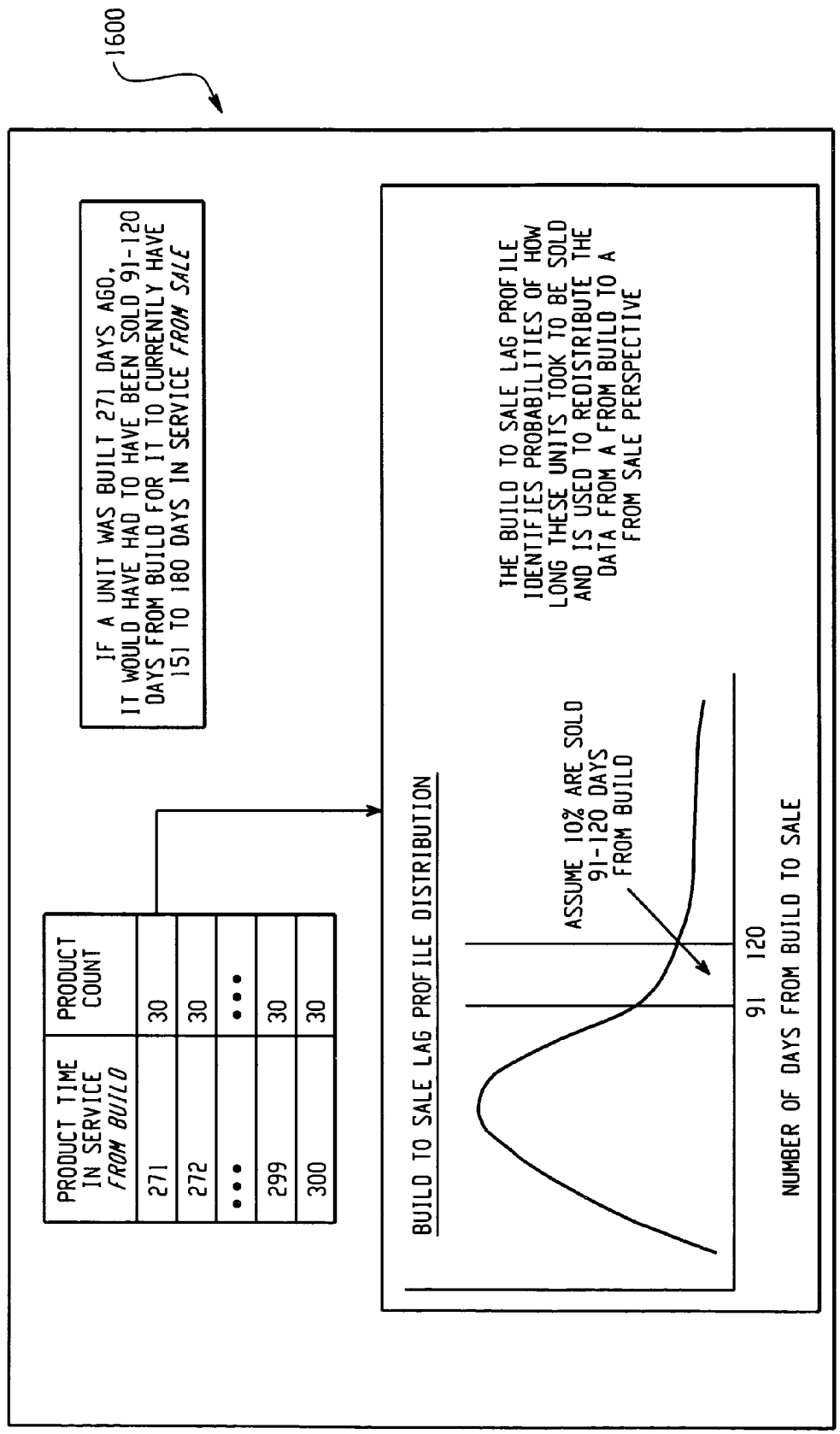
FIG. 32 illustrates how the build to sale lag profile process creates estimated time in service data from sale.

As illustrated at 1600 in FIG. 32, the build to sale lag profile is created using units which had claims. Once a claim is made on a unit, the sales and build dates of that unit are known. The number of days between build and sale (i.e., the build to sale lag) can be calculated from these date values. This information, available for each unit that had a claim, is then fit to a lognormal distribution. This creates the build to sale lag profile. The distributions are created periodically by the administrator (annually or semi-annually) and its parameters are stored for processing at analysis time (see the system administration guide for instructions on how to create these profiles). Different profiles can be generated for different types/groups of products. Products grouped together should have similar behavior with respect to their build to sale lags (e.g., products shipped internationally versus domestically could be grouped separately). By default, the profile is generated using information from those units that had claims. This places the assumption on an analysis that the build to sale lag of units that have claims is representative of the build to sale lag for all units in service. With customization, the build to sale lag profile can be generated from other data sources, such as registration cards.

Usage Profiles Example

For warranty program types 2 or 3, usage profiles may be applied in two different situations, depending on whether or not the report is being generated in terms of the usage or time dimension.

If the report is generated in terms of the usage dimension, then the usage profile can be applied to redistribute the population at risk from a time in service perspective to a usage (e.g., mileage) perspective. Once the population at risk has been redistributed (e.g., the number of units at risk for each 500 mile interval has been estimated), then it can be easily matched up with the claim information also summarized by the usage dimension (e.g., all claims that happened within each 500 mile interval would be grouped together).

Figure 33:
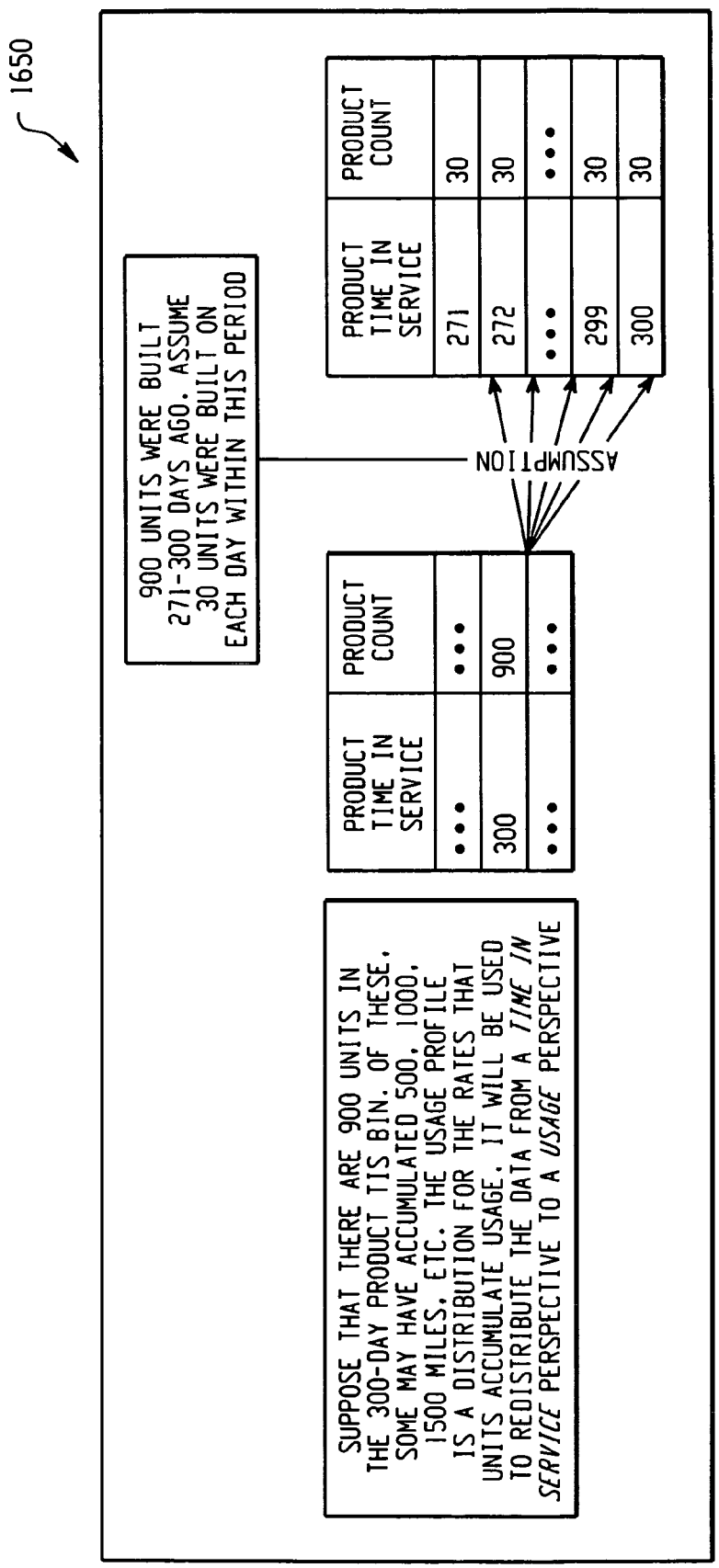
FIG. 33 illustrates how the usage profile process begins and assumption(s) used.

There are several steps in the process to redistribute the population at risk from a time in service perspective to a usage perspective (the steps presented here are a generalization of the physical processing steps that occur). The first step would be to summarize the detail products records by the product time in service bins. Similar to the build to sale lag profile process, it will be assumed (for processing purposes) that the number of units within a time in service interval is evenly distributed across that interval. This step is illustrated at 1650 in FIG. 33.

Figure 34:
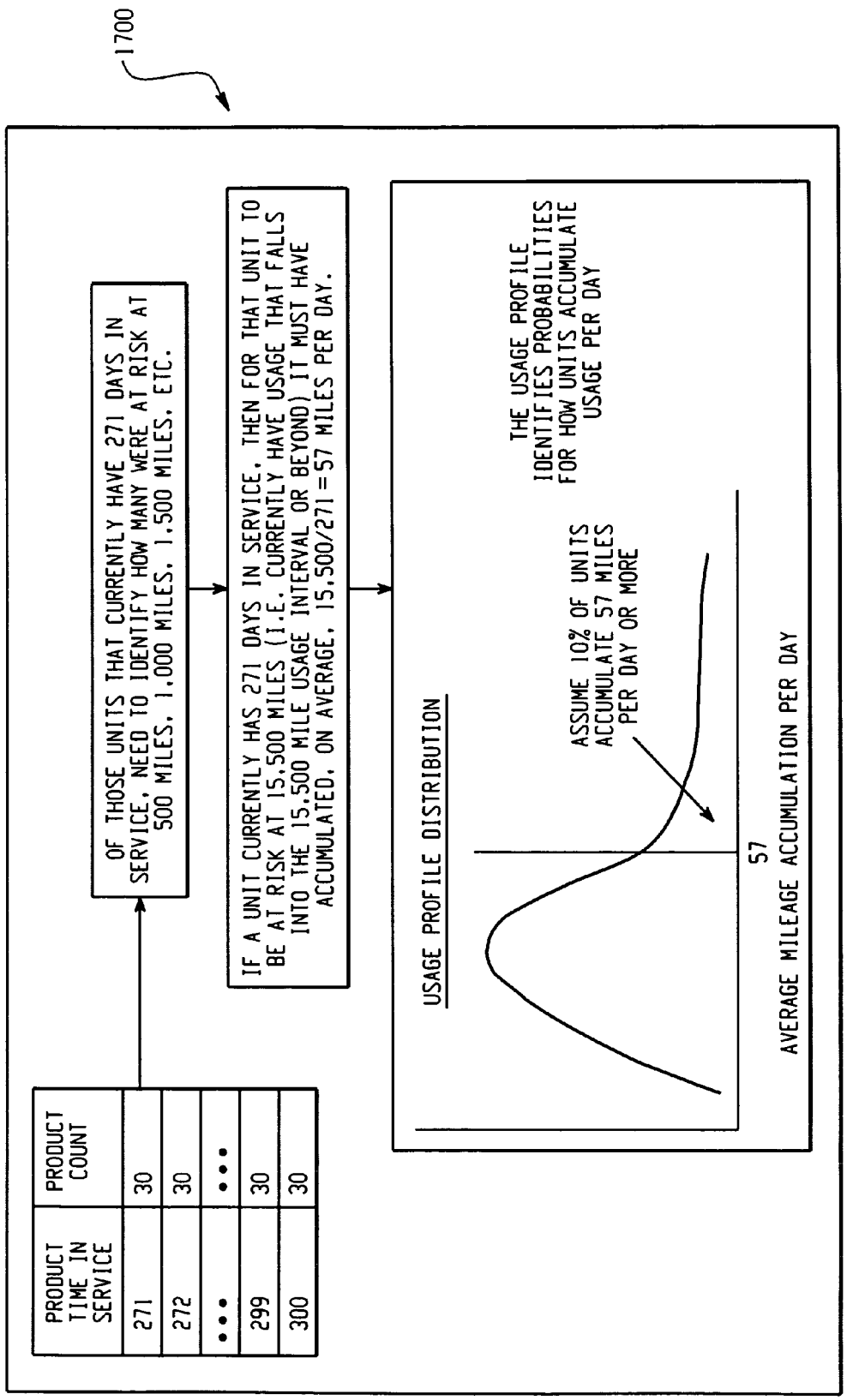
FIGS. 34-35 illustrate an example of the usage profile process being applied to redistribute product information to created estimated usage information.

The second step would be to take the units on each day in service and, using the usage profile, estimate the amount of usage that these units currently have. For example as illustrated at 1700 in FIG. 34, suppose that 30 units currently have 271 days in service. The process would estimate the amount of mileage that these units have accrued in order to identify how many currently have at least 500 miles, 1000 miles, 1500 miles, etc.; and, therefore, identify the number of units that are at risk at 500 miles, 1000 miles, 1500 miles, etc. This is accomplished by first taking the days-in-service value and identifying the minimum average usage per day that a unit with that amount of time in service would need to accumulate for it to be at risk within a particular usage bin (eventually, this would be repeated for each usage interval). Once the average usage per day is calculated, respective to each usage bin, the usage profile would be used to identify the probability of a unit accumulating usage at this rate or a faster rate, thus putting it at risk in that particular mileage bin. This probability would then be multiplied by the number of units within the current days-in-service value. This would identify the number of units that are at risk in each particular mileage bin, given units with a particular days-in-service value.

Figure 35:
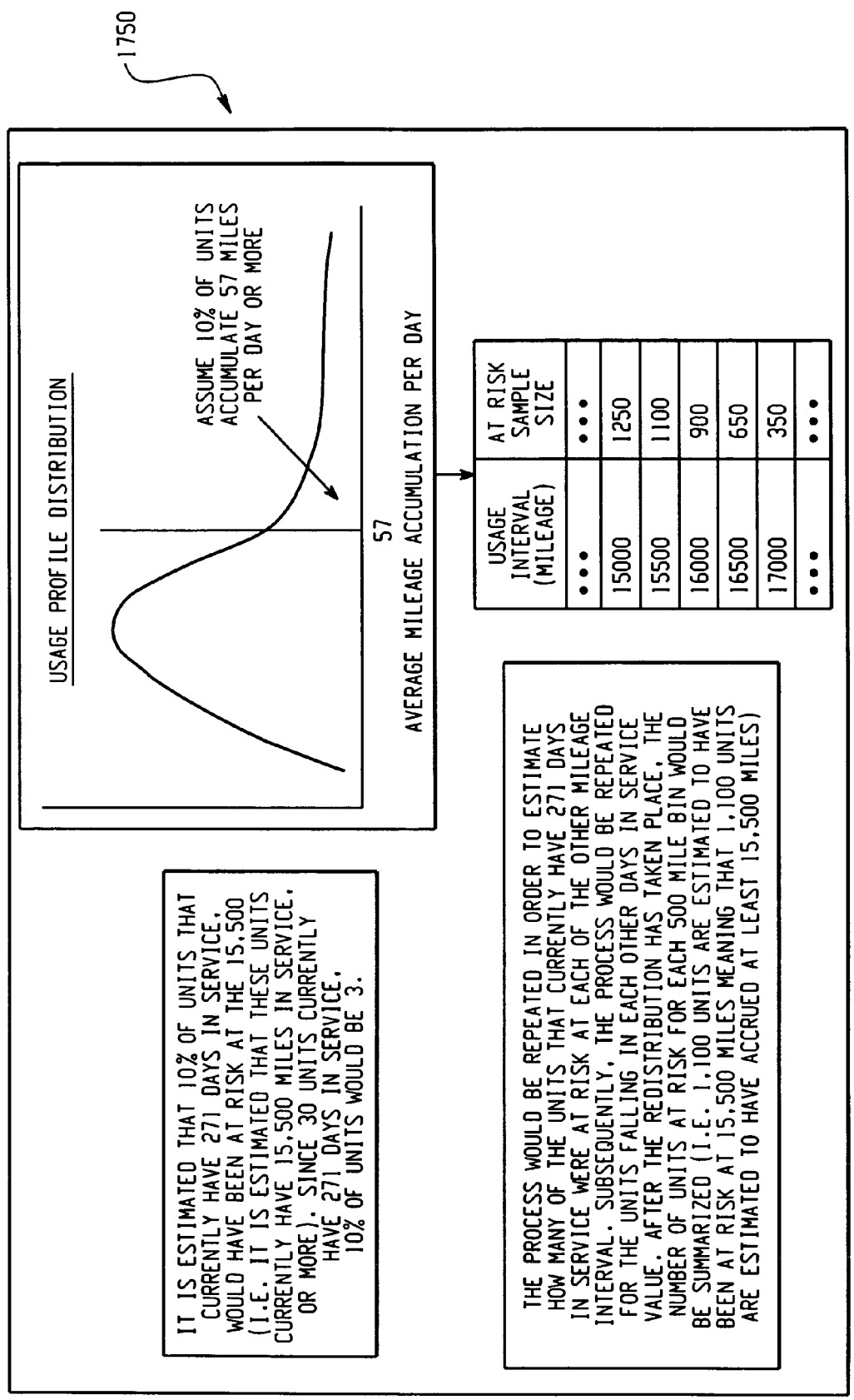

As illustrated at 1750 in FIG. 35, the last step would be to summarize the estimated product counts by usage (e.g., 500 mile) intervals. For a given usage interval, the resulting table would identify the number of units estimated to have amounts of usage within or beyond that interval (e.g., for each 500-mile bin interval, we would estimate the number of units that are estimated to have accrued mileage within or beyond that mileage bin). This information would then be matched up with the claims information (summarized by usage intervals) in order to quantify claims activity within each usage interval.

If the report is generated in terms of time, the usage profile process can be applied in order to estimate the number of units that have dropped out of warranty coverage by exceeding the usage dimension prior to the time dimension at a given point in time. The main purpose of applying usage profiles is to prevent warranty activity from being understated at particular time in service values (e.g., at 2 years in service, some units covered under at 3 year/36,000 mile warranty may have fallen out of warranty coverage by having exceeded the 36,000 mile quantity).

The steps in this process are similar to those presented above. The first step would be to summarize the detail products records by the product time in service bins. It will be assumed (for processing purposes) that the number of units within a time in service interval is evenly distributed across that interval.

Figure 36:
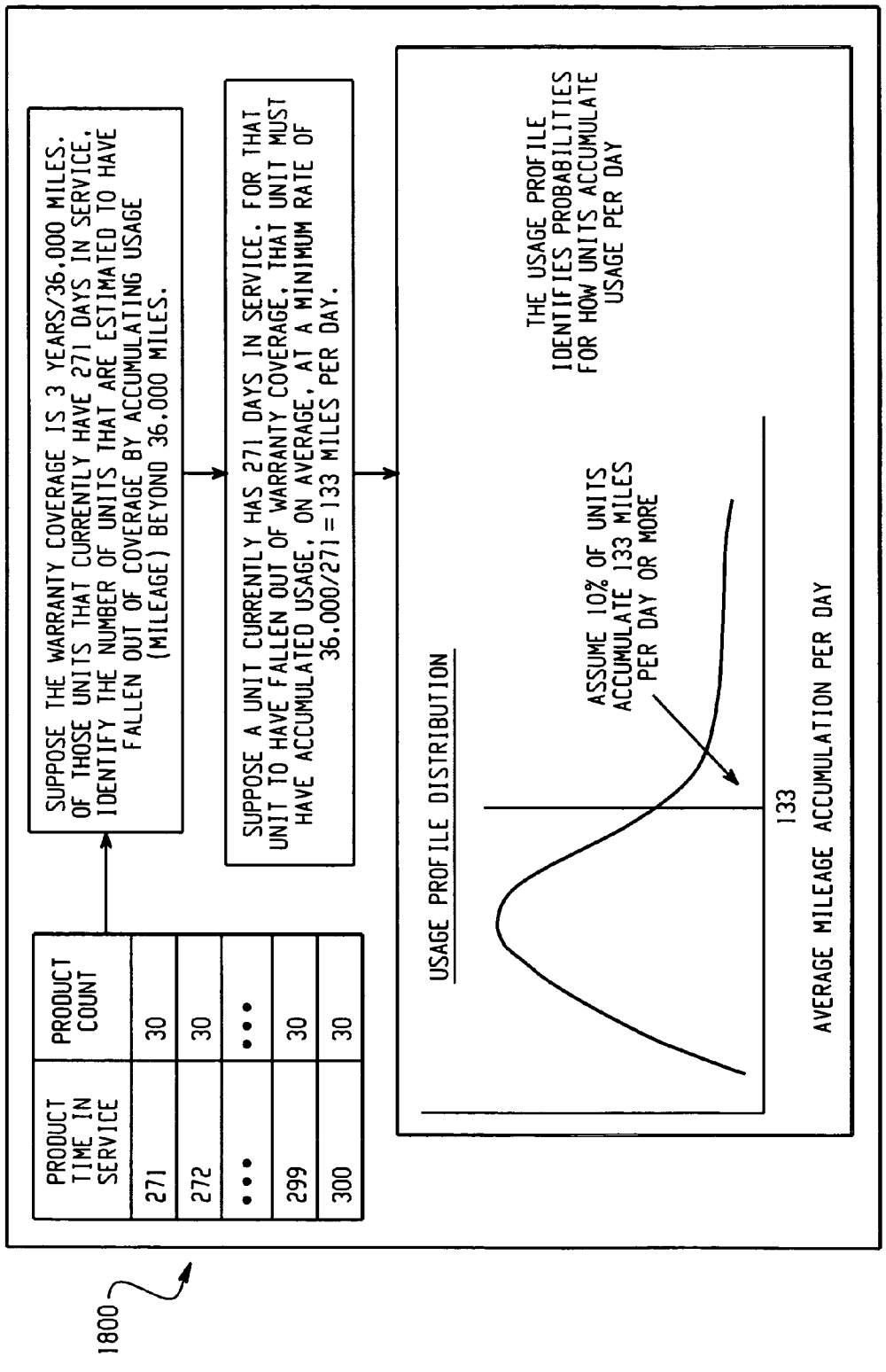
FIGS. 36-37 illustrate an example of the usage profile process being applied to account for usage dropouts.

As illustrated at 1800 in FIG. 36, the next step would be to identify, for each days-in-service value, the number of units that are estimated to have fallen out of warranty by having exceeded the usage limitation of the warranty program (e.g., exceeding 36,000 miles of a 3 year/36,000 mile warranty). For each days-in-service value, determine the minimum usage rate (e.g., average mileage accumulated per day) that a unit would have to accumulate for it to fall out of warranty by exceeding the usage limitation at that particular days-in-service value (e.g., if the warranty coverage is 3 year/36,000 miles, the minimum usage rate a unit would have to have for it to fall out of warranty at 271 days in service would be 36,000/271=133 miles per day). The probability of a unit having a usage rate equal to or greater than this value would be determined from the usage profile. Multiplying this probability by the number of units falling on that particular days-in-service value identifies the number of units that are estimated to have fallen out of warranty coverage for that particular days-in-service by exceeding the mileage limitation.

Figure 37:
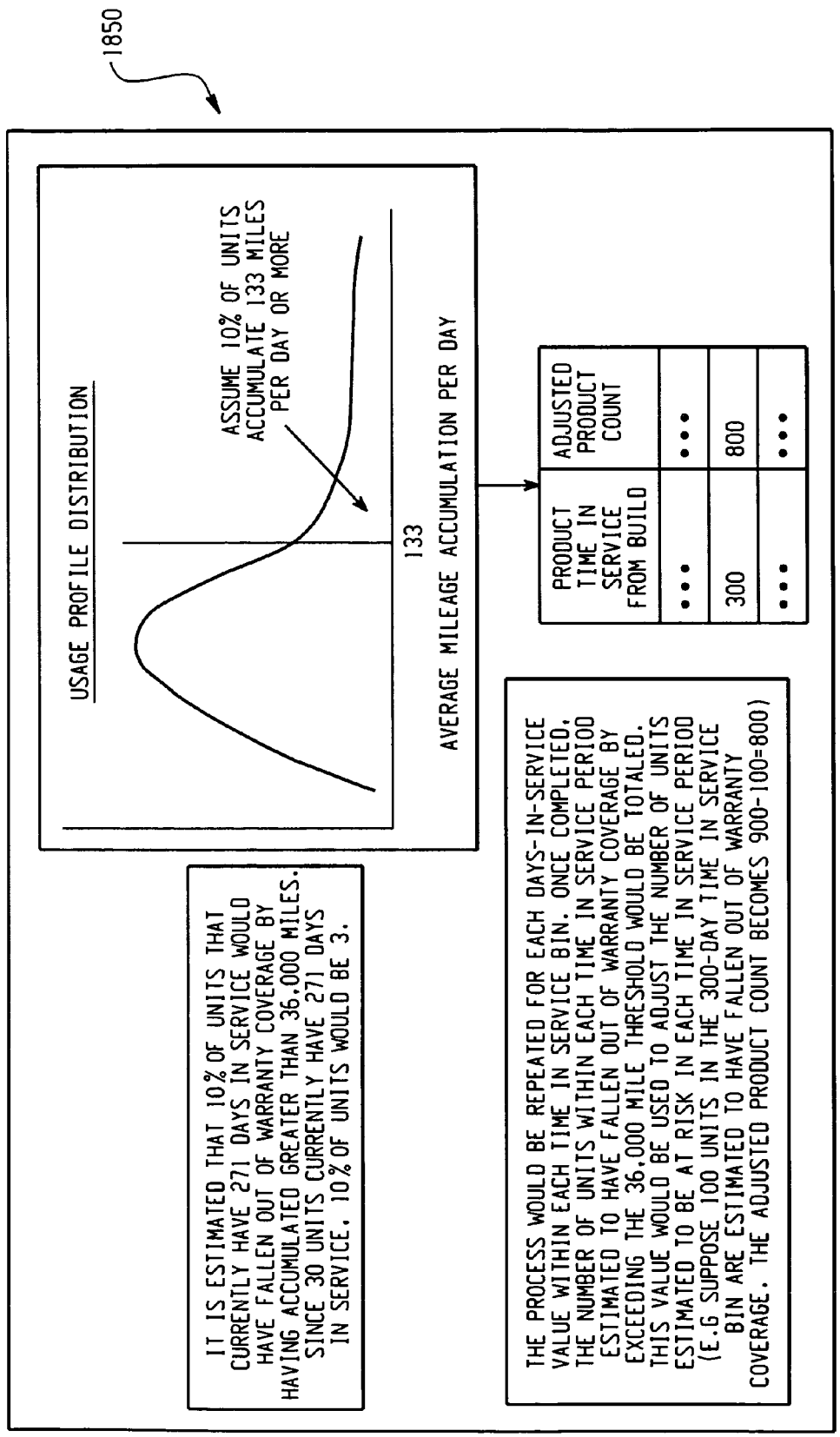

As illustrated at 1850 in FIG. 37, once the number of units estimated to have fallen out of warranty has been identified for each days-in-service value within each time in service bin, then they can be summarized and applied in order to identify the number of units expected to be at risk within each time in service value.

The usage profile is created using units which had claims. Once a claim is made on a unit, the time in service (i.e., claim time in service) and usage (e.g., mileage) of that unit at the time of the claim is known. By dividing the claim time in service by the amount of usage accrued, the average usage accumulated per day can be identified. This information, available for each unit that had a claim, is then fit to a lognormal distribution. This creates the usage profile. The distributions are created periodically by the administrator (annually or semi-annually) and its parameters are stored for processing at analysis time (see the system administration guide for instructions on how to create these profiles). Different profiles can be generated for different types/groups of products. Products grouped together should have accumulated usage similarly (e.g., commercial use products versus personal use products could be grouped separately). By default, the profile is generated using information from those units which had claims. This places the assumption on an analysis that the usage pattern of units that have claims is representative of the usage pattern for all units in service. If a unit has multiple claims, the only the last claim on the unit would be used when creating the usage profile in order to provide the maximum amount of usage information for that unit.

Emerging Issues Examples

The following provides processing examples for the Threshold and Analytical Emerging Issue Processes, and a discussion of the analytical methodology that has been incorporated into the Analytical Processes. The Analytical Watch List and Automated Analytical processes are presented together since those two processes do share similar processing. The two processes differ in how what to monitor, and on which units, are defined.

Threshold Watch List Processing Example

The processing which occurs in the Threshold Watch List Process is similar to that which occurs for the Pareto Analysis, with the following exceptions:

(1) No by variable is specified, and the monitoring variable defined in the Threshold Watch List Process plays the same role as the reporting variable discussed in the Pareto processing details.

(2) Once the cumulative quantitative values associated with the analysis variable are calculated for each value of the monitoring variable, with respect to other analysis options specified, (i.e., step 6 in the Pareto Analysis processing details) the value for the analysis variable is compared to the threshold value that was specified by the administrator when he/she defined the watch list report definition. If the calculated analysis variable for any value of the monitoring variable is greater than the specified threshold value, then that monitoring variable is flagged as an emerging issue, and a Pareto chart would be created to list the top N monitoring variable values with respect to the calculated analysis variable. If none of the values of the monitoring variable have a calculated analysis variable value greater than the specified threshold value, then no report output would be generated since there is no emerging issue with respect to that item (i.e., report definition) on the threshold watch list.

(3) Similar to other analyses, there is a summarized data set that can be downloaded to a CSV file. For the threshold watch list process, the summarized data set would be the same as it were for the Pareto Analysis (i.e., it would contain the calculated quantitative values for all values of the monitoring variable regardless of the number of values presented on the Pareto Chart). However, the summarized data set would only be created for an item on the threshold watch list if any values of that monitoring variable is flagged as an emerging issue (i.e., recall that a report is only created when a monitoring variable is flagged as an emerging issue).

Automated Analytic and Analytical Watch List Emerging Issues Processing Example

With other analyses, processing begins with two subsets of detailed records, one containing the claim records to investigate and the other containing the products to consider. These two subsets of data result from the filtering process and the user specified filter definition. The processing for the analytical watch list begins with the same, since a filter definition is specified in order to define what claims and products data to investigate. However, the processing for the automated analytical emerging issues process begins differently since what to investigate is identified by the defined entity and the units to investigate is identified by the defined hierarchy. When the defined hierarchy is applied, it would subset the claims and products data into several filter definitions. A filter definition would result from each combination of values of the variables that make up the defined hierarchy.

Once the detailed claims and products data subsets are retrieved either via the filtering process using a filter definition for the analytical watch list process or via the application of the defined hierarchy for the automated analytic process, the following steps in the processing would be executed for each value of the defined entity (automated process) or the monitoring variable (analytical watch list) for each filter definition:

(1) For warranty program types 1 or 2, the detailed products data subset would be summarized by production month and by the number of days (bucketed into 30 day intervals) it took for units to enter service (i.e., be sold) from the time of build (e.g., sold 30 days from build, 60 days from build, etc.).

(2) For warranty program types 3 or 4, the detailed products data subset would be summarized (i.e., count up the number of products) by production month. Subsequently, apply the build to sale lag profile in order to estimate the number of units, for each production month, which went into service within 30 days of build, 60 days of build, 90 days of build, etc.

(3) Summarize the claims data (i.e., count up the number of claims) by production month, the number of days (in 30 day intervals) that elapsed between build and sale (i.e., in service) dates, and claim time in service bins (claim time in service bin from sale for warranty program types 3 or 4).

(4) Once the claim and product detail subsets have been summarized, the analytical processing based on the Wu/Meeker methodology would take place. The process results in a critical value calculated for each combination of production period, lag time interval from build to sale, and time in service period values. More details on the analytical methodology are presented below.

(5) The calculated critical value for each combination of production period, lag time interval from build to sale, and time in service period values (from step 4) is compared to the actual number of claims which occurred in each combination of production period, lag time interval from build to sale, and time in service period values (from step 3). If the actual value exceeds the calculated critical value for any value of the defined entity (automated analytical) or monitoring variable (analytical watch list), then that value of the defined entity or monitoring variable is flagged as an emerging issue. Output would then be generated for each flagged issue.

Analytical Process Example

The Analytical Process is based on a paper entitled Early Detection of Reliability Problems Using Information from Warranty Databases by Huaiquq Wu and Bill Meeker (Technometrics, May 2002). The foundation of the process is to monitor claims activity on a population of units at risk for various time in service periods, relative to the particular production period of the population. Given a particular production period and time in service period, the actual claim rate is compared to the expected claims rate, flagging the combinations of periods where the actual is greater than the expected.

Let $\lambda_k$ represent the actual claim rate during time in service period k (e.g., 30 days in service, 60 days in service, etc.) and let $\lambda_k^0$ represent the expected claim rate for the same period. Therefore, the following hypothesis test is being tested.

It will be concluded that $$H_0: \lambda_1 < \lambda_1^0, \lambda_2 < \lambda_2^0, \ldots, \lambda_K < \lambda_K^0$$

Versus $$H_a: \lambda_J > \lambda_J^0 \text{ for any } J=1, \ldots, K$$

$R_{ipk}$ is the number of claims that occurred in the $k^{th}$ claim time in service period for units produced in the $i^{th}$ production period and sold in the $p^{th}$ sales period after production.

In other words, given production period i (e.g., July 2002), for time in service period k (e.g., 30 days in service), $S_{ipk}$ is the sum of all claims which occurred in period K for those units produced in i which went into service over j sales period (e.g., 30, 60, 90 days, etc.) from build. This process has been designed to take into account the idea of staggered entry into the population. Taking this concept into account is necessary because the units from a given month of production enter the population of units at risk over a period of time and claims occurring on those units within the first 30 days in service (for example) for a given production period may span several calendar periods.

The value $C_{ijk}$ should also be calculated when testing the null hypothesis. The calculation of this value takes into account the following.

Past claim rate history for period k

Sales proportions, or the proportion of units produced in a particular production period that would go into service 1, 2, 3, . . . , j periods after production The number of units produced in production period i The specified false alarm probability, alpha This process, as presented in the literature, is a generalization of traditional control chart monitoring schemes where, after each monitoring increment, available data is used to identify an out of control process. However, in this situation, multivariate statistical inferences are being made over time about a report process as a function of periods in service parameterized by $\lambda_1, \lambda_2, \ldots, \lambda_M$. In addition, data on a particular period in service (k) for a particular production period (i) accumulates over time since sales are staggered.

For more details on this analytical process and calculations, please refer to the Wu/Meeker paper referenced.

While examples have been used to disclose the invention (s), including the best mode, and also to enable any person skilled in the art to make and use the invention, the patentable scope of the invention(s) is defined by claims, and may include other examples that occur to those skilled in the art. For example, it should be understood that the steps and the order of the steps in the process flows described herein may be altered, modified and/or augmented and still achieve the desired outcome.

As another example of the breadth of the systems and methods disclosed here, a system and method can be configured in view that the common structure of warranty data is similar from organization to organization, and the application has been designed to adjust for and be robust to the differences. These differences include the effect of different warranty program types and the data available given the type, the particulars of analysis options, and what elements can be filtered on and how. These items are variable from customer to customer. While a system can be robust to these differences, the emerging issues process can be a little more sensitive because its role is not just functional, but should also interpret results in order to flag those issues that are truly emerging problems that should be looked. Therefore, from customer to customer, modifications may have to be made to the process, by default, in order to ensure that the process has the appropriate amount of flexibility and sensitivity to flag issues when they are true signals while minimizing the number of false signals.

In addition, because every corporation has different goals and business practices, the set of business rules discussed in the processing steps would also have to be configured in order to capture and address the companies goals of the emerging issues process (e.g., take the situation where a claim has not occurred in the last 12 months, but all of a sudden does in the current period. That particular event may be important to some companies, yet be noise to others). The exact processing, business rules applied and analytical methodology used, in the emerging issues analytical processing may be supplemented or modified to ensure the functionality of the analytic emerging issues process meets and exceeds its goal and purpose.

The following provides additional examples of the wide breadth of the systems and methods disclosed herein.

Component for Optional Product Variables (Build Options)

A system can be configured to have a component for optional product variables. This component is a sub-component of the product selection. It allows users to optionally include certain attributes about a product that are used infrequently. This is to prevent the filter subsets from containing unnecessary variables for analysis. The user decides first which of the optional attributes to include. Then for each of these selections, they also have the ability to apply selection criteria just as they would for other product attributes. The result is that the final product subset will contain these additional variables but only for those products that match the additional selection criteria. Ultimately, this feature keeps the product selection simpler and the resulting subsets much smaller. The build options component is reusable in the same way product and claim selection components are. They may be copied and edited as such. This feature will mostly be used by companies whose product contains many configurable attributes.

Extending Claims Information

The application can provide the ability to extend the standard data model to include data that may have a one-to-many relationship with the claim information (claim header vs. claim detail). This may include replaced parts, multiple failure codes, or other information (dependent on implementation) related to a claim id. This extension of claims information allows both filtering and analysis capabilities.

Filtering using Claim Detail Level Information

Figure 38:
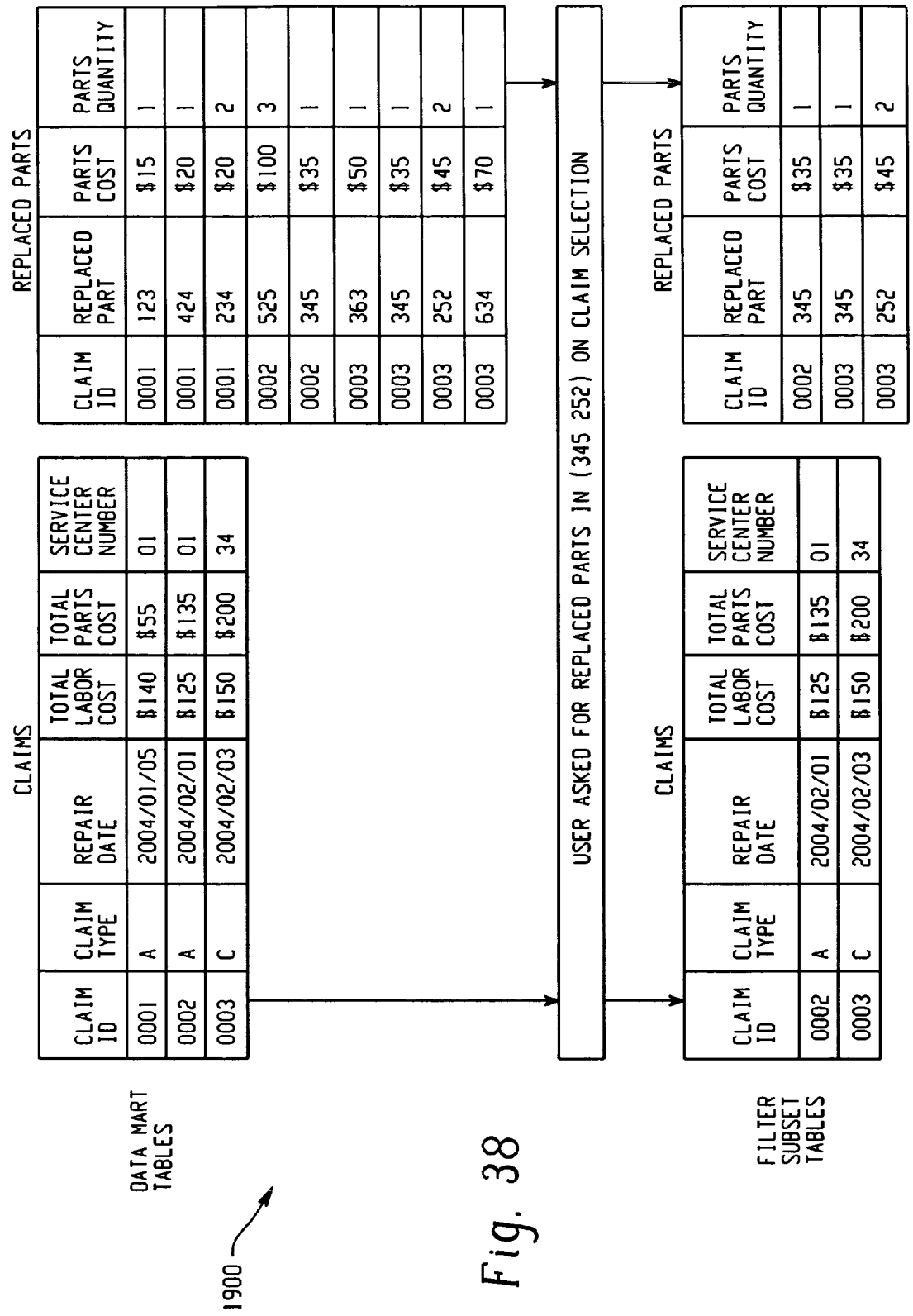
FIG. 38 illustrates a subset of claims and replaced parts detail based on criteria specified for replacement part.

Criteria specified for a claim detail level variable (e.g., replaced part), can act as an additional filter for the claim header table. In other words, it allows users to select claims that meet additional criteria specified for the detail level variable. FIG. 38 illustrates at 1900 a subset of claims and replaced parts detail based on criteria specified for replacement part.

Detail level selection is incorporated into the existing claim selection component used to filter claim header information. Each implementation is specific with regard to how this may appear on the screen itself, but in general the detail level variables do not look any different than header variables. The selection is usually done using a listbox or text area with lookup capability. In either case, the values available are table driven.

Analysis using Claim Detail Level Information

Users can be allowed to run base analyses using claim detail information (e.g., replaced part) as the reporting or by variable (where appropriate). If an analysis allows both reporting and by variables, then users may choose both from the same table or one each from a detail level and claim header level. Users may not choose two variables from different detail level tables. FIG. 39 shows at 1950 which variable types may be chosen when used together in a single analysis.

If a detail level variable is chosen, then only analysis variables from that table can be selected. For example, if replaced part is the reporting variable, then only analysis variables in the replaced part data may be selected (e.g., parts cost). It is not possible to select a variable from the header level in that case. FIG. 40 shows at 2000 which analysis variables apply based on the source of the reporting/by variable.

When detail claims information is available, the detail report allows users to see the records in that subset. In other words, the detail claims tables become additional selections in the "data subset" option for the detail report. This allows the maximum flexibility for users who want to have all the information that may have been part of their analysis.

Using the Same Product Selection with Different "Event" Types

Some systems can be configured to include more than warranty claims as events to be analyzed. Customers sometimes wish to analyze other events that are tied to a specific product id. Examples include customer call center or technician call center information. Users are also allowed to use the same product selection components when creating simple filters for each event type (warranty claim, call center, etc.). They may also combine filter definitions that include these different event types to do analysis.

Dynamic calculation of Analysis Variables

A system can be configured to perform dynamic calculation of analysis variables. This functionality includes the ability to create analysis variables that would otherwise require application customization previously. It makes the definition of the calculation as well as which additional analysis variables are included in an analysis (based on the selected analysis variable) completely configurable. It also makes possible the inclusion of rates per claim (rather than just per unit).

Filtering Options for Date Variables

Both the product and claim selection components may be configured to include dynamic date ranges. What this means is that a user may create the definition of a variable based on a relative range of dates instead of using specific dates. This is extremely helpful when defining filter criteria that may be used in creating batch reports. Otherwise, the user needs to update the filter definition between runs of the batch reports. When the filter subset is created, the current refresh date of the application's data store is used to pull matching records.

Examples of relative date ranges include "prior 3 months", "last 8 weeks", "last quarter", etc. The list of possible values is determined during configuration requirements gathering.

Seasonality adjustments for Automated Emerging Issues

The Automated Emerging Issues process can be configured to account for seasonality for sales and for failures.

Select all on a Lookup Table Page

On lookup tables with multiple selections possible, users may select all items displayed on the current page. This is especially helpful when selecting many values. Users may also deselect all items on specific page listing of items.

Application of Month for Time in Service

By default, the application uses 30 day periods for Time in Service bins. As part of implementation configuration, a customer may now choose to apply one month bins instead. This option will ensure that 12 months will equal one year (rather than 360 days if using 12 30-day bins). The trade-off is that over the course of 12 months, there will be both 30 day and 31 day bins; however the effect of this is negligible. Only one bin size may be used per implementation.

With respect to the systems and methods disclosed herein it is further noted that the systems and methods may be implemented on various types of computer architectures, such as for example on a single general purpose computer or workstation, or on a networked system, or in a client-server configuration, or in an application service provider configuration. For example, a warranty portal in the application can be used to provide organization and infrastructure to the application.

If implemented in multiple computer systems, data signals may be conveyed via networks (e.g., local area network, wide area network, internet, etc.), fiber optic medium, carrier waves, wireless networks, etc. for communication among multiple computers or computing devices. Data signal(s) can carry any or all of the data disclosed herein that is provided to or from a device.

Additionally, the methods and systems described herein may be implemented one many different types of processing devices by program code comprising program instructions that are executable by the device processing subsystem. The software program instructions may include source code, object code, machine code, or any other stored data that is operable to cause a processing system to perform methods described herein. Other implementations may also be used, however, such as firmware or even appropriately designed hardware configured to carry out the methods and systems described herein.

The systems' and methods' data (e.g., associations, mappings, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context clearly dictates otherwise; the phrase "exclusive or" may be used to indicate situation where only the disjunctive meaning may apply.

It is claimed:

1. A computer-implemented method for analyzing claims related to a warranty associated with a product, comprising:
   receiving, using one or more data processors, historical claims data for a population of the product identifying historic warranty claims for the product and corresponding products data, wherein each claim identifies a particular unit of the product, and wherein the products data includes a total number of units in the population;
   performing, using the one or more data processors, statistical analysis of the historical claims data and the products data to calculate a forecasted claims activity level for the population, wherein performing the statistical analysis includes:
      assigning each unit of the product to a time-in-service group, wherein a time-in-service group contains units of the product that have been in customer control for a pre-specified period of time,
      calculating a group claim rate for each time-in-service group,
      summing the group claim rates for a plurality of time-in-service groups to calculate a projected total claim rate, wherein each time-in-service group in the plurality has one or more assigned units, and
      calculating the forecasted claims activity level using the projected total claim rate multiplied by the total number of units in the population;
   receiving, using the one or more data processors, new claims data identifying new warranty claims for units of the product in the population, wherein the new claims data is used to calculate a new claims activity level for the population, wherein the new claims activity level is a cumulative total of the historic warranty claims and the new warranty claims; and
   comparing, using the one or more data processors, the forecasted claims activity level with the new claims activity level to detect and store one or more claim issues, wherein a claim issue is detected when the new claims activity level exceeds a threshold associated with the forecasted claim activity level.

2. The method of claim 1, further comprising:
   filtering the historical claims data and the corresponding products data from an initial data set of claims data and products data.

3. The method of claim 2, wherein the corresponding data is filtered using product attributes.

4. The method of claim 3, wherein the product attributes include product production data, product repair data, product sales dates, and combinations thereof.

5. The method of claim 3, wherein the historical claims data is filtered using one or more claims attributes, including claim dates.

6. The method of claim 1, wherein the historical claims data includes claims variables, wherein the corresponding products data includes product units, and wherein the statistical analysis is an automated analytical process for pre-specifying at least one claims variable to be monitored in the historical claims data, and a product units hierarchy.

7. The method of claim 6, wherein the automated analytical process monitors each pre-specified claims variable that corresponds to the product units hierarchy.

8. The method of claim 7, wherein the pre-specified hierarchy identifies a product model and a product manufacturing location, and wherein labor codes are monitored for units of the product that match the identified product model and product manufacturing location.

9. The method of claim 1, wherein the statistical analysis includes using an alpha level indicative of a false alarm probability, a time window of data, and number of time in service periods to monitor.

10. The method of claim 1, wherein an analytical watch list defines a subset of products data to monitor, and wherein the historical claims data is filtered according to the subset of products data.

11. The method of claim 1, wherein the one or more claim issues indicate a statistically significant upward shift in claim activity.

12. The method of claim 11, wherein the one or more claim issues identify emerging warranty issues.

13. The method of claim 1 further comprising:
   monitoring a variable associated with the historical claims data, wherein the variable to be monitored is identified on a threshold watch list, wherein the threshold watch list identifies criteria for identifying an issue; and
   providing an identified issue when the variable meets the criteria.

14. The method of claim 13, wherein the criteria is associated with a total claim count, a claim rate, or combinations thereof.

15. The method of claim 13, wherein the identified issue is provided using an email notification.

16. A computer-implemented system for analyzing claims related to a warranty associated with a product, comprising:
   one or more processors;
   a computer-readable storage medium containing instructions configured to cause the one or more processors to perform operations, including:
      receiving historical claims data for a population of the product identifying historic warranty claims for the product and corresponding products data, wherein each claim identifies a particular unit of the product, and wherein the products data includes a total number of units in the population;
      performing statistical analysis of the historical claims data and the products data to calculate a forecasted claims activity level for the population, wherein performing the statistical analysis includes:

assigning each unit of the product to a time-in-service group, wherein a time-in-service group contains units of the product that have been in customer control for a pre-specified period of time, calculating a group claim rate for each time-in-service group, summing the group claim rates for a plurality of time-in-service groups to calculate a projected total claim rate, wherein each time-in-service group in the plurality has one or more assigned units, and calculating the forecasted claims activity level using the projected total claim rate multiplied by the total number of units in the population;

receiving new claims data identifying new warranty claims for units of the product in the population, wherein the new claims data is used to calculate a new claims activity level for the population, wherein the new claims activity level is a cumulative total of the historic warranty claims and the new warranty claims; and comparing the forecasted claims activity level with the new claims activity level to detect and store one or more claim issues, wherein a claim issue is detected when the new claims activity level exceeds a threshold associated with the forecasted claim activity level.

17. A computer-program product, tangibly embodied in a machine-readable storage medium, including instructions configured to cause a data processing apparatus to:

receiving historical claims data for a population of the product identifying historic warranty claims for the product and corresponding products data, wherein each claim identifies a particular unit of the product, and wherein the products data includes a total number of units in the population;

performing statistical analysis of the historical claims data and the products data to calculate a forecasted claims activity level for the population, wherein performing the statistical analysis includes:

assigning each unit of the product to a time-in-service group, wherein a time-in-service group contains units of the product that have been in customer control for a pre-specified period of time, calculating a group claim rate for each time-in-service group, summing the group claim rates for a plurality of time-in-service groups to calculate a projected total claim rate, wherein each time-in-service group in the plurality has one or more assigned units, and calculating the forecasted claims activity level using the projected total claim rate multiplied by the total number of units in the population;

receiving new claims data identifying new warranty claims for units of the product in the population, wherein the new claims data is used to calculate a new claims activity level for the population, wherein the new claims activity level is a cumulative total of the historic warranty claims and the new warranty claims; and comparing the forecasted claims activity level with the new claims activity level to detect and store one or more claim issues, wherein a claim issue is detected when the new claims activity level exceeds a threshold associated with the forecasted claim activity level.

18. The method of claim 1, further comprising:

performing a database query using the historical claims data and corresponding products data, wherein the results of the database query are stored; and generating a child report using the stored results.

19. The method of claim 1, wherein the corresponding products data includes a build date for each unit of the product, wherein an estimated sale date for each unit of the product is calculated based upon the build date and a build to sale lag distribution, and wherein each unit of the product is assigned to a time-in-service group according to the estimated sale date.

20. The method of claim 19, wherein the build to sale lag distribution is based upon historical sale data.

21. The method of claim 1, wherein the warranty terminates when product usage exceeds a usage threshold, and wherein the corresponding products data includes a build date for each unit of the product.

22. The method of claim 21, further comprising:

calculating a product usage for each unit of the product based upon the build date and a usage distribution; and filtering products from the corresponding products data when product usage exceeds the usage threshold.

* * * * *